United States Patent [19]

Luke, Jr.

[11] Patent Number: 5,023,790
[45] Date of Patent: Jun. 11, 1991

[54] AUTOMATIC GUIDED VEHICLE SYSTEM

[75] Inventor: Walter Luke, Jr., Binghamton, N.Y.

[73] Assignee: WHS Robotics, Binghamton, N.Y.

[21] Appl. No.: 313,654

[22] Filed: Feb. 17, 1989

[51] Int. Cl.[5] ............................................. G06F 15/50
[52] U.S. Cl. ............................... 364/424.02; 364/436; 318/587; 180/168
[58] Field of Search ..................... 364/424.01, 424.02, 364/424.03, 436, 449, 460, 461, 468; 318/587, 591; 340/460–462; 180/167–168; 414/495, 662, 663, 664

[56]  References Cited
U.S. PATENT DOCUMENTS

| | | | |
|---|---|---|---|
| 3,700,070 | 10/1972 | King | 414/495 |
| 4,168,760 | 9/1979 | Paul, Jr. et al. | 318/587 |
| 4,530,056 | 7/1985 | MacKinnon et al. | 364/449 |
| 4,657,463 | 4/1987 | Piper | 414/495 |
| 4,669,047 | 5/1987 | Chucta | 364/478 |
| 4,764,078 | 8/1988 | Neri | 180/168 |
| 4,777,416 | 10/1988 | George, II et al. | 364/424.02 |
| 4,779,203 | 10/1988 | McClure et al. | 364/424.02 |
| 4,791,570 | 12/1988 | Sherman et al. | 364/436 |
| 4,860,209 | 8/1989 | Sugimoto et al. | 180/169 |
| 4,863,335 | 9/1989 | Herigstad et al. | 414/664 |

Primary Examiner—Parshotam S. Lall
Assistant Examiner—Michael Zanelli
Attorney, Agent, or Firm—Salzman & Levy

[57] ABSTRACT

An AGV and guidance system for transporting material between at least two pickup and delivery stands. The AGV has a chassis for carrying objects. A computer processor is supported by the chassis for controlling and monitoring AGV operation. An interactive display is connected to the computer processor and mounted on the chassis for displaying status, current assignment and diagnostic information relating to AGV operation.

27 Claims, 37 Drawing Sheets

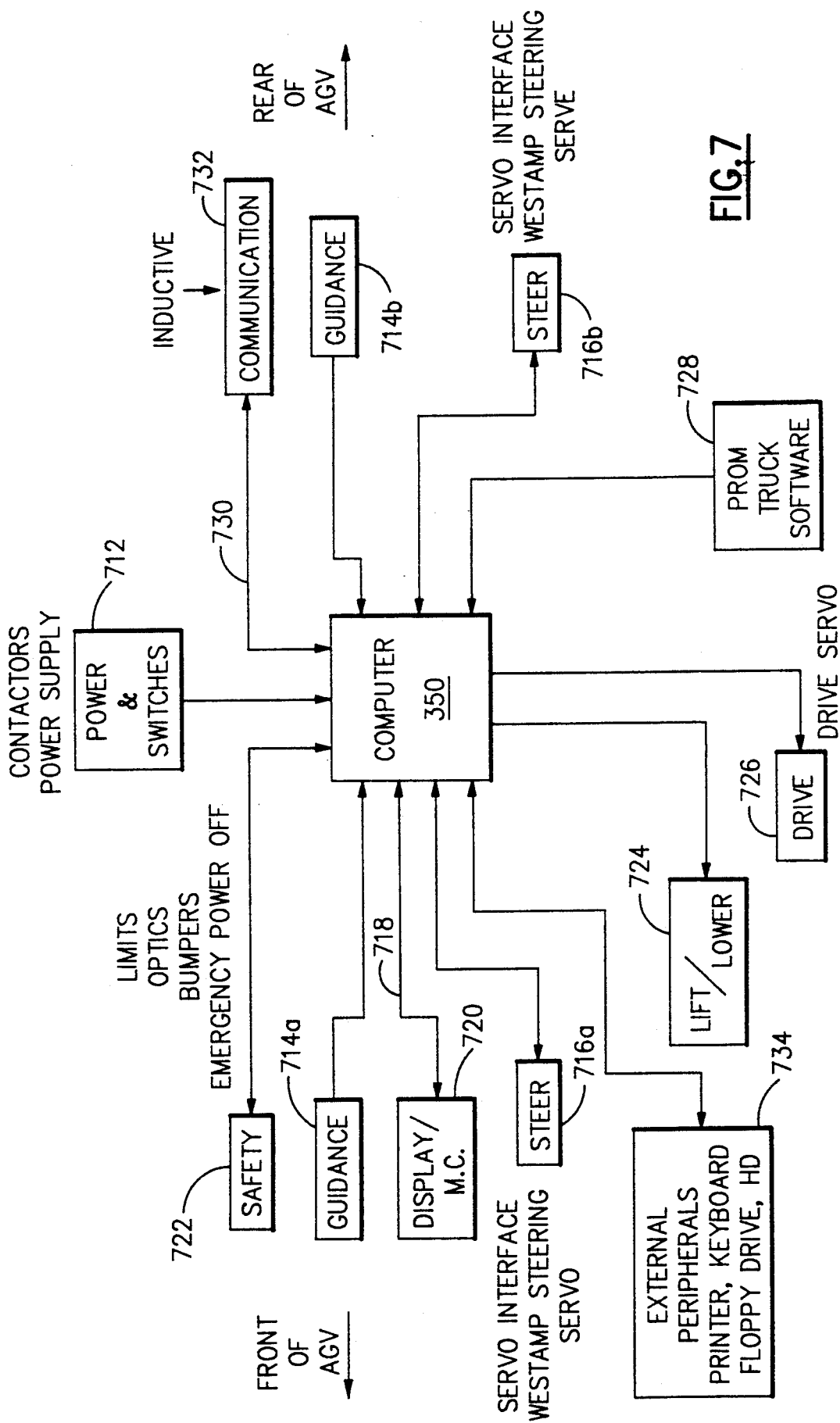

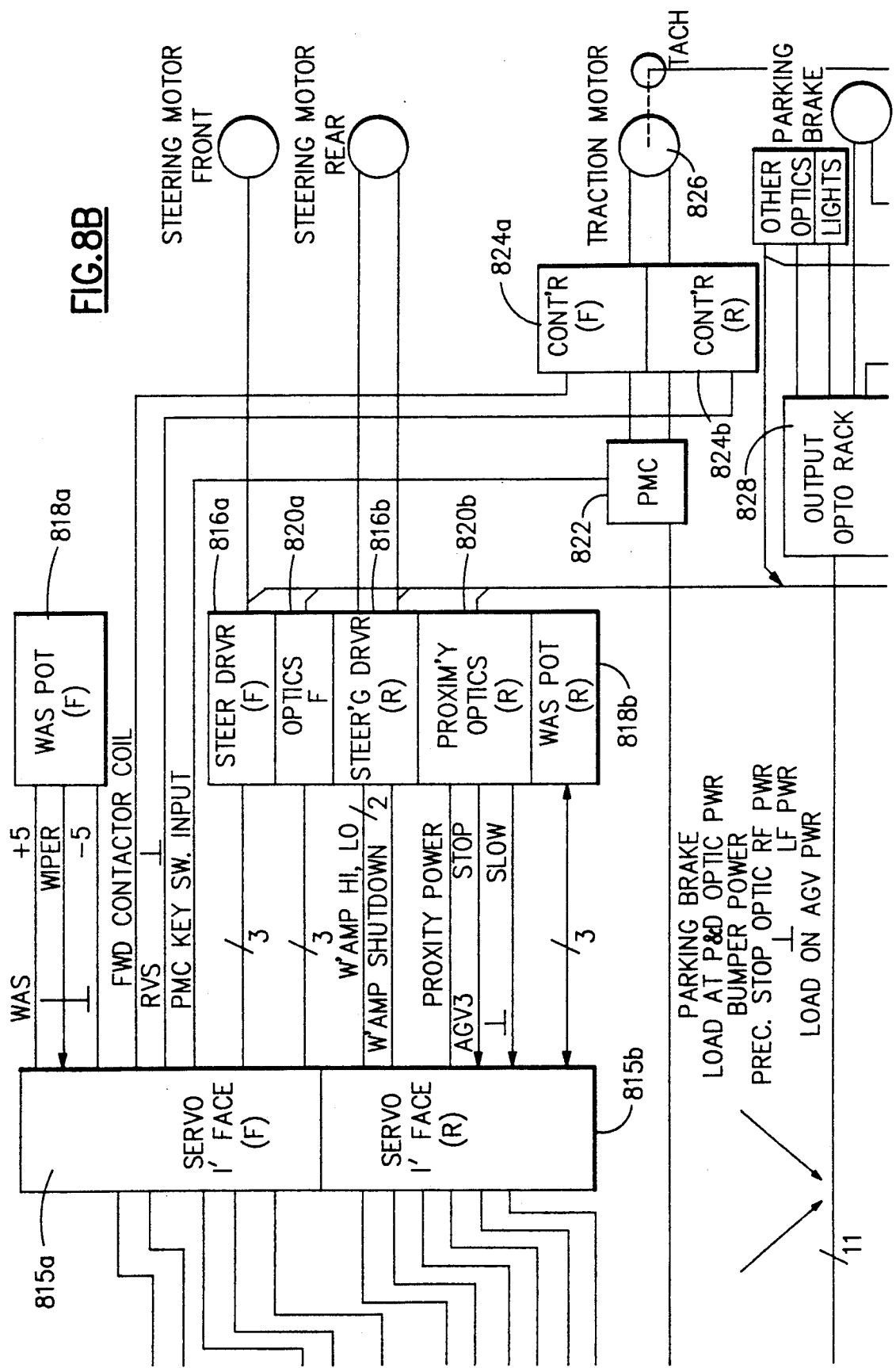

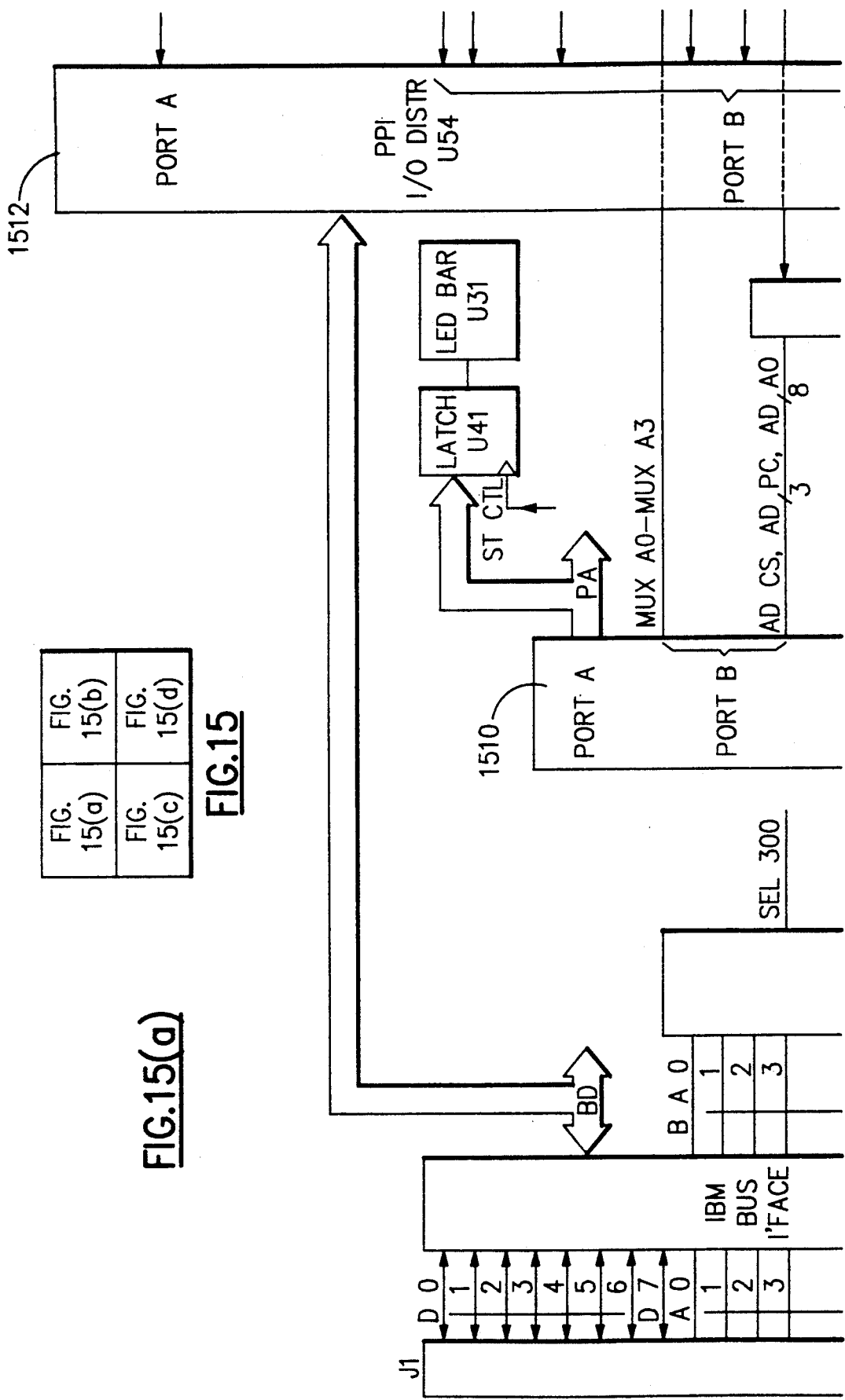

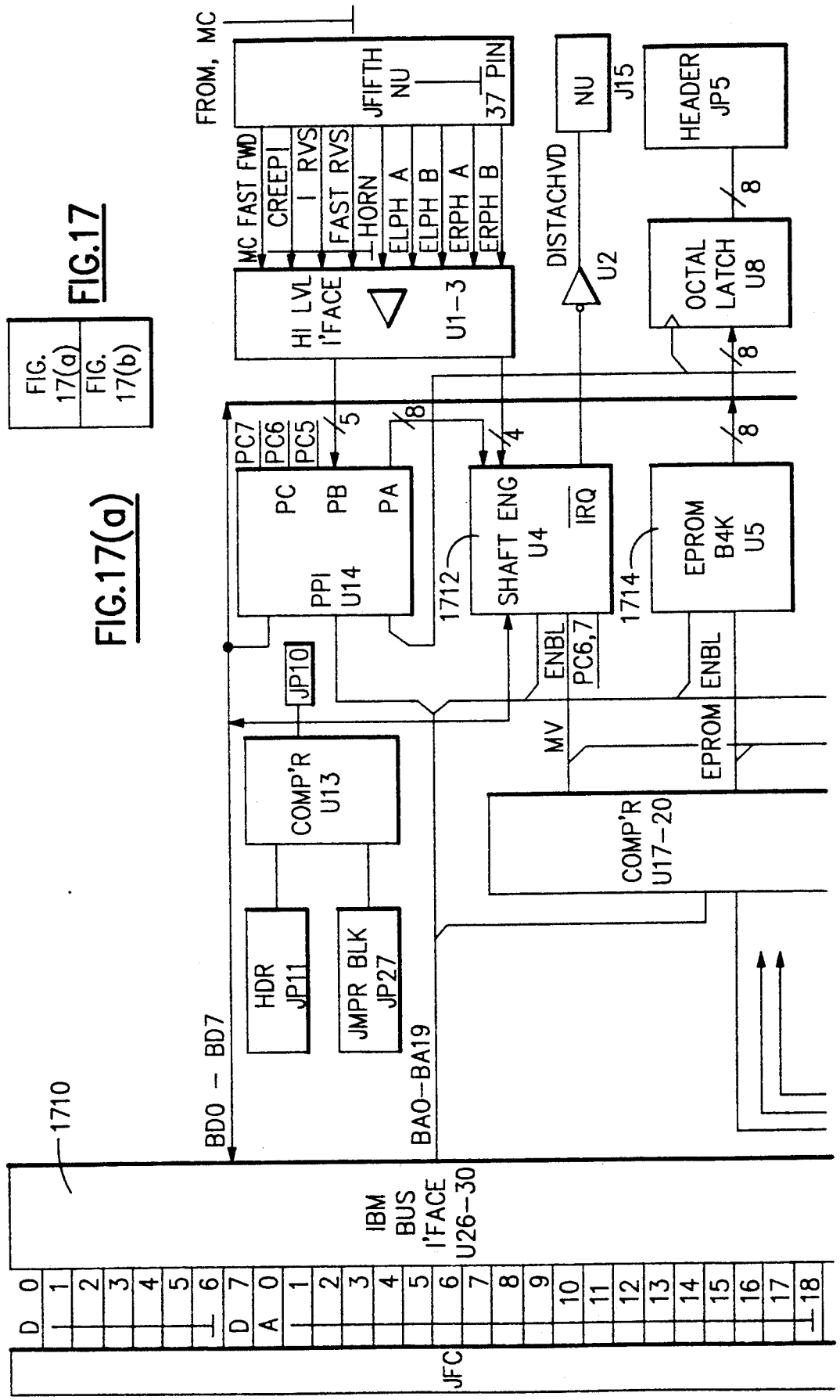

AUTOMATIC GUIDED VEHICLE SYSTEM

BACKGROUND OF THE INVENTION

The present invention relates to automatic guided vehicles (AGVs) and, more particularly, to an AGV system having interfacing computer sub-systems for controlling guidance, pick-up and delivery, traffic control and internal AGV monitoring.

In the field of material handling, most commonly in a warehouse environment, many articles must be stored in inventory and, an indefinite time later, retrieved for use. The larger the warehouse facility, the greater the number of objects that can be stored.

Moreover, large warehouse facilities require a great amount of geographical space. Not only are modern warehouses spread over a great amount of distance, but their height allows a many objects to be stacked for storage one above the other. Each object location or bin can be identified along three axes: X, Y and Z. Thus, a warehouse location for any specified particular object can be uniquely identified.

When the warehouse is large, it becomes burdensome to move material from one part of it (e.g., the port of entry) to another part thereof (e.g., a storage bin). Moreover, certain warehouses house large objects, weighing many pounds or even tons. The combination of large objects to be stored in a warehouse and great distances between pickup and delivery (P & D) stands is ideal for assigning tasks to automatic guided vehicles. As used herein, the term 'assignment' indicates an address of a P & D stand for a pickup operation or for a deliver operation.

It has been found that guided vehicles moving over a buried inductive cable can perform many of the functions that humans perform without the requirement of lighting, heating, ventilation and air conditioning that would normally be required for a pleasant human work environment. Moreover, AGVs can be relied upon to operate continuously 24 hours per day. This advantage of performance over human laborers results in greater efficiency for warehouse facilities.

As AGVs become more sophisticated, they begin to acquire the attributes of intelligent robots. Guiding and maneuvering each AGV and providing the necessary software and control of the AGV requires corresponding sophisticated techniques.

Heretofore, AGV systems have been unreliable. Often these systems caused more problems than they were designed to eliminate. AGV systems have been found to require human intervention, a condition they were to aleviate.

These drawbacks have severely hurt the industry (Ailing robot industry is turning to services, John Holusha, Business Section, New York Times, Page D1, Feb. 14, 1989).

The present invention has combined computerized sub-systems of proven reliability and capability to form an integrated AGV system of advanced design. While it was no simple task to interface all of the various computer sub-systems, once having accomplished this task, the overall AGV system of this invention has shown itself to have versatility and capabilities which are presently unknown in the industry.

DISCUSSION OF RELATED ART

Generally speaking, there are presently two major types of automated guided vehicle system for warehouses:

a) a system featuring a buried wire in the floor of a warehouse, that guides the vehicle through given paths of the warehouse; and b) a vehicle traveling on a warehouse path that is kept on track by optical (e.g., laser) reflective units positioned above ground along the guide path.

Both of the aforementioned systems have drawbacks that have been found to make the guidance of the vehicles unreliable.

In most of these systems, problems arise at intersections, and where vehicles are caused to make turns or slow down for other vehicles in their path.

Another formidable problem occurs at loading docks and depositing bays, where decisions must be resolved concerning priority status of each vehicle.

U.S. Pat. No. 4,168,760; issued: Sept. 25, 1979, depicts a wire guidance system that makes decisions at vehicular intersections based upon comparison of destination addresses stored at the intersections, thereby reducing the need to store large quantities of data in computer memory.

In U.S. Pat. No. 4,727,492: issued: Feb. 23, 1988, a system is disclosed for guiding a vehicle along a given route or pathway by storing data in the vehicle indicative of the path to be followed. The system also features a fixed target detection system utilizing a scanning laser.

In U.S. Pat. No. 4,791,570, issued: Dec. 13, 1988, a wire guided vehicle system is shown which features a computer that polls the status of each vehicle for the purpose of maintaining proper traffic flow.

In U.S. Pat. No. 4,790,402; issued: Dec. 13, 1988, a laser guided vehicular system is illustrated wherein laser beam reflectors are positioned along the guide path for routing the vehicle. Certain targets are bar coded to keep track of the vehicle position. The system also features reflective microwave sensors for speed and distance control.

U.S. Pat. No. 4,361,202; issued: Nov. 30, 1982, describes a system utilizing a sonic or radar collision avoidance system and a wire guidance technique. Transponders buried in the roadway provide position and speed information.

In the U.S. Pat. No. 4,215,759, issued: Aug. 5, 1980, a vehicle guide path system is featured wherein the vehicle is steered and guided by radio control stations along the pathway.

U.S. Pat. No. 4,322,670; issued: Mar. 30, 1982, teaches a guide wire vehicle tracking system with superimposed signals for negotiating curves.

While all of the above-identified systems function reasonably well, none has been found to be completely reliable.

It would be advantageous to provide an AGV system having a sub-system whereby specific status information could be displayed in human readable form.

It would also be advantageous to provide an AGV system having a diagnostic sub-system that is self contained so that no additional references need be consulted.

It would also be advantageous to provide an AGV system comprised of individualized sub-systems each having computerized control of departmentalized functions of the overall system.

It would also be advantageous for an AGV system which truly does away with human intervention, but which also has the versatility to provide for manual control.

It would be advantageous to provide an AGV with proven reliability and capabilities heretofore unknown.

SUMMARY OF THE INVENTION

The present invention uses a guided wire AGV system that is very accurate and versatile. The system features separate traffic and loading control sub-systems. An on-board computer in each AGV vehicle performs guidance control in conjunction with a overall system host computer for greater versatility. An EPROM in the vehicle computer can be programmed with the particular floor plan of the warehouse. The on-board computer of each vehicle can be interrogated to determine the status of any system, and provide for both manual and stand-alone operation.

BRIEF DESCRIPTION OF THE DRAWINGS

A complete understanding of the present invention may be obtained by reference to the accompanying drawings, when taken in conjunction with the detailed description thereof and in which:

FIG. 7 is a schematic block diagram of the communication and control of each individual AGV of the system shown in FIG. 1;

FIGS. 8a-8d, when taken together and arranged as shown in the corresponding interconnection diagram, and hereinafter referred to in the specification as FIG. 8, are schematic block diagram of the computer shown in FIG. 7;

FIGS. 15a-15d, when taken together and arranged as shown in the corresponding interconnection diagram, and hereinafter referred to in the specification as FIG. 15, are a block diagram of a guidance control card as depicted in FIG. 8;

FIGS. 17a-17b, when taken together and arranged as shown in the corresponding interconnection diagram, and hereinafter referred to in the specification as FIG. 17, are a block diagram of a non-volatile memory system in accordance with the present invention.

DESCRIPTION OF THE PREFERRED EMBODIMENT

For the purposes of clarity, like components will have the same numerical designation throughout the FIGURES.

Figure 1:
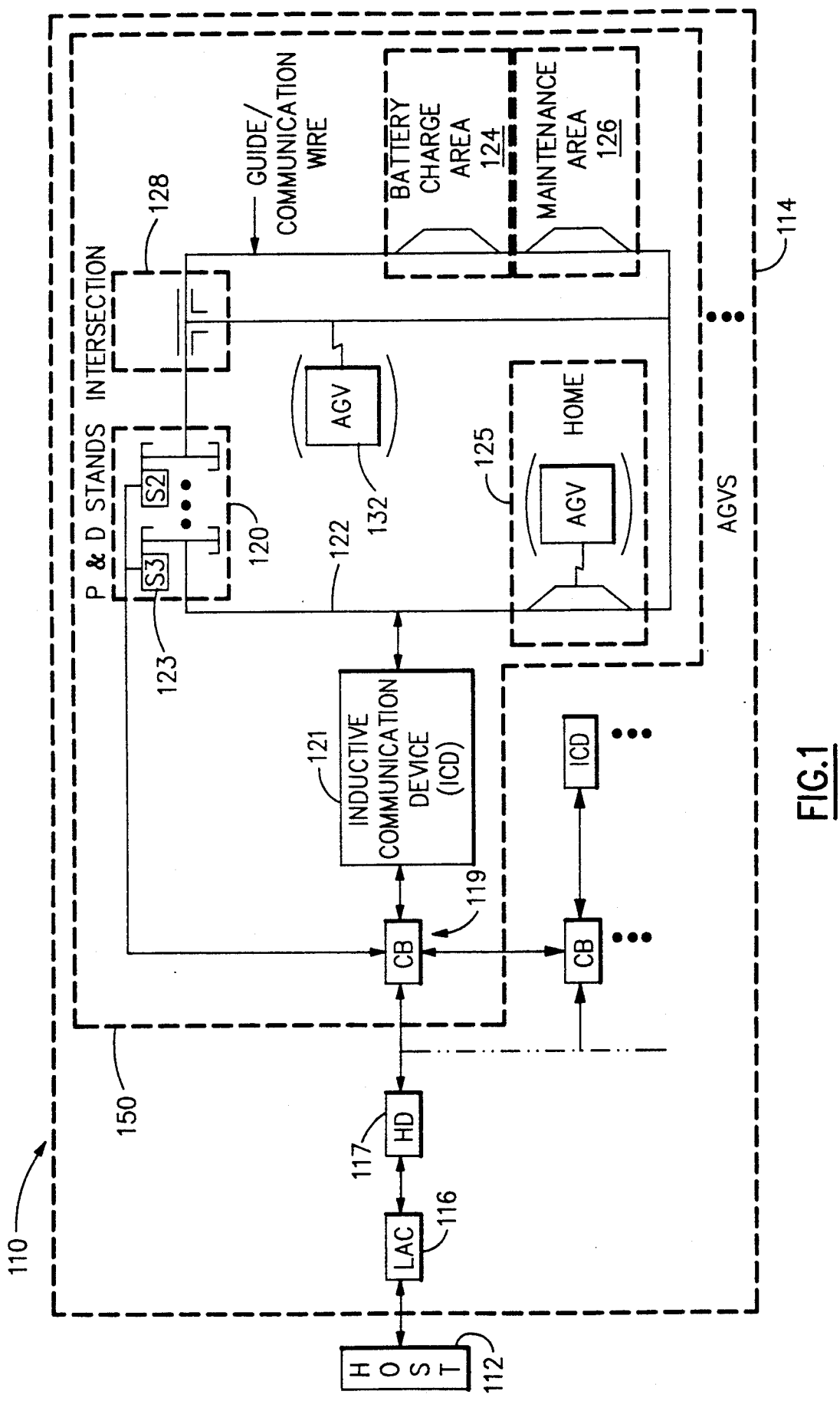
FIG. 1 is a schematic diagram of a typical automatic guided vehicle (AGV) system.

Referring now to FIG. 1, the system of the present invention and a host computer are shown generally at reference numeral 110. A host computer 112, such as a Tandem mainframe computer, is a customer interface to the automatic guidance vehicle system (AGVS) 114 of the present invention.

A local area controller (LAC) 116 provides the interface to host computer 112. LAC 116 is a computer such as that manufactured by the AST Corporation based on a Model No. 80286 microprocessor provided by Intel Corporation.

Connected to LAC 116 is a hyper driver (HD) 117, which is programmed to control and pass communications information among a plurality of control boxes (CBs) 119. Up to eight CBs can be configured in one system. In addition, HD 117 is programmed for passing communications information between LAC 116 and CBs 119.

Connected to hyper driver (HD) 117 is a plurality of CBs 119, each of which is programmed to communicate with and control the movement of one or more AGVs 132. Two CBs are shown in this FIGURE. Communication includes controlling AGV movement at intersections of the guide path and at P & D zone clusters. Traffic control for each CB occurs within a predetermined jurisdiction 150 of the guide path 122. In addition, CBs 119 are programmed to control and maintain the status of a plurality of switch boxes (SBs) 123. HD 117 is also connected to LAC 116.

Connected to CB 119 are:

1) a plurality of SBs 123, each of which is used for controlling discrete devices, as in a P & D stand switch;

2) an inductive communication device 121, used for passing communication information between CB 119 and any one of the AGVs 132; and

3) HD 117.

Each CB 119 controls its OWn discrete guide path 122 including any of the subsystems of the AGV system 114, such as P and D stand clusters 120, SBs 123, intersections 128, homes 125, battery charge area 124, maintenance area 126 and AGVs 132, the totality being referred to as a CB jurisdiction 150. Only one jurisdiction 150 is depicted in the FIGURE.

Connected to SB 123 are up to two P & D stand switches, a warehouse bay door, a light, or any other discrete device that can provide a two bit input to SB 123 and be controlled by a single bit output.

An inductive communication device (ICD) 123 is connected to guide path 122. Communication information is inductively passed through guide path 122 to AGVs 132.

A guide wire communications network 122 is laid out in a facility beneath the surface of the warehouse floor, not shown. At various stations along guide path 122 are areas 124 for recharging the batteries of AGVs 132, areas for storing AGVs between assignments (home or parking position) 125 and areas for performing maintenance 126.

The AGVs of the present invention are programmed to travel to battery charge area 124 when their battery voltage level is less than a predetermined amount and programmed to travel to maintenance area 126 for predetermined preventive maintenance scheduling.

LAC 116 is an intelligent device that is loaded with a program for controlling it. The program is shown in Appendix I.

Along guide wire 122 is an intersection 128 of guide wire paths. It should be understood that a plurality of intersections may occur in any given layout. Traffic control in an intersection 128 is provided by a software program within CB 119.

One or more AGVs 132 operate along guide wire 122 in a manner described hereinbelow. Within AGV 132 is a vehicle control program shown in Appendix II.

Figure 2:
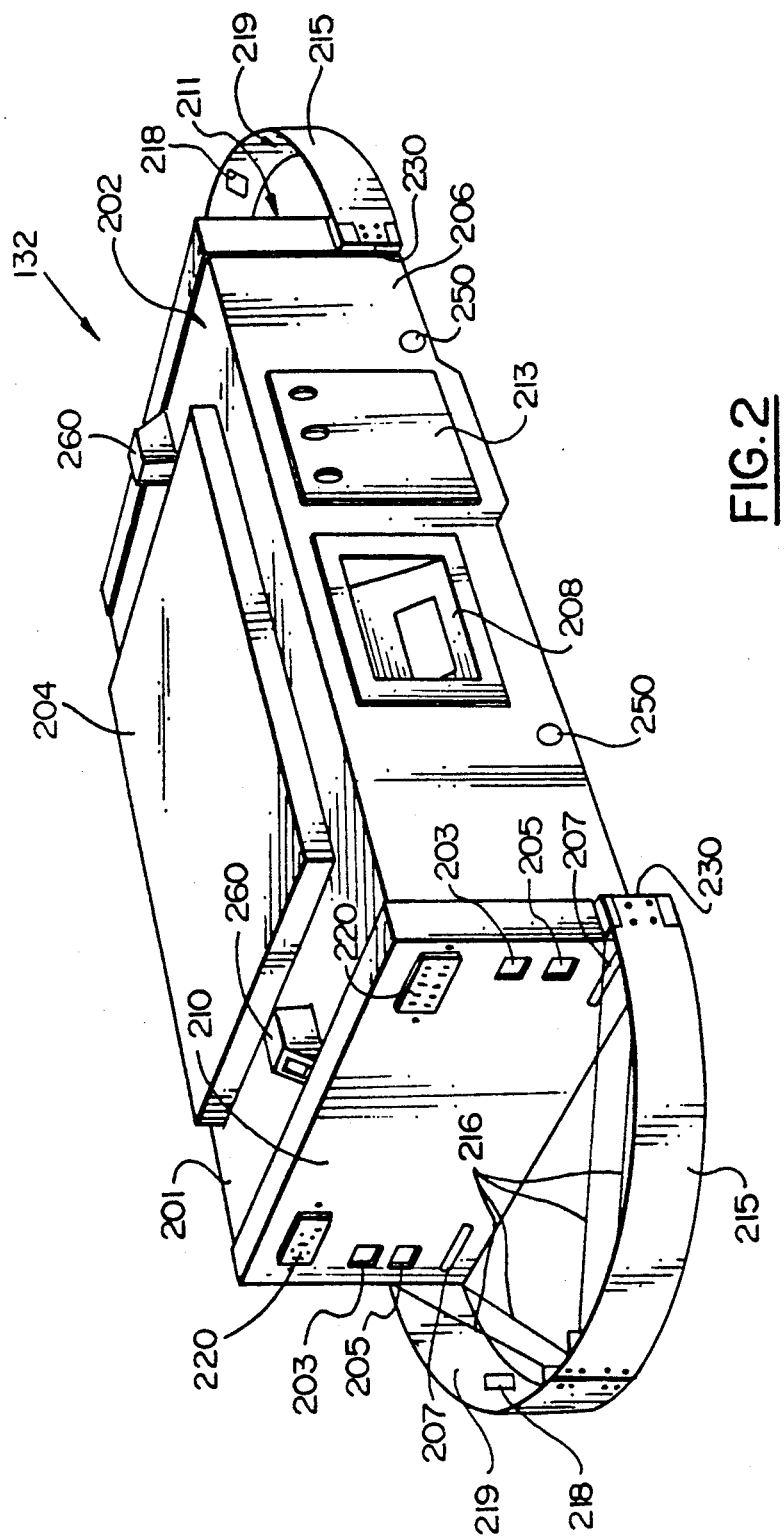
FIG. 2 is a perspective view of the AGV of this invention.
Figure 3:
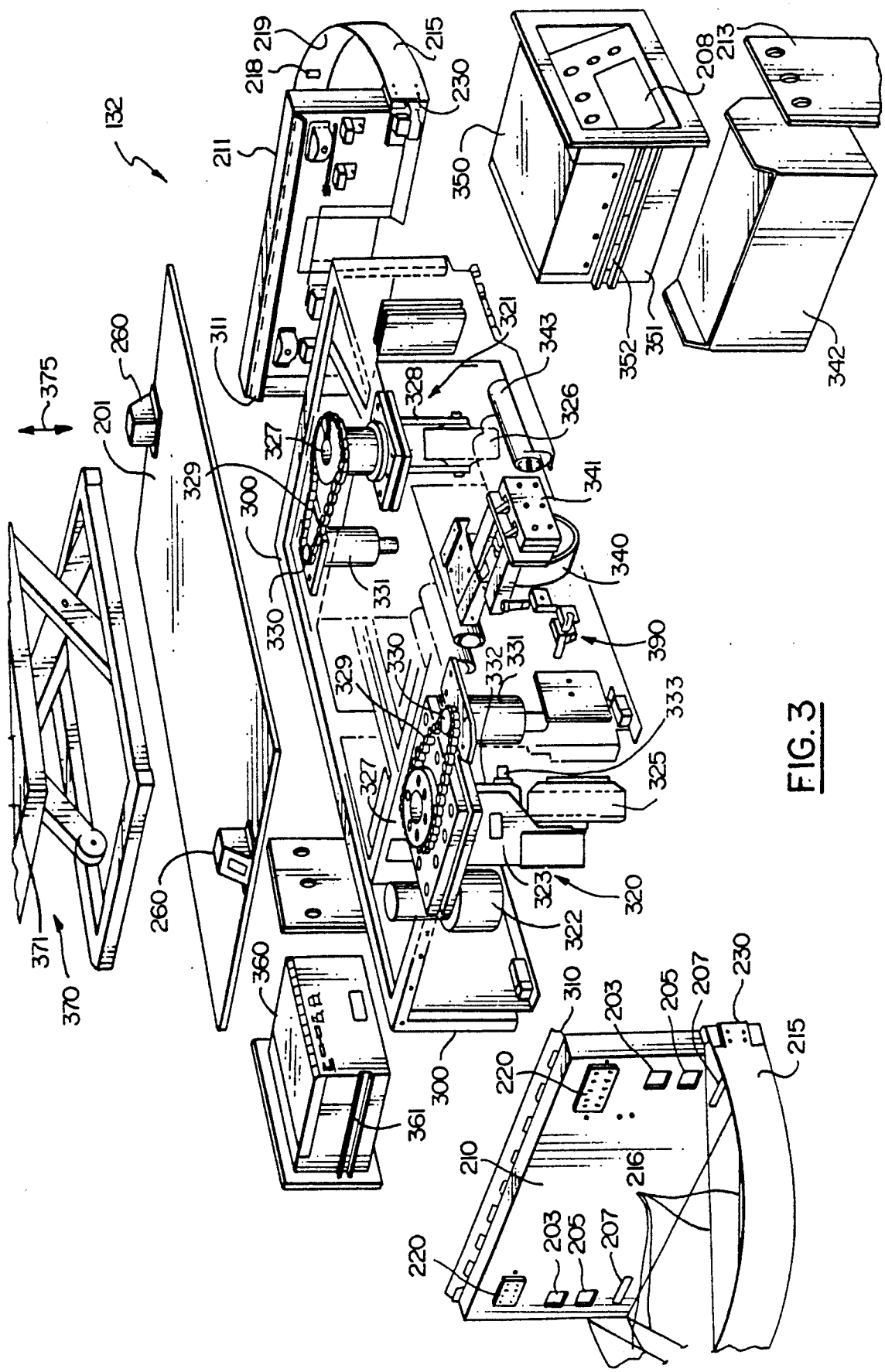
FIG. 3 is an exploded view of the AGV illustrated in FIG. 2.

Referring to FIG. 2, the automatic guidance vehicle (AGV) 132 of this invention is illustrated. The AGV comprises a rectangular housing 202 containing internal guidance and control mechanisms, which are shown in FIG. 3, and which will be explained in detail hereinafter.

On top 201 of housing 202 is disposed an expandable load-lifting table 204, that is capable of depositing or removing items from P & D stands.

On right side 206 of housing 202 is a display and control panel 208 for manual control and interrogation of the vehicle as will be explained in more detail, hereinafter.

On the front face 210 and rear face 211 of housing 202 are several sensors 203, 205 and 207, respectively, for determining obstructions in the travel path of vehicle. Sensors 203 are infrared light beam proximity sensors that detect a reflected beam from an object at a distance of six feet, and provide a signal to slow the vehicle to half speed.

Sensors 205 are similar to sensors 203 and cause the vehicle to come to a stop when an object is detected at a distance of three feet. Sensors 203 and 205 can be purchased from Opcon, Model Nos. 1355A or 1356A.

A flexible bumper band 215 is disposed at the front and rear of the vehicle, respectively. The flexible bumpers 215 are semi-circular in shape, and are supported by guy-wires 216.

When an object contacts either bumper sufficient to distort its semi-circular shape, sensors 207 detect the displacement and cut power to the drive system. This is achieved by means of reflective spots 218 that are disposed on the inside surface 219 and reflect the sensor beam from each bumper band 215 back to sensors 207. Sensors 207 can be purchased from OPCON, Model 1456A.

The headlights 220 disposed on front and rear surfaces 210 and 211, respectively, act to light the path of travel and also act as warning flashers when an obstacle is detected.

An easily removable panel 213 located on side 206 of housing 202 provides access to a battery pack that powers the vehicle 132. A similar panel is disposed on the other side of the AGV.

Sensor 260 (Opcon Model No. 1356A) mounted on top 201 of housing 202 (FRONT & REAR) sense when a cargo bay or stand is filled.

Sensors 230 (OPCON Models 1155A and 1255A) mounted at the base of bumpers 215 on either side, provide power interrupt signals when an object or foot brushes against right side 206 or its opposite side.

Sensors 250 (Opcon Model No. 1355A) mounted on the side 206 sense when the AGV has entered a cargo bay or stand.

Referring to FIG. 3, the AGV 132 is depicted in greater detail with the various component parts illustrated in exploded view. The AGV 132 is constructed upon a main frame 300 about which all the parts are easily accessible.

Front and rear sides 210 and 211, respectively are fashioned as hinged covers that articulate about hinges 310 and 311, respectively. Hinges 310 and 311 are secured to main frame 300. These hinged covers provide easy access to front and rear wheel assemblies 320 and 321, respectively. The front wheel 325 is a servo driven wheel, and movably powers the vehicle. [Its matching rear wheel 326 is not powered, and its steering mechanism is functionally and electrically independent with respect to front wheel 325.] The wheel 326 is directionally controlled by sprocket gear 327, which turns the idler caster housing 328. The front drive wheel 325 is supported in a SUMITOMO housing, Model No. C0303S, manufactured by Big Joe Manufacturing Co., and is also directionally controlled by a sprocket gear 327. Each sprocket gear 327 is rotated by sprocket chain 329, which is driven by cog 330. The cog 330 is powered by a servo motor 331.

The front wheel 325 is powered by drive motor 332. A tachometer 333 attached to motor 332 measures the number of revolutions, and in this way, the distance the vehicle travels is measured, since the diameter of wheel 325 is known.

The AGV 132 has a balance wheel 340 (only one shown here) on each side. An electromechanical brake 341 attached to wheel 340 causes the vehicle to stop, when the power is cut off.

The AGV 132 is powered by an easily accessible battery pack 342, which is accessible for maintenance purposes through side doors 213 on either side of the vehicle, as aforementioned.

The battery pack 342 is slidably removable from the vehicle by virtue of a deck of rollers 343 upon which the batter pack 342 is supported.

The AGV 132 is internally controlled by a computer 350, which is located behind the display and control panel 208. the computer 350, and its operation, will be described in more detail, hereinafter.

The computer 350 is housed in a slidable draw 351 which is easily accessed by virtue of slide rails 352, which allows the computer 350 to be removed from or repaired within the vehicle housing 202.

The power supplied by the battery pack 342 is distributed to the computer 350 and various drive and steering motors through a power supply module and isolation switches housed in slidable draw 360, having slide rails 361 to provide ease of access, as shown.

Mounted on the top plate 201 of AGV 132 is a hydraulically actuated lift mechanism 370, for pick-up and delivery of items in the warehouse in accordance with the system illustrated in FIG. 1.

The lift mechanism 370 comprises a lift table 371, which is caused to be raised or lowered (arrows 375) for contacting and removing items stored in cargo bays or cargo stands (not shown).

Figure 4:
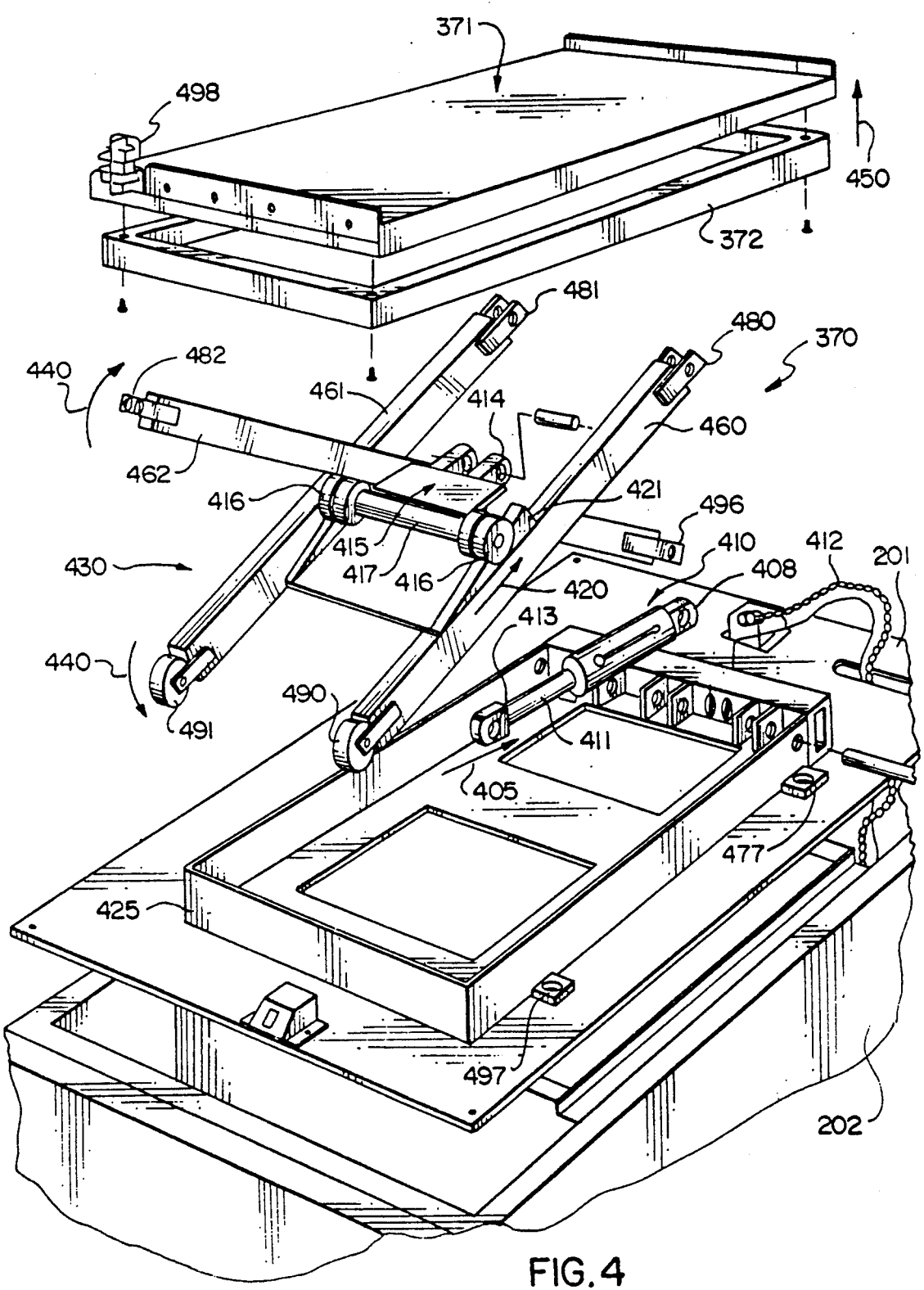
FIG. 4 is an exploded view of the load-lifting mechanism of the AGV shown in FIG. 3.

The lift mechanism 370 is shown in more detail in FIG. 4.

The lift mechanism 370 is actuated by a hydraulic cylinder and piston arrangement 410 which receives hydraulic fluid to retract piston rod 411 (arrow 405) through hydraulic line 412. The hydraulic fluid pump and reservoir 322 shown in FIG. 3 are disposed inside the vehicle housing 202.

The key 413 of piston rod 411 is rotatively secured to the lips 414 of the roller mechanism 415. The rollers 416 of roller mechanism 415 are free to rotate about shaft 417, and are caused to roll upwardly (arrow 420) along inclined plane 421 attached to one half of the cross-bars 430, when the piston rod 411 is retracted.

As the rollers 416 roll up the inclined plane 421, the cross-bars 430 are caused to expand (arrows 440), thus causing the lift table 371 to which it is secured, to rise (arrow 450).

When the lift table 371 is to be lowered, the procedure is reversed, and piston rod 411 is hydraulically allowed to return to its expanded rest position. The hydraulic cylinder 409 is rotatively secured to the top plate 201 of the AGV 132 about key 408. Arms 460, 461 and 462 of crossbars 372 of table 371 are rotatively secured at end fingers 480, 481 and 482, respectively.

The other end of bars 460 and 461 have rollers 490 and 491, that are caused to roll within frame 495 when the cross-bar mechanism 430 is actuated. Cross bar 462 is rotatively secured to the frame 495 at end 496.

Frame 495 is bolted to top 201 of the AGV 132 through bolt holes 497.

A reflective beam sensor (Opcon Model No. 1356A) 498 attached to table 371 provides a signal when table 371 is unloaded by reflecting and receiving a beam bounced off reflector 499 mounted at the opposite end of table 371. Absence of the reflected beam indicates a load has been placed on table 371.

The lift table 371 is just one of many mechanisms which can be supported or carried by the AGV 132.

For example, the lift table 371 may be replaced or used in conjunction with a robot arm for grasping, removing or placing items on the AGV 132.

Figure 4B:
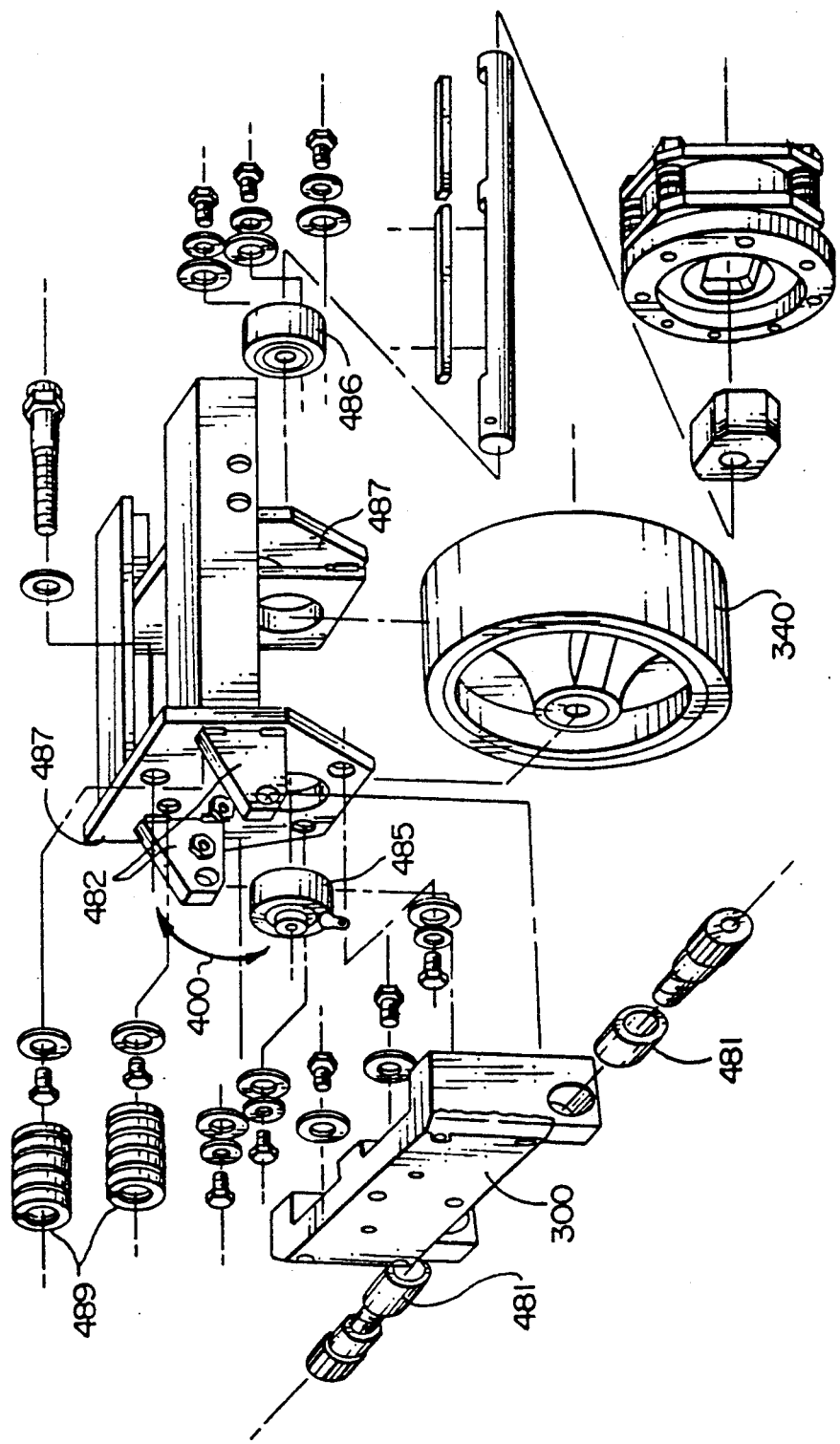
FIGS. 4a and 4b depict exploded views of the suspension system for the AGV illustrated in FIG. 2.
Figure 4A:
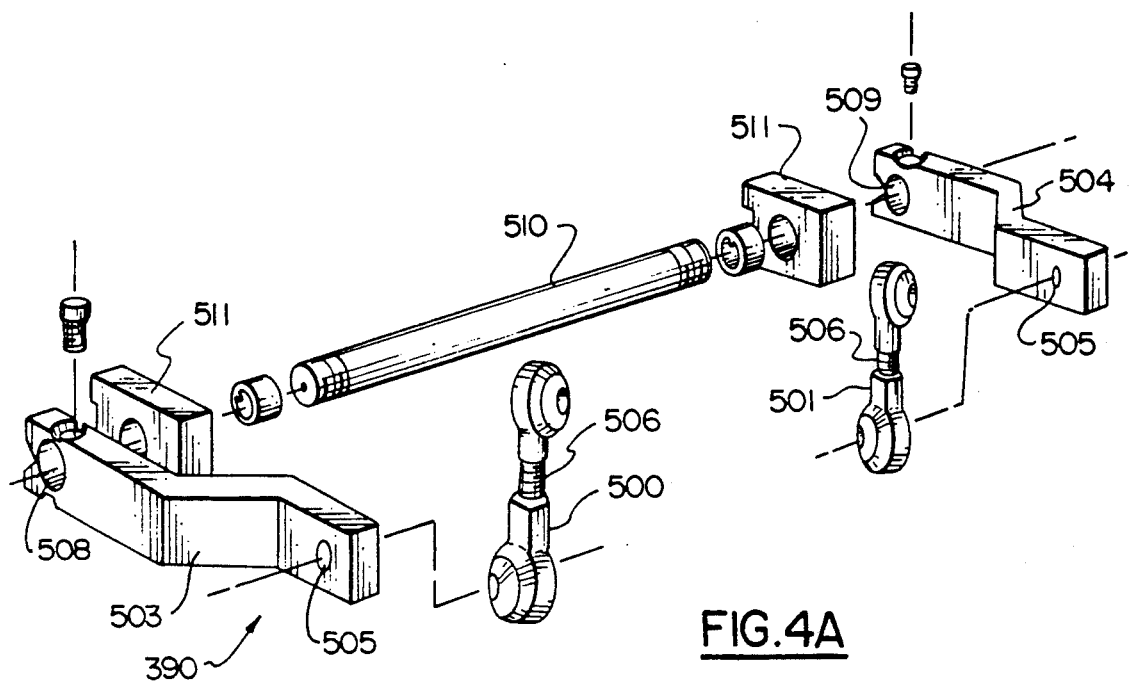

Referring to FIGS. 3, 4a and 4b, a unique suspension system of the AGV 132 will be explained.

The AGV 132 is driven by rotatively powering [front wheel] 325. This arrangement, however, causes a problem, which is uniquely solved by the vehicle suspension system.

The problem as experienced by the vehicle, occurs when the front wheel 325 runs over a lower level surface than is contacted by both side wheels 340 and rear wheel 326.

In this position, the front wheel 325 will immediately lose traction with the floor, because the weight of the vehicle is centered towards the back. The AGV will, therefore, become uncontrollable in a drivable sense.

In order to keep the front wheel 325 in continuous driving contact with the floor, the suspension system of the AGV provides an upward torque upon side wheels 340 via unique suspension linkage 390, which by equal and opposite reaction provides a down force on front wheel 325.

Each side wheel 340, typically shown in greater detail in FIG. 4b, is also provided with anti-sway capabilities by suspension 390, illustrated in greater detail in FIG. 4a.

Both side wheels 340 are each rotatively journalled to pivotable frame 487 via side journal bearings 485 and 486 disposed in the pivotal mounting frame 487, as depicted in the exploded view of FIG. 4b.

Mounting frame 487 is pivotally secured to mainframe 300 by means of bearings 481 which allow flanges 482 of frame 487 to pivot (arrows 400) with respect to main frame 300.

The pivotable frame 487 is pivotably biased toward the floor, and hence, the wheel 340 is also pivotably biased against the floor by a pair of coil springs 489.

The ball jointed rods 500 and 501, respectively secure each side wheel frame 487 to socket 505 of lever arms 503 and 504, respectively of the suspension mechanism illustrated in FIG. 4a.

The ball jointed rods 500 and 501 are each height adjustable by means of turnbuckles 506.

The lever arms 503 and 504 are torsionally coupled to each other, and hence, side wheels 340 are torsionally coupled to each other, by means of the torsion rod 510, that rotatively anchors to frame 30 via flanges 511 and connects to each lever arm 503 and 504 within socket holes 508 and 509, respectively.

Torsionally coupling the wheels 340 in this manner creates an upward force on both wheels 340 when front drive wheel 325 moves over a lower surface.

The torsional coupling also creates an equal and opposite force on the opposite side wheel 340 every time one of the side wheels rolls over a bump or hole in the roadway. This equal and opposite force produces an anti-sway condition that reduces side roll effects.

Figure 5A:
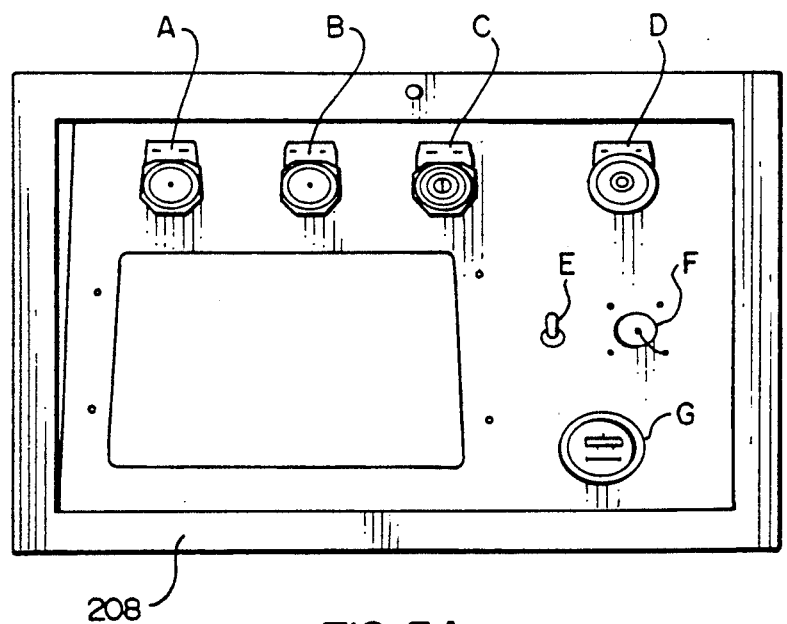
FIG. 5a is a plan view of a display and control panel disposed on the right side of the AGV shown in FIG. 2.
Figure 5B:
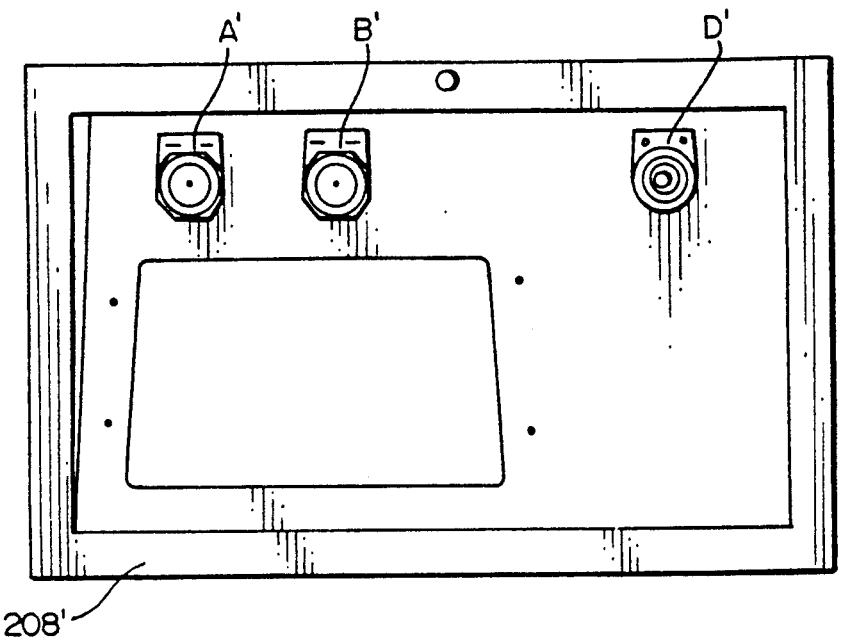
FIG. 5b is a plan view of a second control panel disposed on an opposite side of the AGV depicted in FIG. 2.

Referring to FIG. 5a, the control and display panel 208 is shown in greater detail. The control and display panel 208 mounted on the right side of the vehicle features a switch E for changing the AGV 132 from automatic to manual control. A hand-held control wand or manual controller 600, which will be described in greater detail with reference to FIGS. 6a through 6d, is plugged into socket F, when it is desired to control the vehicle manually, or to alternately interrogate the vehicle, as will be described in more detail hereinafter.

A visual indication of the remaining operating time or power of the battery pack 342 (FIG. 3) can be continuously obtained in either automatic or manual modes by reference to electronic indicator gauge G.

Switch A is an interrupt switch for stopping the AGV by means of an interrupt program in the internal computer 350.

The start switch B overrides the interrupt of switch A, and reactivates the vehicle.

Switch C is an ignition switch that supplies power to the AGV via battery pack 342.

Switch D is an emergency switch that cuts off power to the vehicle motor and steering systems, but maintains power to the computer 350.

The display H provides a visual screen for interrogating the vehicle by various program menus, as will be explained hereinafter.

A control panel 208' is disposed on the left side of the AGV, opposite side 206.

The panel 208' has switches A', B' and C', that perform the same function as switches A, B and C on panel 208.

The panel 208' is convenient to stop the vehicle if an operator is on the opposite side of the vehicle.

Referring now to hand-held wand 600 that plugs into socket F of panel 208 (FIG. 5a), it will be observed that FIGS. 6a through 6d depict the four faces of a generally rectangular wand. While a preferred embodiment of the wand switches is herein disclosed, it is to be understood that other switch configurations and corresponding functions can also be used, as is well known in the art of manual controllers.

Figure 6A:
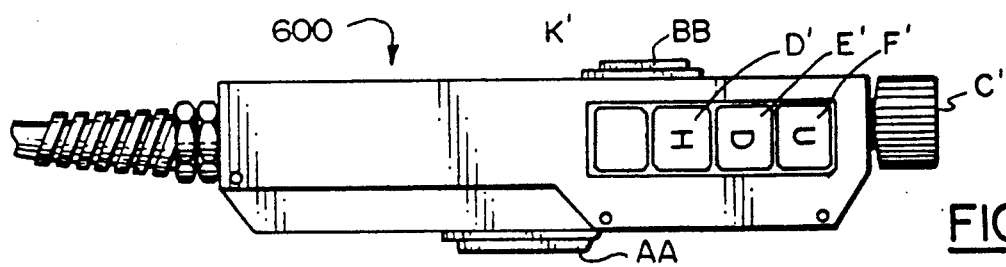
FIGS. 6a-6d are plan views of the various sides of a hand-held control wand that plugs into the control panel shown in FIG. 5a, which is used to manually control and interrogate the AGV.
Figure 6B:
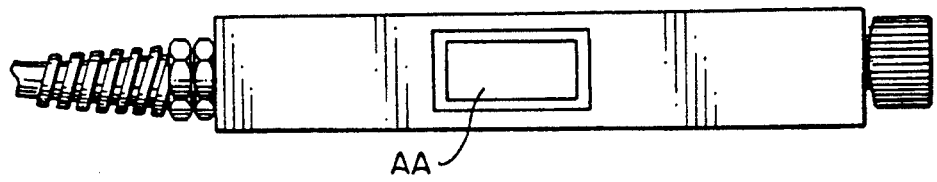
Figure 6C:
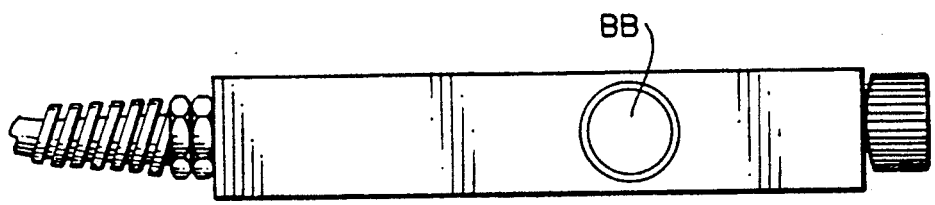

FIG. 6c depicts an emergency switch BB that interrupts the power to the vehicle. It is a double-throw switch that must be pressed again to restart the AGV.

FIG. 6b depicts a spring loaded deadman switch AA, which must be continuously pressed in order to actuate the other switches on the wand.

Figure 6D:
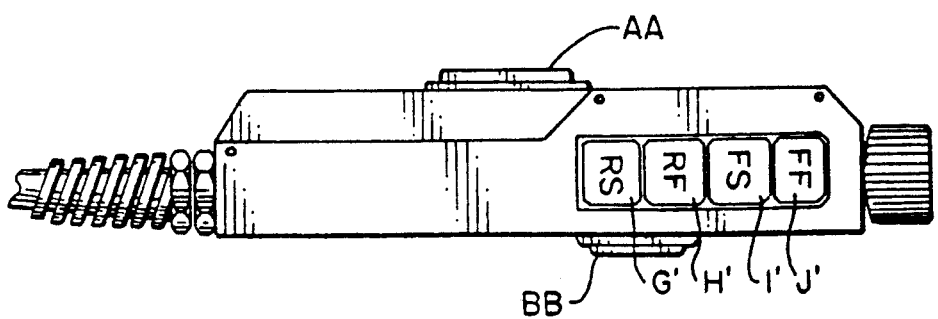

FIG. 6d illustrates switches G', H', I' and J' that manually control the speed and direction of the vehicle. Switch G' controls the vehicle by commanding a slow speed to the rear. Switch H' is for a fast rear control. Switch I' is a slow forward command, and switch J' is for fast forward.

Referring to FIG. 6a, switch F' controls the raising of the lift table 371 (FIG. 3).

Likewise, switch E' commands the lift table 371 of the vehicle to descend.

Switch D' sets the brake 341 (FIG. 3) of the vehicle.

Switch K' is for interrogating the AGV via display H (FIG. 5a).

Potentiometer C' is used to walk the user through the displayed menus.

AGV 132 is capable of operating in either of two modes: automatic and manual. Switch E of the display and control panel 208 (FIG. 5a) is used to toggle between automatic and manual mode. In automatic mode, the AGV performs tasks it has been assigned providing an alphanumeric readout of its assignments on its interactive display 208.

AGV 132 receives its assignment from either LAC 116 when the AGV system 114 is configured as an LAC system; or by program menus available through placing AGV 132 in manual mode and using the manual controller 600 (FIG. 6) to access the menus, when the AGV system 114 is configured as a stand alone system (SAS).

When AGVs 114 is configured as an SAS, HD 117 and host computer 112 can be eliminated.

In manual mode the operator has control of AGV 132. The options available to the operator at this point are to drive AGV 132 manually or to enter the off-line diagnostic mode.

Within the drive mode of operation, AGV 132 can operate manually, by means of the manual controller; or semi-automatically, by means of the inductive wire in combination with the manual controller.

Within the diagnostic mode, menus are used in combination with the manual controller to monitor status of AGV 132. For purposes of this description, certain sample menus are disclosed as examples hereinbelow, but other diagnostic menus can also be used, depending upon the specific AGV and facilities configuration, without departing from the scope of the present invention.

The main diagnostic menu is shown as Example 1.0.

EXAMPLE 1.0: MAIN DIAGNOSTIC MENU

AGV DIAGNOSTICS

WHS ROBOTICS, Inc.

VEHICLE ID# 3

MENUS:
1. INSTRUCTIONS
2. DISPLAY DIGITAL INPUTS
3. TEST ANALOG INPUTS
4. INTERACTIVE SYSTEM TESTS

USE STEERING POT TO DIAL A MENU

When INSTRUCTIONS is selected from the main diagnostic menu by the manual controller, the sub-menu shown as Example 2.1 is displayed.

EXAMPLE 2.1: INSTRUCTIONS

| HOW TO USE DIAGNOSTICS: |
|---|
| PUSH THE ENTER BUTTON ON THE OPERATOR INTERFACE (OIM) TO ACTIVATE THE MENU PUSH LIFT AND LOWER TOGETHER TO EXIT THE MENU USE STEERING POT TO DIAL A MENU |

When DISPLAY DIGITAL INPUTS is selected from the main diagnostic menu by the manual controller, the sub-menu shown as Example 2.2 is displayed.

EXAMPLE 2.2: DISPLAY DIGITAL INPUTS

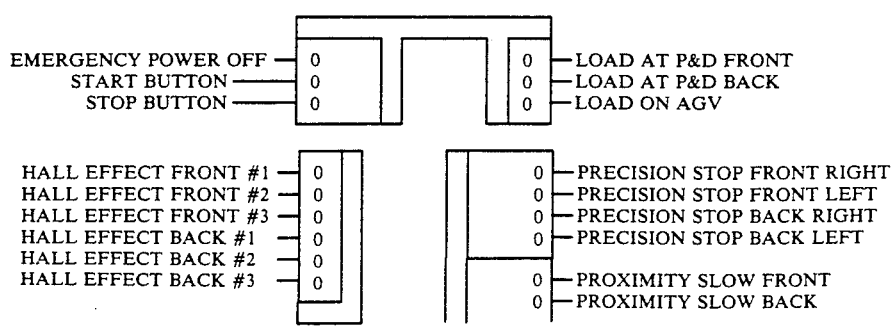

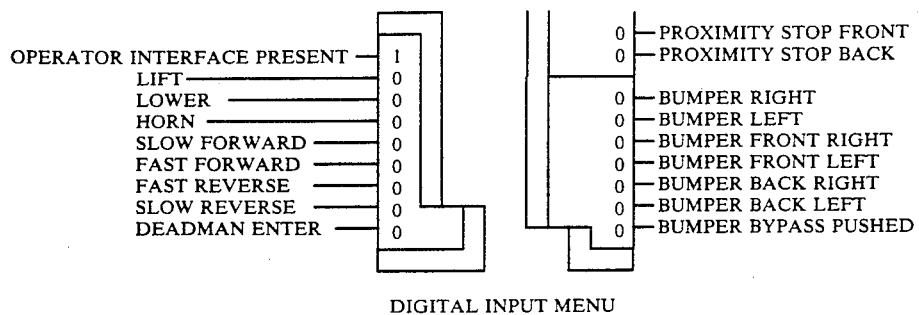

DIGITAL INPUT MENU

When TEST ANALOG INPUTS is selected from the main diagnostic menu by the manual controller, the sub-menu shown as Example 2.3 is displayed.

EXAMPLE 2.3: TEST ANALOG INPUTS

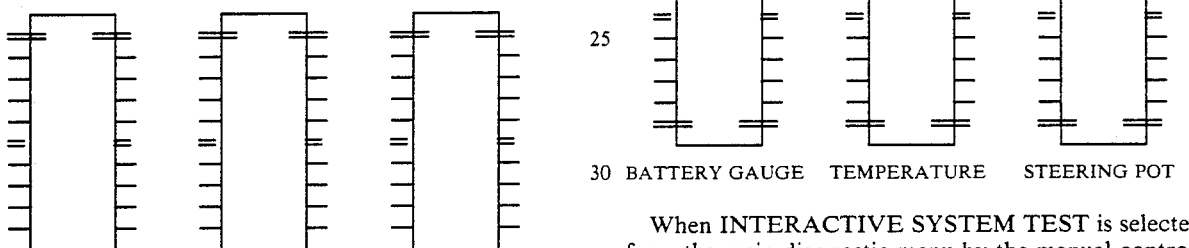

BATTERY GAUGE    TEMPERATURE    STEERING POT

When INTERACTIVE SYSTEM TEST is selected from the main diagnostic menu by the manual controller, the sub-menu shown as Example 2.4 is displayed.

EXAMPLE 2.4: INTERACTIVE SYSTEM TEST

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A Test | Choice 25 | Choice 45 |
| PPI 2 Port B Test | Choice 26 | Choice 46 |
| PPI 2 Port C Test | Choice 27 | Choice 47 |
| PPI 3 Port C Test | Choice 28 | Choice 48 |
| PPI 5 Port B Test | Choice 29 | Choice 49 |
| PPI 5 Port C Test | Choice 30 | Choice 50 |
| Monitor Traffic Freq. | Choice 31 | Choice 51 |
| Test WASPOT | Choice 32 | Choice 52 |
| Test Wheel Tach. | Choice 33 | Choice 53 |
| Test Guidance Assy. | Choice 34 | Choice 54 |
| Calculate Truck Speed | Choice 35 | Choice 55 |
| Calibrate Truck Optics | Choice 36 | Choice 56 |
| Graph WASPOT Response | Choice 37 | Choice 57 |
| Monitor Guidance Freq. | Choice 38 | Choice 58 |
| Test Traffic Xmit. | Choice 39 | Choice 59 |
| Sniff Floor Config. | Choice 40 | Choice 60 |

When TEST/ADJUST VOLUME is selected from the INTERACTIVE SYSTEM TEST sub-menu by the manual controller, the next menu display is shown as Example 2.4.1.

EXAMPLE 2.4.1: TEST/ADJUST VOLUME

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A Test | Choice 25 | Choice 45 |
| PPI 2 Port B Test | Choice 26 | Choice 46 |
| PPI 2 Port C Test | Choice 27 | Choice 47 |
| PPI 3 Port C Test | Choice 28 | Choice 48 |
| PPI 5 Port B Test | Choice 29 | Choice 49 |

Use the pot on the Manual Controller to adjust the volume.
The volume that you select will be used by the truck to generate the audio warning while the truck is running.
Press the HORN button to return to previous menu.

| Monitor Guidance Freq. | Choice 38 | Choice 58 |
| Test Traffic Xmit. | Choice 39 | Choice 59 |
| Sniff Floor Config. | Choice 40 | Choice 60 |

When TEST PITCH CONTROL is selected from the INTERACTIVE SYSTEM TEST sub-menu by the manual controller, the next menu displayed is shown as Example 2.4.2.

EXAMPLE 2.4.2: TEST PITCH CONTROL

When PPI 1 PORT A TEST is selected from the INTERACTIVE SYSTEM TEST sub-menu by the manual controller, the next menu displayed is shown as Example 2.4.3.

EXAMPLE 2.4.3: PPI 1 PORT A TEST

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A Test | Choice 25 | Choice 45 |
| PPI 2 Port B Test | Choice 26 | Choice 46 |
| PPI 2 Port C Test | Choice 27 | Choice 47 |
| PPI 3 Port C Test | Choice 28 | Choice 48 |
| PPI 5 Port B Test | Choice 29 | Choice 49 |
| PPI 5 Port C Test | Choice 30 | Choice 50 |
| Monitor Traffic Freq. | Choice 31 | Choice 51 |

Use the pot on the Manual Controller to adjust the pitch.
Press the HORN button to return to previous menu.

| Monitor Guidance Freq. | Choice 38 | Choice 58 |
| Test Traffic Xmit. | Choice 39 | Choice 59 |
| Sniff Floor Config. | Choice 40 | Choice 60 |

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A T | | |
| PPI 2 Port B T | Use the pot on the Manual Controller | |
| PPI 2 Port C T | to select bit to activate. | |
| PPI 3 Port C T | Press the BLUE BUTTON on the Manual Controller | |
| PPI 5 Port B T | to toggle the Main Contactor. | |
| PPI 5 Port C T | Press the HORN button to return to previous menu. | |
| Monitor Traffi | | |

-continued

```
Test WASPOT      | Traction Enable Back
Test Wheel Tac   | Reverse Contactor Back
Test Guidance    | Forward Contactor Back    EPO
Calculate  Truc  | Proximity Power Front
Calibrate  Truc  | Reverse Contactor Front   MAIN CONTACTOR
Graph WASPOT R   | Forward Contactor Front
Monitor   Guidan | Steering Disengage Front
Test  Traffic  X | Traction Enable Front
Sniff  Floor  Co |
```

When PPI 1 PORT B TEST is selected from the INTERACTIVE SYSTEM TEST sub-menu by the manual controller, the next menu displayed is shown as Example 2.4.4.

EXAMPLE 2.4.4: PPI 1 PORT B TEST manual controller, the next menu displayed is shown as Example 2.4.5.

EXAMPLE 2.4.5: PPI 2 PORT A TEST

```
Twist MC to move.        | Interactive Menu |     Deadman selects test.

Test/Adjust Volume   | Test Lift/Lower Deck  | Choice 41
Test Pitch Control   | Test P&D Stand.       | Choice 42
PPI 1 Port A Test    | Choice 23             | Choice 43
PPI 1 Port B Test    | Choice 24             | Choice 44
PPI 2 Port A T
PPI 2 Port B T   Use the pot on the Manual Controller
PPI 2 Port C T       to select bit to activate.
PPI 3 Port C T   Press the BLUE BUTTON on the Manual Controller
PPI 5 Port B T       to toggle the Main Contactor.
PPI 5 Port C T   Press the HORN button to return to previous menu.
Monitor   Traffi Test WASPOT       | Brake Off
Test Wheel Tac    | Light Back Right
Test Guidance     | Light Back Left         EPO
Calculate  Truc   | Light Front Right
Calibrate  Truc   | Light Front Left        MAIN CONTACTOR
Graph WASPOT R    | Retro Rocket
Monitor   Guidan  | Main Contactor
Test  Traffic  X  | Parking Brake Enable
Sniff  Floor  Co
```

When PPI 2 PORT B TEST is selected from the INTERACTIVE SYSTEM TEST sub-menu by the

```
Twist MC to move.        | Interactive Menu |     Deadman selects test.

Test/Adjust Volume   | Test Lift/Lower Deck  | Choice 41
Test Pitch Control   | Test P&D Stand.       | Choice 42
PPI 1 Port A Test    | Choice 23             | Choice 43
PPI 1 Port B Test    | Choice 24             | Choice 44
PPI 2 Port A T
PPI 2 Port B T   Use the pot on the Manual Controller
PPI 2 Port C T       to select bit to activate.
PPI 3 Port C T   Press the BLUE BUTTON on the Manual Controller
PPI 5 Port B T       to toggle the Main Contactor.
PPI 5 Port C T   Press the HORN button to return to previous menu.
Monitor   Traffi Test WASPOT       | Precision Stop Power BR
Test Wheel Tac    | Precision Stop Power BL
Test Guidance     | Proximity Stop Forward     EPO
Calculate  Truc   | Proximity Optic OFF Test
Calibrate  Truc   | Proximity Slow Forward     MAIN CONTACTOR
Graph WASPOT R    | Proximity Optic ON Test
Monitor   Guidan  | Proximity Power Back
Test  Traffic  X  | Steering Disengage Back
Sniff  Floor  Co
```

When PPI 2 PORT A TEST is selected from the INTERACTIVE SYSTEM TEST sub-menu by the manual controller, the next menu displayed is shown as Example 2.4.6.

EXAMPLE 2.4.6: PPI 2 PORT B TEST

```
Twist MC to move.        | Interactive Menu |      Deadman selects test.

Test/Adjust Volume       Test Lift/Lower Deck        Choice 41
Test Pitch Control       Test P&D Stand.             Choice 42
PPI 1 Port A Test        Choice 23                   Choice 43
PPI 1 Port B Test        Choice 24                   Choice 44
PPI 2 Port A T
PPI 2 Port B T    Use the pot on the Manual Controller
PPI 2 Port C T        to select bit to activate.
PPI 3 Port C T    Press the BLUE BUTTON on the Manual Controller
PPI 5 Port B T        to toggle the Main Contactor.
PPI 5 Port C T    Press the HORN button to return to previous menu.
Monitor     Traffi Test WASPOT              Load at P&D Optic PWR
Test Wheel Tac           Bumper Power
Test Guidance            Precision Stop Power FR        EPO
Calculate   Truc         Precision Stop Power FL
Calibrate   Truc         Mag Semaphore Back 2    MAIN CONTACTOR
Graph WASPOT R           Mag Semaphore Back 1
Monitor    Guidan        Mag Semaphore Front 2
Test  Traffic  X         Mag Semaphore Front 1
Sniff  Floor  Co
```

When PPI 2 PORT C TEST is selected from the INTERACTIVE SYSTEM TEST sub-menu by the manual controller, the next menu displayed is shown as Example 2.4.7.

When PPI 3 PORT C TEST is selected from the INTERACTIVE SYSTEM TEST sub-menu by the manual controller, the next menu displayed is shown as Example 2.4.8.

EXAMPLE 2.4.7: PPI 2 PORT C TEST

EXAMPLE 2.4.8: PPI 3 PORT C TEST

```
Twist MC to move.        | Interactive Menu |      Deadman selects test.

Test/Adjust Volume       Test Lift/Lower Deck        Choice 41
Test Pitch Control       Test P&D Stand.             Choice 42
PPI 1 Port A Test        Choice 23                   Choice 43
PPI 1 Port B Test        Choice 24                   Choice 44
PPI 2 Port A T
PPI 2 Port B T    Use the pot on the Manual Controller
PPI 2 Port C T        to select bit to activate.
PPI 3 Port C T    Press the BLUE BUTTON on the Manual Controller
PPI 5 Port B T        to toggle the Main Contactor.
PPI 5 Port C T    Press the HORN button to return to previous menu.
Monitor     Traffi Test WASPOT              Manual Steering
Test Wheel Tac           Guidance Select Front
Test Guidance            Horn Enable                    EPO
Calculate   Truc         Auto Steering
Calibrate   Truc         Traffic Freq 3 Enable   MAIN CONTACTOR
Graph WASPOT R           Traffic Freq 2 Enable
Monitor    Guidan        Traffic Freq 1 Disable
Test  Traffic  X         Watchdog Refresh
Sniff  Floor  Co
```

```
Twist MC to move.        | Interactive Menu |      Deadman selects test.

Test/Adjust Volume       Test Lift/Lower Deck        Choice 41
Test Pitch Control       Test P&D Stand.             Choice 42
PPI 1 Port A Test        Choice 23                   Choice 43
PPI 1 Port B Test        Choice 24                   Choice 44
PPI 2 Port A T
PPI 2 Port B T    Use the pot on the Manual Controller
PPI 2 Port C T        to select bit to activate.
PPI 3 Port C T    Press the BLUE BUTTON on the Manual Controller
PPI 5 Port B T        to toggle the Main Contactor.
PPI 5 Port C T    Press the HORN button to return to previous menu.
Monitor     Traffi
```

-continued

```
Test WASPOT
Test  Wheel  Tac     SC 3 Test Output
Test Guidance        Lower Enable              EPO
Calculate    Truc    Lift Enable
Calibrate    Truc                        MAIN CONTACTOR
Graph WASPOT R
Monitor      Guidan
Test    Traffic   X
Sniff   Floor    Co
```

When PPI 5 PORT B TEST is selected from the INTERACTIVE SYSTEM TEST sub-menu by the manual controller, the next menu displayed is shown as EXAMPLE 2.4.9.

manual controller, the next menu display is shown as Example 2.4.10.

EXAMPLE 2.4.10: PPI 5 PORT C TEST

```
Twist MC to move.       | Interactive Menu |    Deadman selects test.

Test/Adjust Volume       Test Lift/Lower Deck    Choice 41
Test Pitch Control       Test P&D Stand.         Choice 42
PPI 1  Port A  Test      Choice 23               Choice 43
PPI 1  Port B  Test      Choice 24               Choice 44
PPI 2  Port A  T
PPI 2  Port B  T   Use the pot on the Manual Controller
PPI 2  Port C  T        to select bit to activate.
PPI 3  Port C  T   Press the BLUE BUTTON on the Manual Controller
PPI 5  Port B  T        to toggle the Main Contactor.
PPI 5  Port C  T   Press the HORN button to return to previous menu.
Monitor    Traffi Test WASPOT              Traffic Trans Disable B
Test  Wheel  Tac         Traffic Trans Disable F
Test Guidance                                    EPO
Calculate    Truc
Calibrate    Truc                        MAIN CONTACTOR
Graph WASPOT R
Monitor      Guidan
Test    Traffic   X
Sniff   Floor    Co
```

EXAMPLE 2.4.9: PPI 5 PORT B TEST

When MONITOR TRAFFIC FREQ. is selected from the INTERACTIVE SYSTEM TEST sub-menu

```
Twist MC to move.       | Interactive Menu |    Deadman selects test.

Test/Adjust Volume       Test Lift/Lower Deck    Choice 41
Test Pitch Control       Test P&D Stand.         Choice 42
PPI 1  Port A  Test      Choice 23               Choice 43
PPI 1  Port B  Test      Choice 24               Choice 44
PPI 2  Port A  T
PPI 2  Port B  T   Use the pot on the Manual Controller
PPI 2  Port C  T        to select bit to activate.
PPI 3  Port C  T   Press the BLUE BUTTON on the Manual Controller
PPI 5  Port B  T        to toggle the Main Contactor.
PPI 5  Port C  T   Press the HORN button to return to previous menu.
Monitor    Traffi Test WASPOT              SC 5 Test Output
Test  Wheel  Tac
Test Guidance                                    EPO
Calculate    Truc
Calibrate    Truc                        MAIN CONTACTOR
Graph WASPOT R
Monitor      Guidan
Test    Traffic   X
Sniff   Floor    Co
```

When PPI 5 PORT C TEST is selected from the INTERACTIVE SYSTEM TEST sub-menu by the by the manual controller, the next menu displayed is shown as Example 2.4.11.

EXAMPLE 2.4.11: MONITOR TRAFFIC FREQ.

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A Test | Choice 25 | Choice 45 |
| PPI 2 Port B Test | Choice 26 | Choice 46 |
| PPI 2 Port C Test | Choice 27 | Choice 47 |
| PPI 3 Port C Test | Choice 28 | Choice 48 |
| PPI 5 Port B Test | Choice 29 | Choice 49 |
| PPI 5 Port C Test | Choice 30 | Choice 50 |

| | | |
|---|---|---|
| Monitor Traffi | | |
| Test WASPOT | Press the HORN button to return to previous menu. | |
| Test Wheel Tac | TRAFFIC 1    TRAFFIC 2    TRAFFIC 3 | |
| Test Guidance | | |
| Calculate Truck Speed | Choice 35 | Choice 55 |
| Calibrate Truck Optics | Choice 36 | Choice 56 |
| Graph WASPOT Response | Choice 37 | Choice 57 |
| Monitor Guidance Freq. | Choice 38 | Choice 58 |
| Test Traffic Xmit. | Choice 39 | Choice 59 |
| Sniff Floor Config. | Choice 40 | Choice 60 |

When TEST WASPOT is selected from the INTERACTIVE SYSTEM TEST sub-menu by the manual controller, the next menu displayed is shown as Example 2.4.12.

EXAMPLE 2.4.12: TEST WASPOT

When TEST WHEEL TACH. is selected from the INTERACTIVE SYSTEM TEST sub-menu by the manual controller, the next menu displayed is shown as Example 2.4.13.

EXAMPLE 2.4.13: TEST WHEEL TACH.

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A Test | Choice 25 | Choice 45 |
| PPI 2 Port B Test | Choice 26 | Choice 46 |
| PPI 2 Port C Test | Choice 27 | Choice 47 |
| PPI 3 Port C Test | Choice 28 | Choice 48 |
| PPI 5 Port B Test | Choice 29 | Choice 49 |

Press the BLUE BUTTON on the Manual Controller
   to toggle between the front servo and rear servo
Press the DEAD_MAN button to start the WASPOT test.
Press the LIFT button to toggle manual control. This stops testing.
Press the HORN button to return to previous menu.

Manual Control      Active Wheel: <=—  Angle:

| Twist MC to move. | Interactive Menu | Deadman selects test. |
|---|---|---|

Use the pot on the Manual Controller to steer the AGV.
Hold the DEADMAN switch to move forward.
Press the LIFT button to reset the "Distance Traveled" to zero.
Press the LOWER button to begin testing over a measured distance.
   To do the test, there must be two reflectors placed a measured
   distance appart. These reflectors must be visible to the precision
   stop optics on the right side. When the test is started, the truck
   will pull forward until it sees the first reflector. Then the
   Distance Counter will be reset. The AGV will move forward until it
   finds a second reflector. At this time the user can read the
   distance between the reflectors.
Press the HORN button to return to previous menu.

Distance Traveled:

-continued

| | | |
|---|---|---|
| Graph WASPOT Response | Choice 37 | Choice 57 |
| Monitor Guidance Freq. | Choice 38 | Choice 58 |
| Test Traffic Xmit. | Choice 39 | Choice 59 |
| Sniff Floor Config. | Choice 40 | Choice 60 |

When TEST GUIDANCE ASSY. is selected from the INTERACTIVE SYSTEM TEST sub-menu by the manual controller, the next menu displayed is shown as Example 2.4.14.

EXAMPLE 2.4.14: TEST GUIDANCE ASSY.

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |

Use the LIFT button to switch between Manual and Auto steering.
Use the BLUE button to switch between Front and Rear steering.
Press the HORN button to return to previous menu.

AUTO STEER   MANUAL STEER   Active Wheel: <=—

| | | |
|---|---|---|
| Test WASPOT | Choice 32 | Choice 52 |
| Test Wheel Tach. | Choice 33 | Choice 53 |
| Test Guidance Assy. | Choice 34 | Choice 54 |
| Calculate Truck Speed | Choice 35 | Choice 55 |
| Calibrate Truck Optics | Choice 36 | Choice 56 |
| Graph WASPOT Response | Choice 37 | Choice 57 |
| Monitor Guidance Freq. | Choice 38 | Choice 58 |
| Test Traffic Xmit. | Choice 39 | Choice 59 |
| Sniff Floor Config. | Choice 40 | Choice 60 |

When CALCULATE TRUCK SPEED is selected from the INTERACTIVE SYSTEM TEST sub-menu by the manual controller, the next menu displayed is shown as Example 2.4.15.

EXAMPLE 2.4.15: CALCULATE TRUCK SPEED

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A Test | Choice 25 | Choice 45 |
| PPI 2 Port B Test | Choice 26 | Choice 46 |
| PPI 2 Port C Test | Choice 27 | Choice 47 |

Use the pot on the Manual Controller to control truck velocity.
Hold the DEADMAN switch to allow the truck to move.
The truck must be on the wire for this test to work properly.
Press the HORN button to return to previous menu.

Pulse/s=       ft/m=        Traction value=

| | | |
|---|---|---|
| Calibrate Truck Optics | Choice 36 | Choice 56 |
| Graph WASPOT Response | Choice 37 | Choice 57 |
| Monitor Guidance Freq. | Choice 38 | Choice 58 |
| Test Traffic Xmit. | Choice 39 | Choice 59 |
| Sniff Floor Config. | Choice 40 | Choice 60 |

When CALIBRATE TRUCK OPTICS is selected from the INTERACTIVE SYSTEM TEST sub-menu by the manual controller, the next menu displayed is shown as Example 2.4.16.

EXAMPLE 2.4.16: CALIBRATE TRUCK OPTICS

Use the pot on the Manual Controller to select which sensor to adjust.
Hold the DEADMAN switch to move the truck. While the DEADMAN switch is held, the Manual Controller will steer the truck.
Use either Forward button to move the truck forward.
Use either Reverse button to move the truck backward.
When the selected optic is triggered, the truck will stop.
The BLUE button is the optic bypass. When pressed, the truck will be able to move and will sound a tone while the optic is triggered.
Press the HORN button to return to previous menu.

-continued

```
    Load on AGV
    Load at PD Back
    Load at PD Front
    Precision Stop FR
    Precision Stop FL
    Precision Stop BR
    Precision Stop BL
    Proximity Stop B
    Proximity Slow B
    Proximity Stop F
    Proximity Slow F
```

When GRAPH WASPOT RESPONSE is selected from the INTERACTIVE SYSTEM TEST sub-menu by the manual controller, the next menu displayed is shown as Example 2.4.17.

by the manual controller, the next menu displayed is shown as Example 2.4.18.

EXAMPLE 2.4.18: MONITOR GUIDANCE FREQ.

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |
| PPI 2 Port A Test | Choice 25 | Choice 45 |
| PPI 2 Port B Test | Choice 26 | Choice 46 |
| PPI 2 Port C Test | Choice 27 | Choice 47 |
| PPI 3 Port C Test | Choice 28 | Choice 48 |
| PPI 5 Port B Test | Choice 29 | Choice 49 |
| PPI 5 Port C Test | Choice 30 | Choice 50 |
| Monitor Traffic Freq. | Choice 31 | Choice 51 |

```
Press the HORN button to return to previous menu.

FRONT FREQ   : F1  F2  F3  F4
CENTER FREQ  : F1  F2  F3  F4
REAR FREQ    : F1  F2  F3  F4
```

| Test Traffic Xmit. | Choice 39 | Choice 59 |
|---|---|---|
| Sniff Floor Config. | Choice 40 | Choice 60 |

EXAMPLE 2.4.17: GRAPH WASPOT RESPONSE

When TEST TRAFFIC XMIT. is selected from the INTERACTIVE SYSTEM TEST sub-menu by the

```
Press the Deadman switch to move wheel and calculate graph of movement.
Press the BLUE button to switch the wheel under test.
Press the LIFT button to switch test range. Press HORN to exit Testing Wheel: <=—   Testing Range:
```

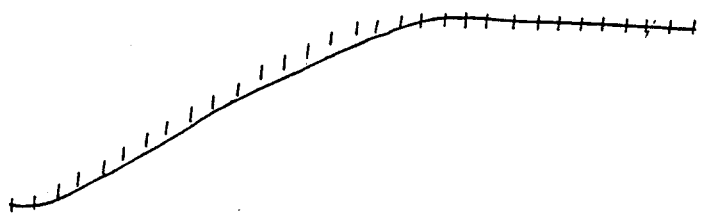

When MONITOR GUIDANCE FREQ. is selected from the INTERACTIVE SYSTEM TEST sub-menu manual controller, the next menu display is shown as Example 2.4.19.

EXAMPLE 2.4.19: TEST TRAFFIC XMIT.

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |
| PPI 1 Port B Test | Choice 24 | Choice 44 |

Use the FAST FORWARD button to enable traffic freq 1
Use the CREEP FORWARD button to enable traffic freq 2
Use the FAST REVERSE button to enable traffic freq 3
Press the HORN button to return to previous menu.

TRAFFIC 1    TRAFFIC 2    TRAFFIC 3

| | | |
|---|---|---|
| Test Wheel Tach. | Choice 33 | Choice 53 |
| Test Guidance Assy. | Choice 34 | Choice 54 |
| Calculate Truck Speed | Choice 35 | Choice 55 |
| Calibrate Truck Optics | Choice 36 | Choice 56 |
| Graph WASPOT Response | Choice 37 | Choice 57 |
| Monitor Guidance Freq. | Choice 38 | Choice 58 |
| Test Traffic Xmit. | Choice 39 | Choice 59 |
| Sniff Floor Config. | Choice 40 | Choice 60 |

When SNIFF FLOOR CONFIG. is selected from the INTERACTIVE SYSTEM TEST sub-menu by the manual controller, the next menu displayed is shown as Example 2.4.20.

EXAMPLE 2.4.20: SNIFF FLOOR CONFIG.

When TEST LIFT/LOWER DECK is selected from the INTERACTIVE SYSTEM TEST sub-menu by the manual controller, the next menu displayed is shown as Example 2.4.21.

EXAMPLE 2.4.21: TEST LIFT/LOWER DECK

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |

Use the LIFT button to raise the lift/lower deck.
Use the LOWER button to drop the lift/lower deck.
Press the HORN button to return to previous menu.

UP LIMIT    DOWN LIMIT

| | | |
|---|---|---|
| Monitor Traffic Freq. | Choice 31 | Choice 51 |
| Test WASPOT | Choice 32 | Choice 52 |
| Test Wheel Tach. | Choice 33 | Choice 53 |
| Test Guidance Assy. | Choice 34 | Choice 54 |
| Calculate Truck Speed | Choice 35 | Choice 55 |
| Calibrate Truck Optics | Choice 36 | Choice 56 |
| Graph WASPOT Response | Choice 37 | Choice 57 |
| Monitor Guidance Freq. | Choice 38 | Choice 58 |
| Test Traffic Xmit. | Choice 39 | Choice 59 |
| Sniff Floor Config. | Choice 40 | Choice 60 |

| Twist MC to move. | Interactive Menu | Deadman selects test. |
|---|---|---|
| Test/Adjust Volume | Test Lift/Lower Deck | Choice 41 |
| Test Pitch Control | Test P&D Stand. | Choice 42 |
| PPI 1 Port A Test | Choice 23 | Choice 43 |

```
Hold the DEADMAN switch to move the truck. While the DEADMAN switch
is held, the Manual Controller will steer the truck.
Use either Forward button to move the truck forward.
Use either Reverse button to move the truck backard.
Use the BLUE button to toggle auto/manual guidance
Use the LIFT button to change guidance frequencys
Press the HORN button to return to previous menu.

TRAFFIC 1        TRAFFIC 2         TRAFFIC 3

FRONT FREQ  : F1 F2 F3 F4  AUTO MODE        MANUAL MODE
CENTER FREQ : F1 F2 F3 F4  OFF WIRE F       OFF WIRE B
REAR FREQ   : F1 F2 F3 F4  NOT STRAIGHT F   NOT STRAIGHT B
FOLLOWING   : F1 F2 F3 F4
```

| Sniff Floor Config. | Choice 40 | Choice 60 |

When TEST P&D STAND is selected from the INTERACTIVE SYSTEM TEST sub-menu by the manual controller, the next menu display is shown as Example 2.4.22.

EXAMPLE 2.4.22: TEST P&D STAND

```
Twist MC to move.    Interactive Menu    Deadman selects test.

Use either FORWARD button to select forward test.
Use either REVERSE button to select backward test.
Remove the OIM to start the test. Re-inserting the OIM aborts the
Press the HORN button to return to previous menu.
     To do this test the truck must be on the wire just
     test. before the desired P&D stand. The truck will emit a short
     beep when it gets a message from the LAC.

Status:    Found guidance F1
           Found center F2
           Rotation 1 complete      Test Type: FORWARD
           Found guidance F2
           Found reflector
           Found center F1
           Rotation 2 complete
           Found guidance F1
```

| Test Traffic Xmit.  | Choice 39 | Choice 59 |
| Sniff Floor Config. | Choice 40 | Choice 60 |

CHOICE 23–CHOICE 60 of the INTERACTIVE SYSTEM TEST sub-menu are not used in the present configuration, but can be replaced by appropriate routines for testing or monitoring different functions.

Referring now to FIG. 7, there is shown a schematic block diagram of the communication and control of an AGV 132 (FIG. 1). At the heart of the AGV system is a computer 350 (FIG. 3) such as a Model PC/XT manufactured by IBM Corp. Computer 350 is self-contained, having a central processing unit (CPU), not shown, as well as internal random access memory and logic as is conventionally found in a commercial personal computer. In fact, the mother board, not shown, of computer 350 is a standard PC/XT computer mother board that can be provided by the aforementioned manufacturer.

Connected to computer 350 are a power supply and associated switches 712 for controlling power distribution to the various portions of the vehicle 132.

Also connected to computer 350 are guidance controllers 714a and 714b for providing guidance to the front and rear wheels 325 and 326, respectively of AGV 132.

Steering controls 716a and 716b are provided to control servo motors, not shown, for the front and rear wheels, respectively.

Also connected to computer 350 by means of a bidirectional line 718 are drivers for control and display panel and for manual controller, shown generally at reference numeral 720. While control and display panel and manual controller drivers 720 are separate devices, they are shown in this FIGURE as one unit for simplicity. The interaction between display panel and manual controller 720 with one another and with computer 350 is generally via the aforementioned menu system.

Safety apparatus, shown generally at reference numeral 722, controls such equipment as bumpers and optics. Certain threshold limits are monitored and controlled by this block 722, as is an emergency power off (EPO) switch D (FIG. 5a) hereinabove described.

Lift table 371 (FIG. 4) is controlled by computer 350 by means of a lift/lower controller 724 connected to computer 350 and adapted to operate pursuant to instructions thereof.

Also connected to computer 350 is a drive controller 726, including a drive servo motor, not shown.

Operating instructions for computer 350 are loaded in a PROM 728, which is replaceable in accordance with the present invention and which is described in further detail hereinbelow.

Computer 350 is also connected by means of a bidirectional bus 730 to a communications controller 732, including ICD 121 (FIG. 1), which is inductively coupled to a buried wire, not shown. Communication controller 732 therefore provides the interface between AGV 132 and local area controller 116.

Peripheral equipment 734, such as printers, keyboards, floppy or hard disk drives, plotters and the like, can be connected to computer 350 with minimal effort, thereby allowing computer 350 to function as a conventional PC/XT with peripheral devices.

Figure 8A:
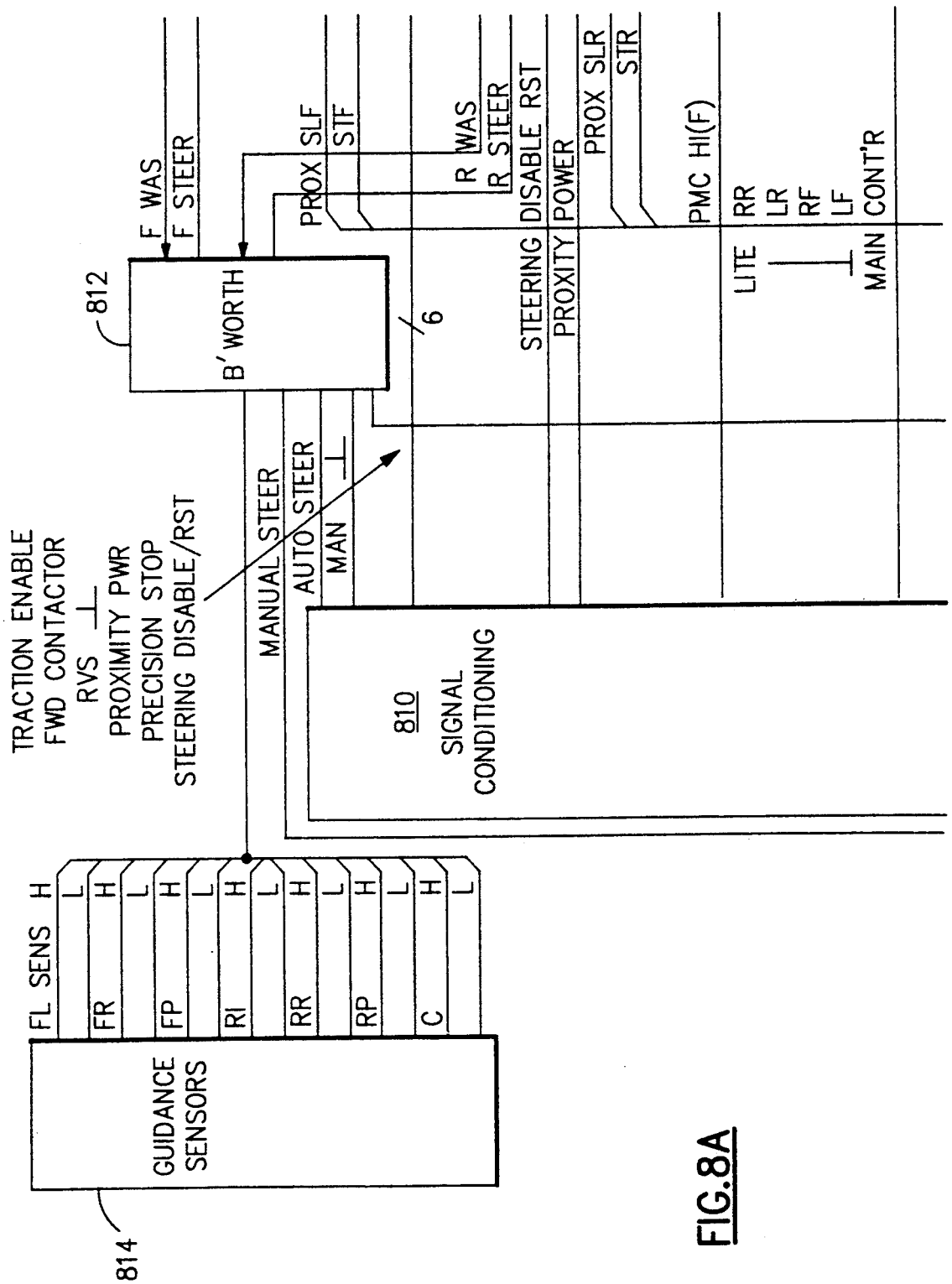
Figure 8C:
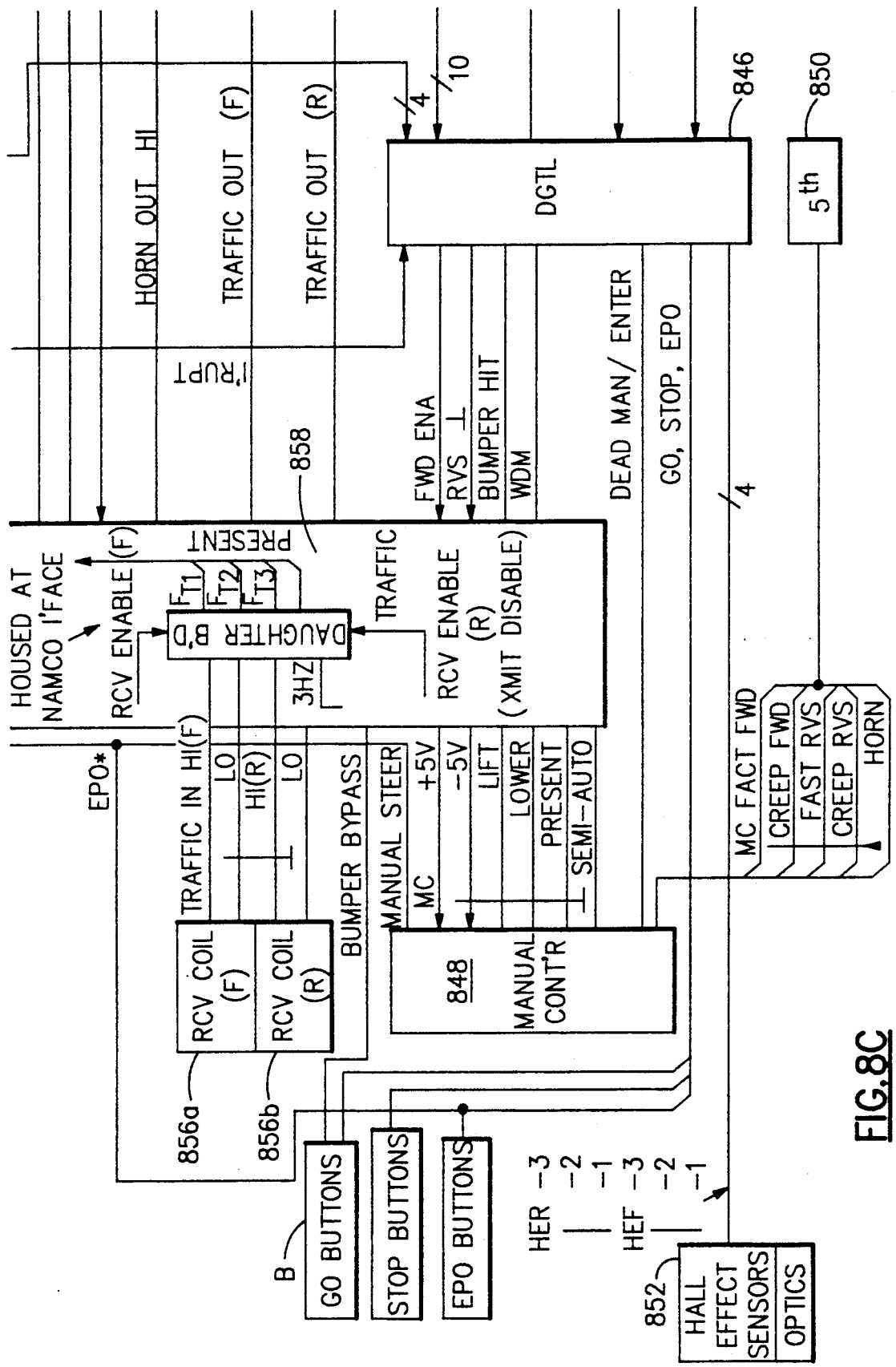
Figure 8D:
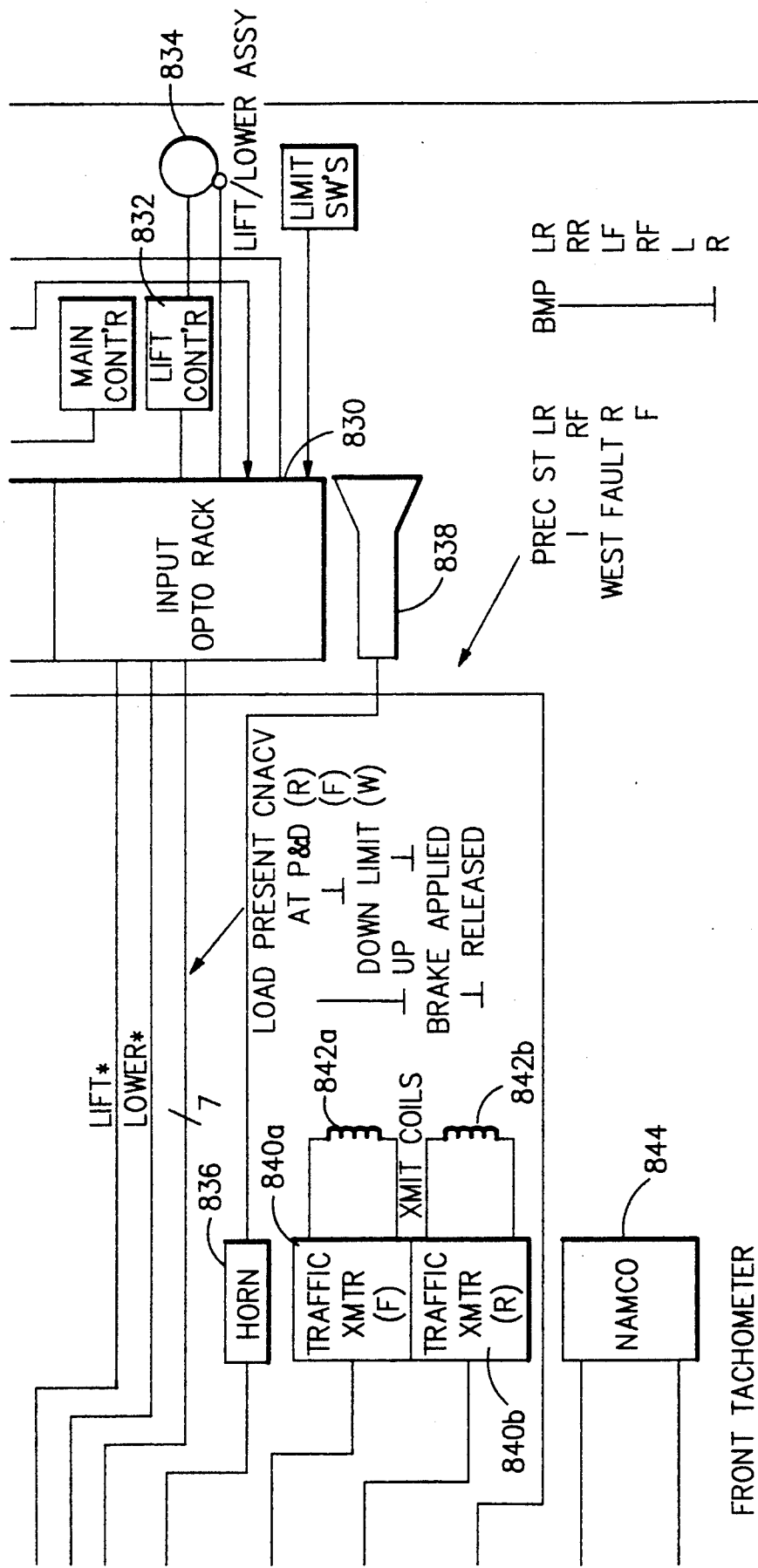

Referring now also to FIG. 8, there is shown a schematic block diagram of the computer 350 (FIG. 7) in greater detail.

Each of the blocks shown in FIG. 8 resides on a separate printed circuit board or separate sub-assembly in computer 350 in the preferred embodiment. A signal conditioning block 810 is connected to a guidance control, so-called Butterworth block 812. Also connected to Butterworth block 812 is a sensor array 814 for guidance. Connected to signal conditioning block 810 and Butterworth card 812 are servo interfaces 815a (front) and 815b (rear). Connected to servo interface cards 815 are steering servos for the front 816a and 816b of the vehicle. Also connected to servo interfaces 815 are front wheel angle sensor potentiometers (WASPOT) 818a and 818b, respectively.

Front and rear optics 820a and 820b are provided for safety. Specifically, as mentioned above, the vehicle is slowed when a neutral white object appears within six feet of one of the sensors and the vehicle stops when a neutral white object appears within three feet of another one of the sensors. Power to the front and rear optics 820a and 820b is provided through servo interfaces 815a and 815b, respectively.

A traction amplifier (PMC) 822 is connected both to signal conditioning block 810 and to front servo interface 815a. The output of traction amplifier 822 is applied to front and rear contactors 824a and 824b, respectively, for controlling a motor 826 in a forward or rearward direction, respectively.

Connected to signal conditioning block 810 is an output opto rack which optoelectronically isolates signal conditioning block 810 from any one of the following devices: parking brake, load at P & D, optic power, bumper power, precision stop optic right front power, precision stop optic left front power, right rear, left rear, right front, left front lights and the main contactor, none of which is shown on this FIGURE.

An input opto rack 830 is connected to signal conditioning block 810 and receives input signals from the aforementioned devices (e.g., parking brake). The connection between input opto rack 830 and signal conditioning block 810 prevents mutually exclusive operations from occurring, such as lifting and lowering the lift table 371 (FIG. 4) simultaneously. Connected to input opto rack 830 is a lift/lower contactor 832 which, in turn, is connected to a lift/lower motor 834.

Also connected to signal conditioning block 810 is a horn driver 836 which is connected to a speaker 838. Horn and speaker 836, 838 are capable of generating a signal that is infinitely variable with respect to amplitude and frequency. It should also be understood that a speech synthesizer can replace the horn driver 836, if desired, in a manner that is well known in the art.

Connected to signal conditioning block 810 are front and rear traffic transmitter drivers 840a and 840b, respectively. Traffic transmitter drivers 840a and 840b drive inductive coils 842a and 842b, respectively, which are focused and directed toward the ground loop, not shown. Three frequencies are used as a signal between traffic transmitters 840 and signal conditioning block 810.

Any one frequency or any of certain combinations of two or three frequencies can be used to signal a specific condition. For example, if the first frequency $ft_1$, is present (binary 1), then the vehicle 132 is physically located on the floor. If frequencies $ft_2$, and $ft_3$ are present in certain combinations, the vehicle 132 is directed variously to turn left, to turn right, to maintain a straight orientation or to enter an elevator going up or down, respectively. Thus, the presence of frequencies $ft_1$, $ft_2$ and $ft_3$ may signal an elevator operation, whereas frequencies $ft_1$ and $ft_3$ alone signal a right turn operation.

An electronic inductive sensor and interface is shown at reference numeral 844. The inductive sensor is a low powered device containing sensor electronics and an antenna. It contains an inductive power source used to activate an electronic label, not shown, usually disposed beneath the floor of a warehouse. The electronic label, in turn, is incited by the sensor and interface to transmit a signal in response thereto. The entire electronic label/sensor/interface system is available from Namco Controls Co. of Mentor, Ohio and marketed under the trademark SENSORNET I. Connected to the electronic label system 844 is a digital card 846. The input to digital card 846 is an RS232 serial communications bus. Digital card 846 receives input from a variety of sources and interrupts system operation in response thereto. For example, the deadman switch AA (FIG. 6) of manual controller 848 (references numeral 600 in FIG. 6) is input to digital card 846, as is Luke? 854 and safety optics 852. Moreover, a watch dog monitor in signal conditioning block 810 and a bumper bit signal from signal conditioning block 810 is also input to digital block 846, described in greater detail hereinbelow.

A nonvolatile RAM card 850 contains information necessary to restart the system in the event of loss of power. Card 850 also contains the operational program for AGV 132 residing in PROM 728 (FIG. 7) and is also used to convert or interrupt a number of switches that can be operated by manual controller 848, such as fast forward, slow forward, fast reverse, slow reverse and horn.

Front and rear receiver coils 856a and 856b, respectively, receive inductive signals from the receive loop in guide path 122 and are transferred to a daughter board 858. Daughter board 858 generates three bits in response to the receiver signals from received coils 856a and 856b. The bits correspond to the aforementioned frequency binary bits $ft_1$, $ft_2$ and $ft_3$.

Figure 9:
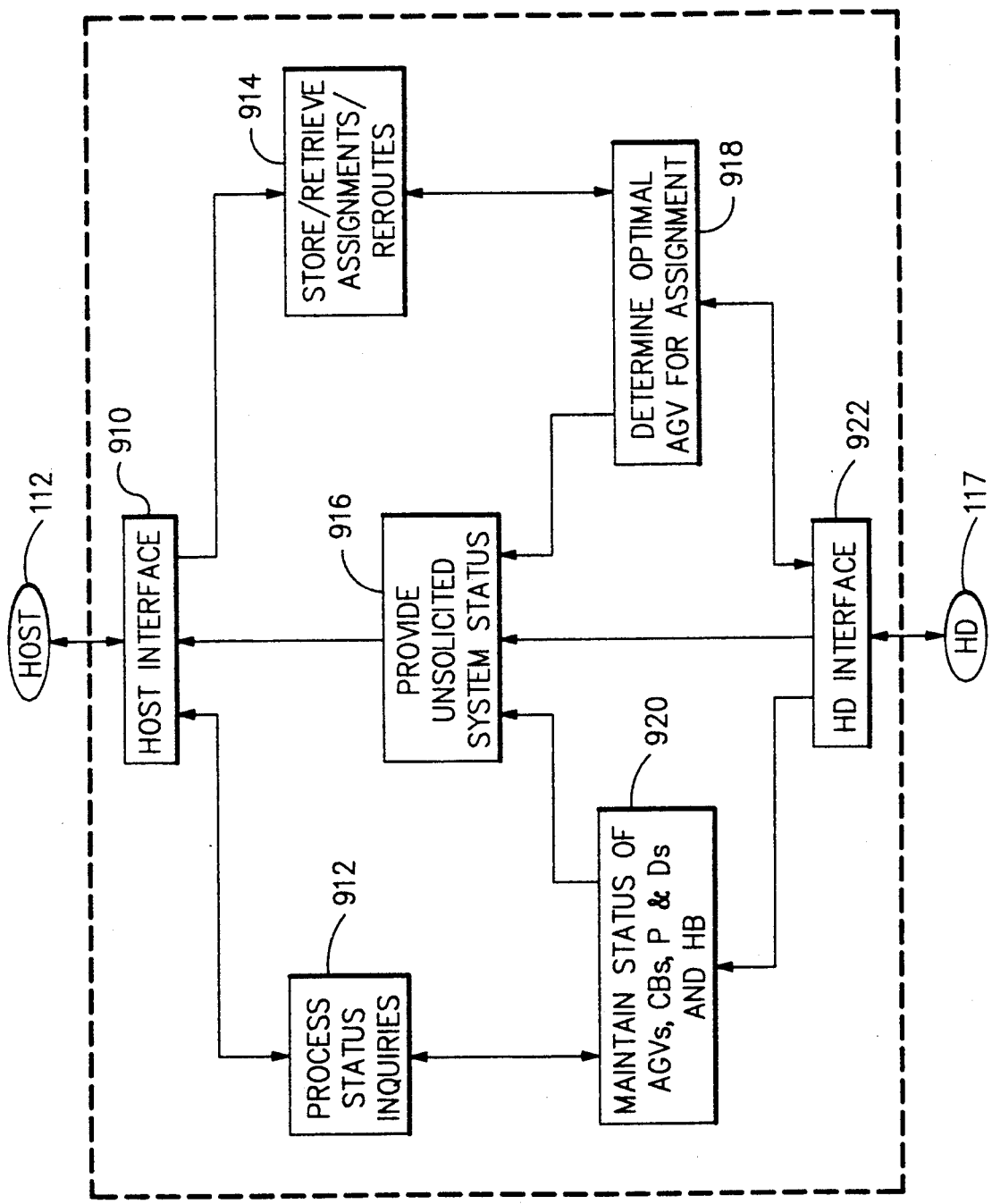
FIG. 9 is a block diagram depicting the functionality of the LAC.

Referring now to FIG. 9 there is shown a functionality diagram of local area controller 116 (FIG. 1). Host computer 112 is connected to a host interface 910, which performs three functions:

a) processes status inquiries 910,
b) stores/retrieves assignments and reroutes 914, and
c) receives unsolicited system status reports 916 to be transferred, in turn, to host 112.

In providing unsolicited system status reports 916 to host interface 910, the system determines the optimal AGV for a given assignment 918. In processing status inquiries 912, the status of AGVs 132, CBs 119, P & Ds 120 and hyper driver is maintained 920. When an optimal AGV 132 is selected for assignment 918, the identification of the AGV is transferred to HD interface 922 which, in turn, transfers the information to the hyper driver 117. Any status of devices or locations is generated by the hyper driver 117 and transferred through HD interface 922 to block 920.

Figure 10:
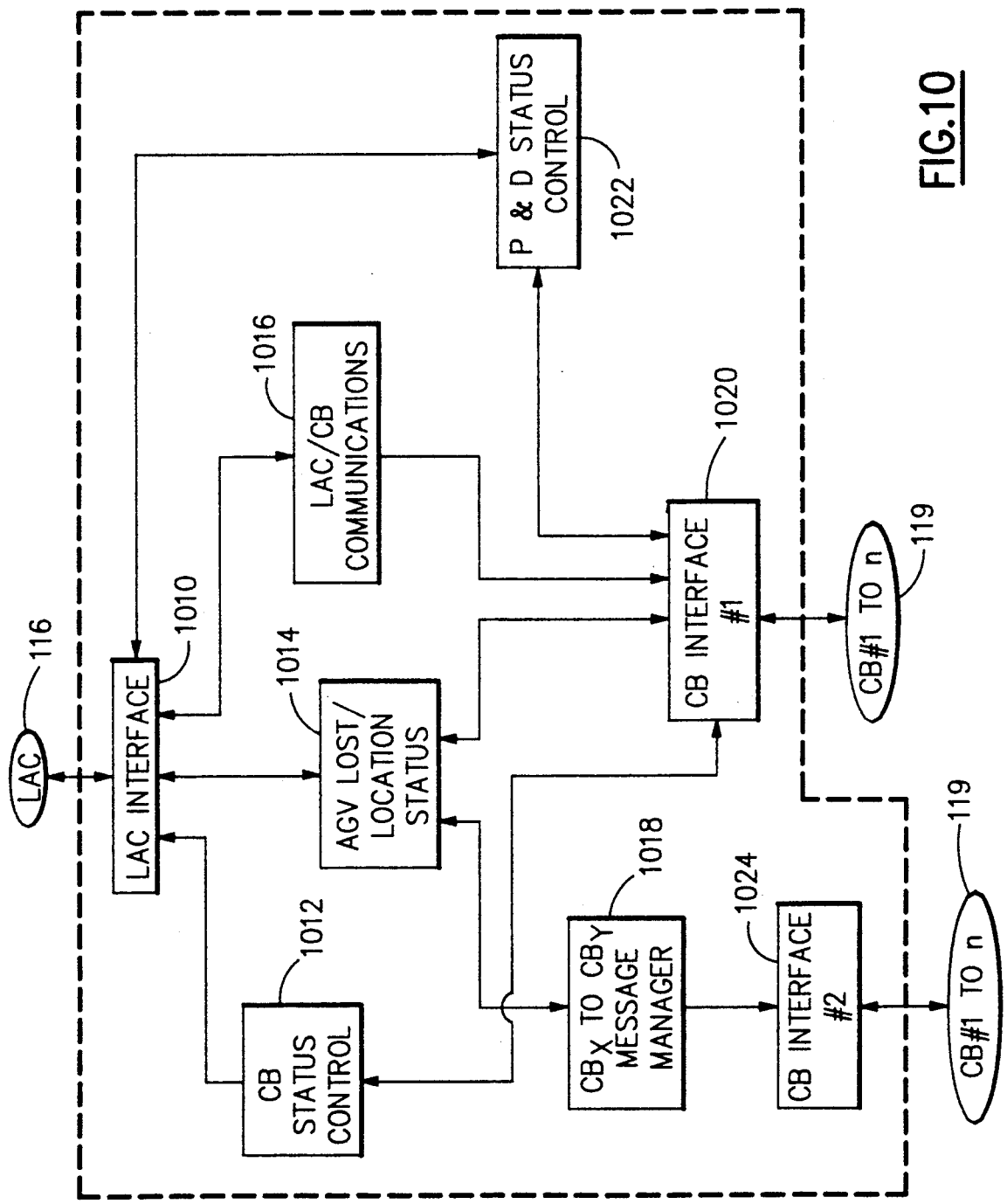
FIG. 10 is a block diagram depicting the functionality of the hyper driver shown in FIG. 1.

Referring now to FIG. 10 there is shown a functionality diagram of hyper driver 117. LAC 116 is connected to LAC interface 1010, which receives information from a CB status control block 1012 and AGV lost/location status block 1014, LAC/CB communications block 1016 and P & D status control block 1022. LAC interface 1010 transfers such information to LAC 16.

A control box interface 1020 is provided for communicating with CB status control block 1012, AGV lost/location status block 1014, LAC/CB communications block 1016 and P & D status control block 1022. Connected to CB interface 1020 are one or more CBs 119.

Similarly, a second CB interface block 1024 receives data from a $CB_x$ to $CB_y$ message manager 1018, the function of which is to communicate between CBs. The $CB_x$ to $CB_y$ message center is in communication with the AGV loss/location status drop block 1014. The second CB interface 1024 also communicates with one or more CBs 119. The functional channel from block 1010 through blocks 1014, 1018 and 1024 allows an AGV 132 to cross from the jurisdiction 150 one CB 119 to the jurisdiction of another CB.

It can be seen that the function of the hyper driver 117 is to allow communications from LAC 116 through blocks 1010, 1012 and 1020 as well as through blocks 1010, 1016 and 1020 to specific CBs, ultimately reaching predetermined AGVs. Likewise, the status of specific AGVs is returned by means of their respective CBs through the first CB interface 120 and eventually back to LAC 116. Likewise, the status of the P & D stands is relayed to or from LAC 116 and to and from respective CBs 119.

Figure 11:
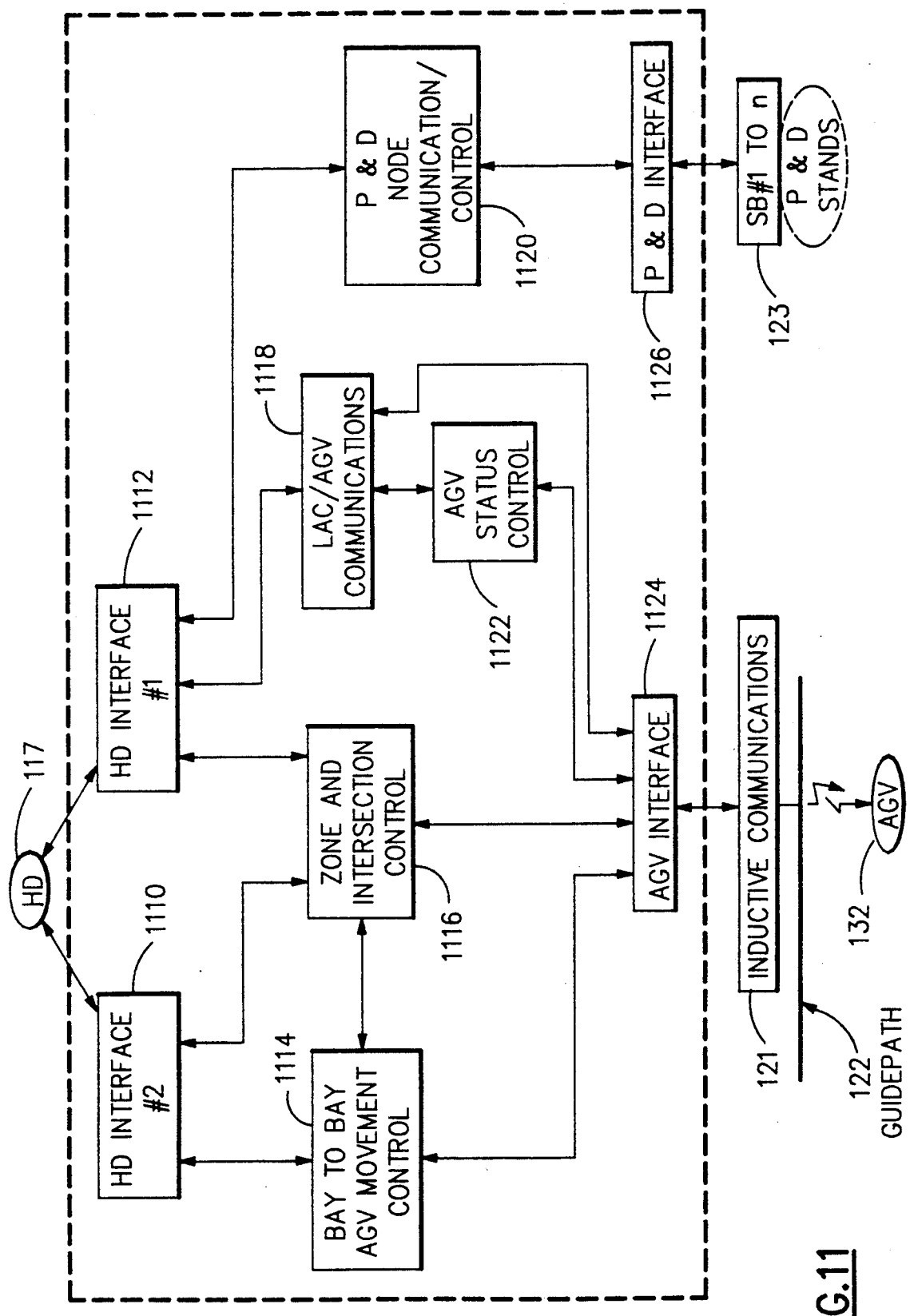
FIG. 11 is a block diagram depicting the functionality of a control box (CB) as shown in FIG. 1.

Referring now to FIG. 11, there is shown a functionality diagram for control box (CB) 119 (FIG. 1). Control box 119 controls all vehicles 132 and locations in a given jurisdiction 150 (FIG. 1). Similarly, status from all vehicles 132 and devices in a given jurisdiction 150 is reloaded up through appropriate functionality channels to hyper driver 117. Specifically, functionality channels include hyper driver interfaces 1 and 2, 1112 and 1110, respectively, bay to bay AGV movement control 1114, zone and intersection control 1116, LAC/AGV communications 1118, P & D node communication/control 1120, AGV status control 1122, P & D interface 1126 and AGV interface 1124. Conductive communications 121 are connected to AGV interface 1124.

Figure 12:
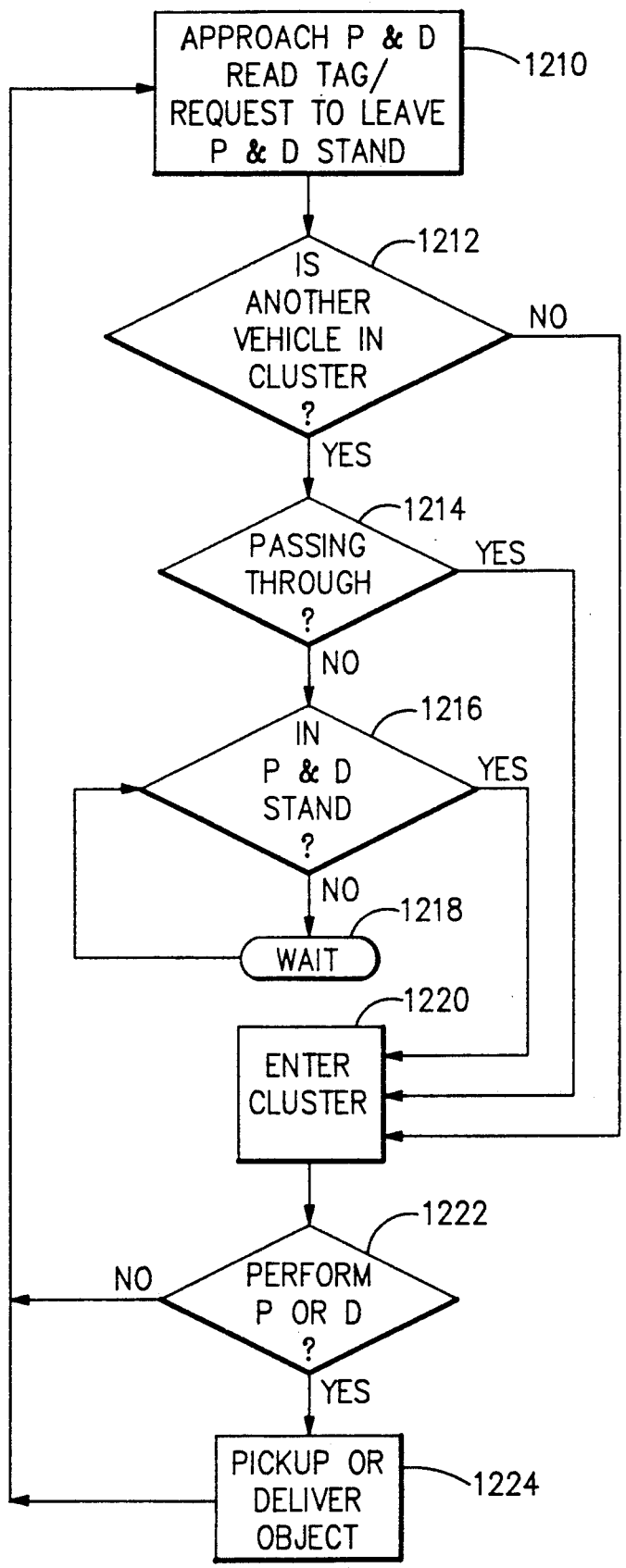
FIG. 12 is a flow chart for one of the functions of the CB depicted in the system of FIGURES.

Referring now to FIG. 12, a flow chart of one of the functions of the control box 119 (FIG. 1) is shown. The software loaded in CB 119 is adapted to provide a number of functions, one of which is traffic management within P & D zone clusters.

When an AGV (vehicle A) approaches a cluster of P & D stands, step 1210, the vehicle reads the code tag buried underground and CB, not shown, determines whether another AGV (vehicle B) is already in the specified cluster, step 1212. If that is the case, CB determines whether vehicle B is merely passing through the cluster on its way to another destination, step 1214.

If vehicle B is not merely passing through, LAC 116 determines whether vehicle B has already pulled in to a P & D stand, step 1216. If vehicle B is not in a P & D stand, vehicle A must wait, step 1218, until that event occurs. Once vehicle B pulls into a P & D stand, step 1216, vehicle A may enter the specified cluster, step 1220.

At any point in the process, when CB 119 determines that it is safe for vehicle A to enter the cluster, the vehicle is instructed to do so, step 1220.

Once in the cluster, CB 119 determines whether vehicle A must perform a pickup or delivery operation, step 1222. The pickup or delivery ensues, step 1224. At this point, vehicle A is free to request permission to leave the P & D stand, step 1212, and the flow of operations continues in the same manner as hereinabove described.

Figure 13:
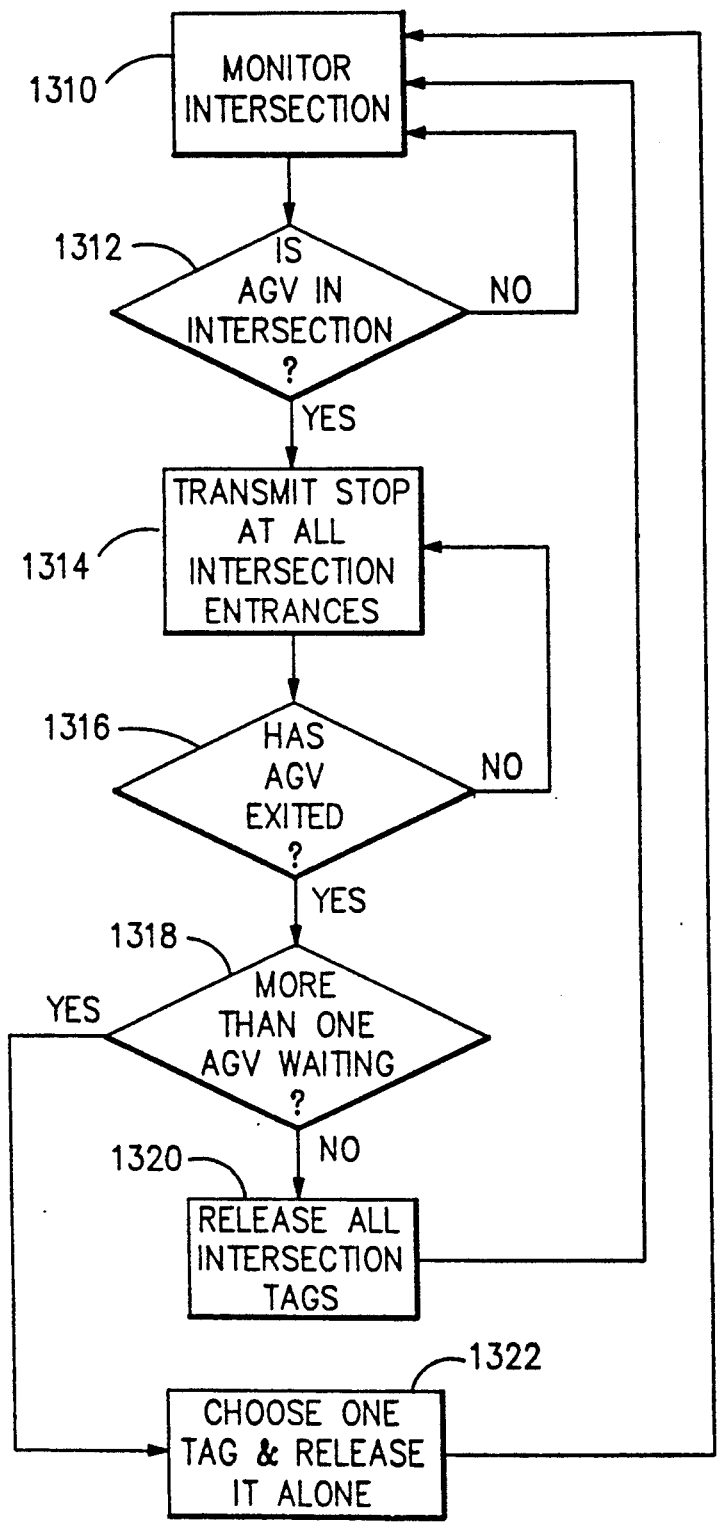
FIG. 13 is a flow chart for another of the CB functions, specifically the intersection traffic controller.

Referring now to FIG. 13, there is shown a flow chart for another function of control box 119 (FIG. 1). CB 119 monitors an intersection, step 1310. If an AGV 132 is in the intersection, step 1312, a stop command is transmitted at all intersection entrances, step 1314. This stop command prevents any other AGV from entering the occupied intersection.

CB 119 determines whether AG 132 has exited the intersection, step 1316. Once the AGV has left the intersection, CB determines whether more than one other AGV is waiting to enter the intersection, step 1318.

If only one or no AGVs are waiting, all intersection code tags are cleared, step 1320, so that the next approaching AGV may enter the intersection without delay. If, however, more than one AGV is waiting to enter the intersection, step 1318, CB chooses a code tag at one intersection to be released, step 1322, thereby permitting only one of the waiting AGVs to enter the intersection while prohibiting all remaining AGVs from doing so.

Monitoring the intersection, step 1310, continues indefinitely.

Figure 14A:
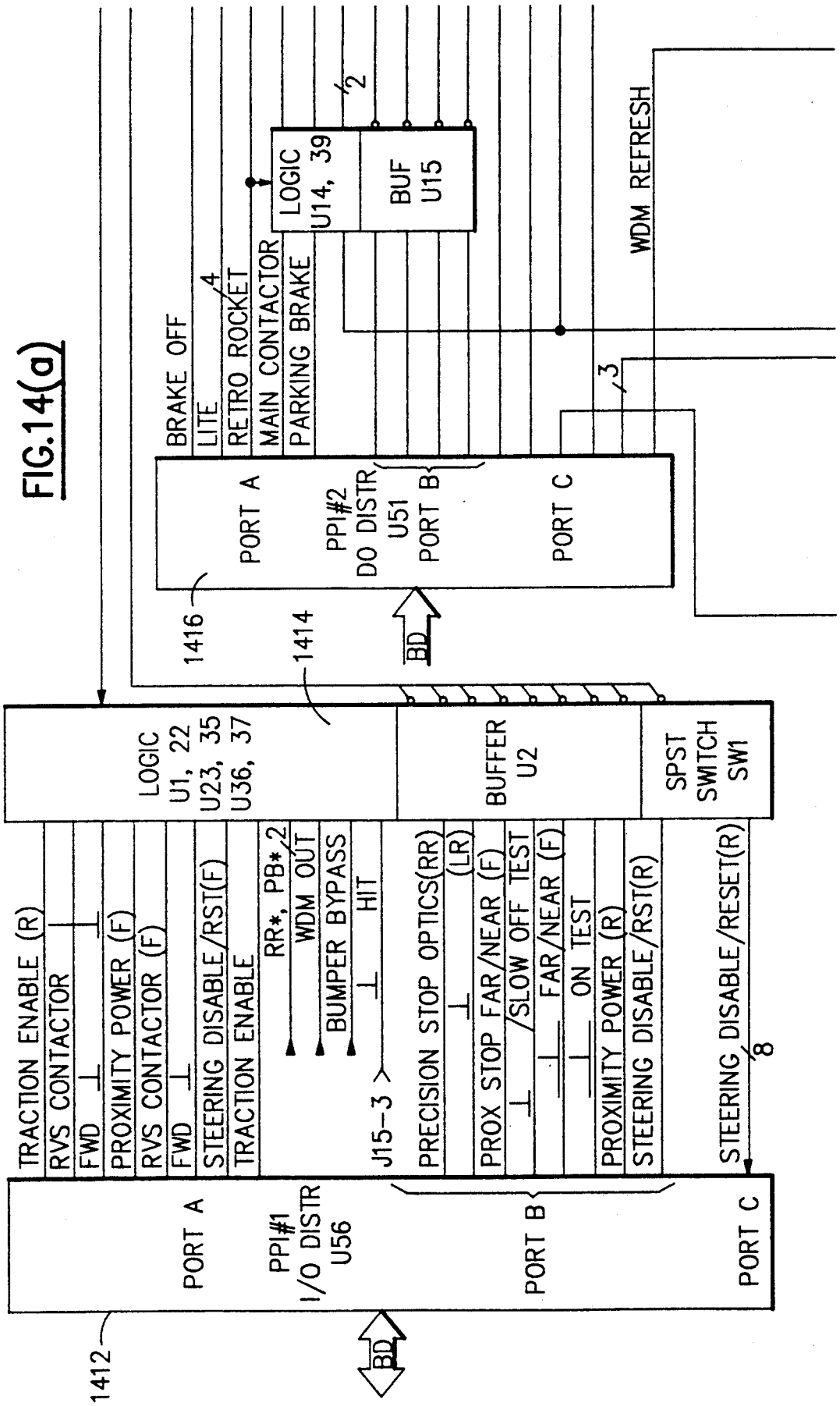
FIGS. 14a-14f, when taken together and arranged as shown in the corresponding interconnection diagram, and hereinafter referred to in the specification as FIG. 14, are a schematic diagram of a signal conditioning card as depicted in FIG. 8.
Figure 14B:
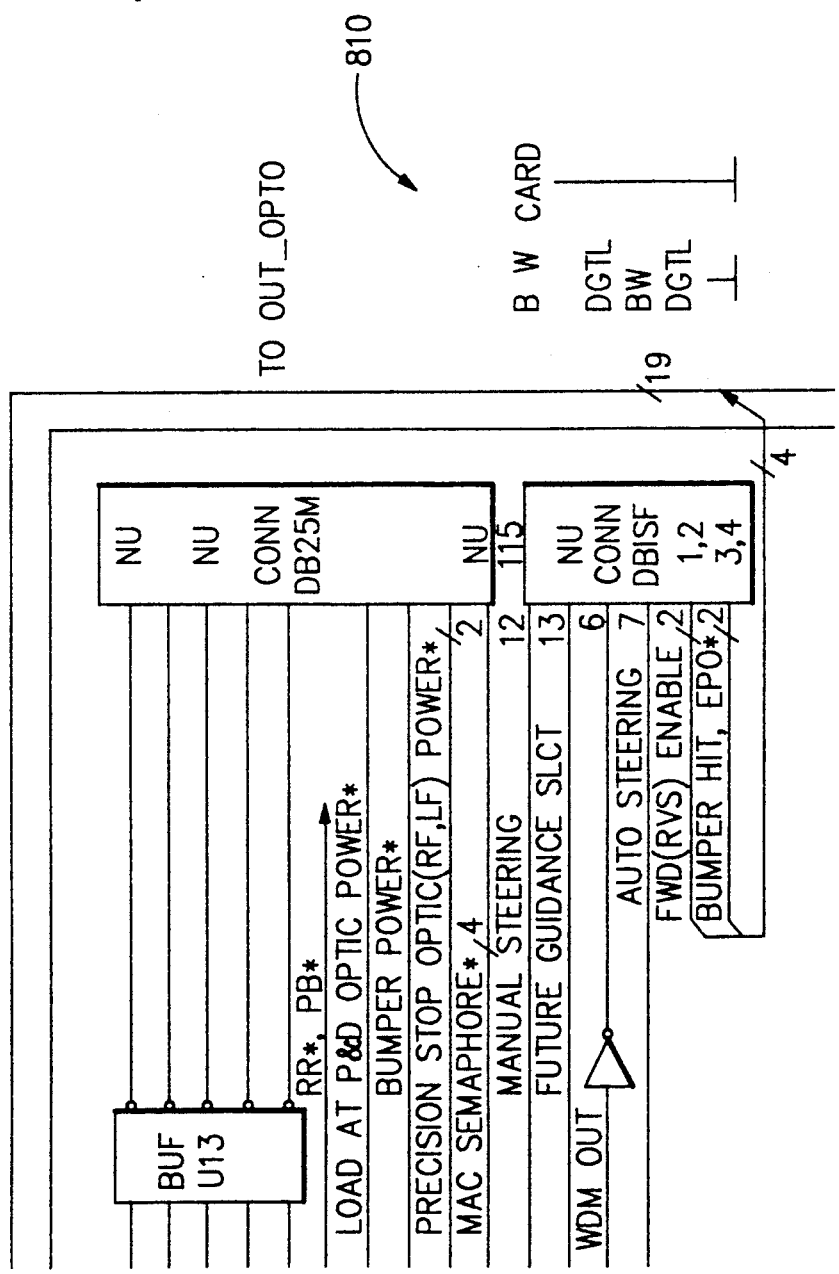
Figures 14, 14C:
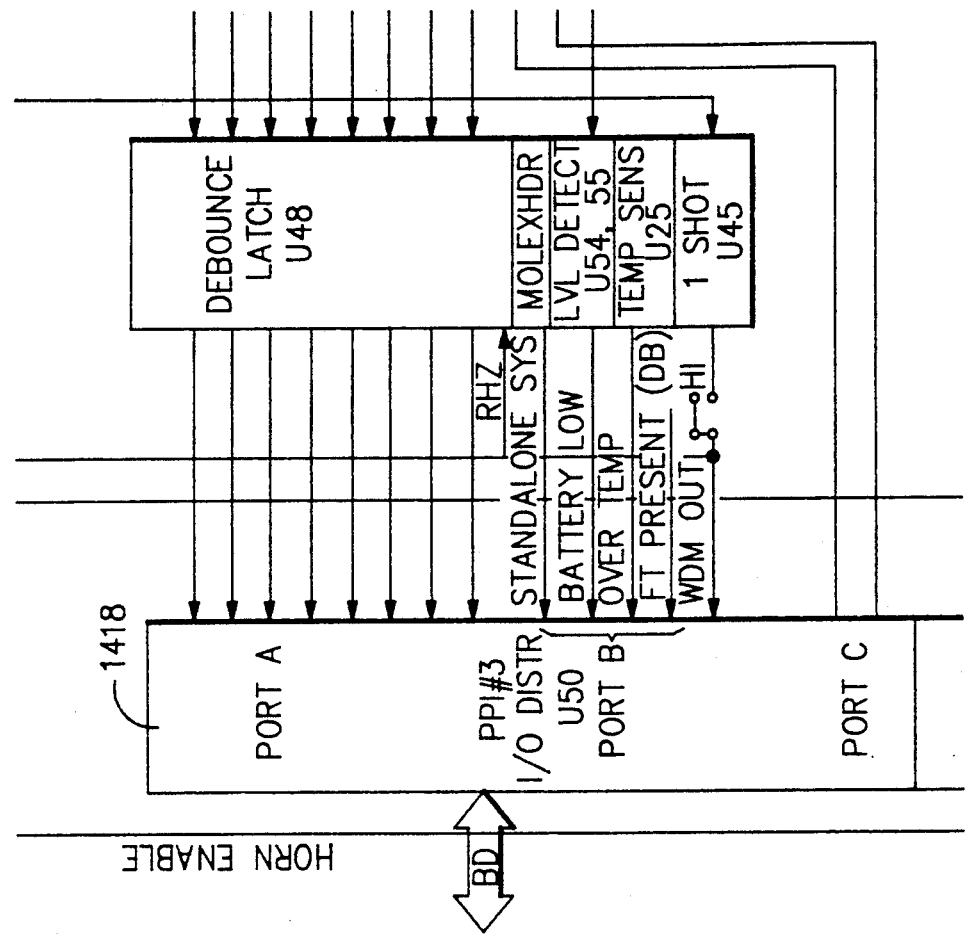
Figure 14D:
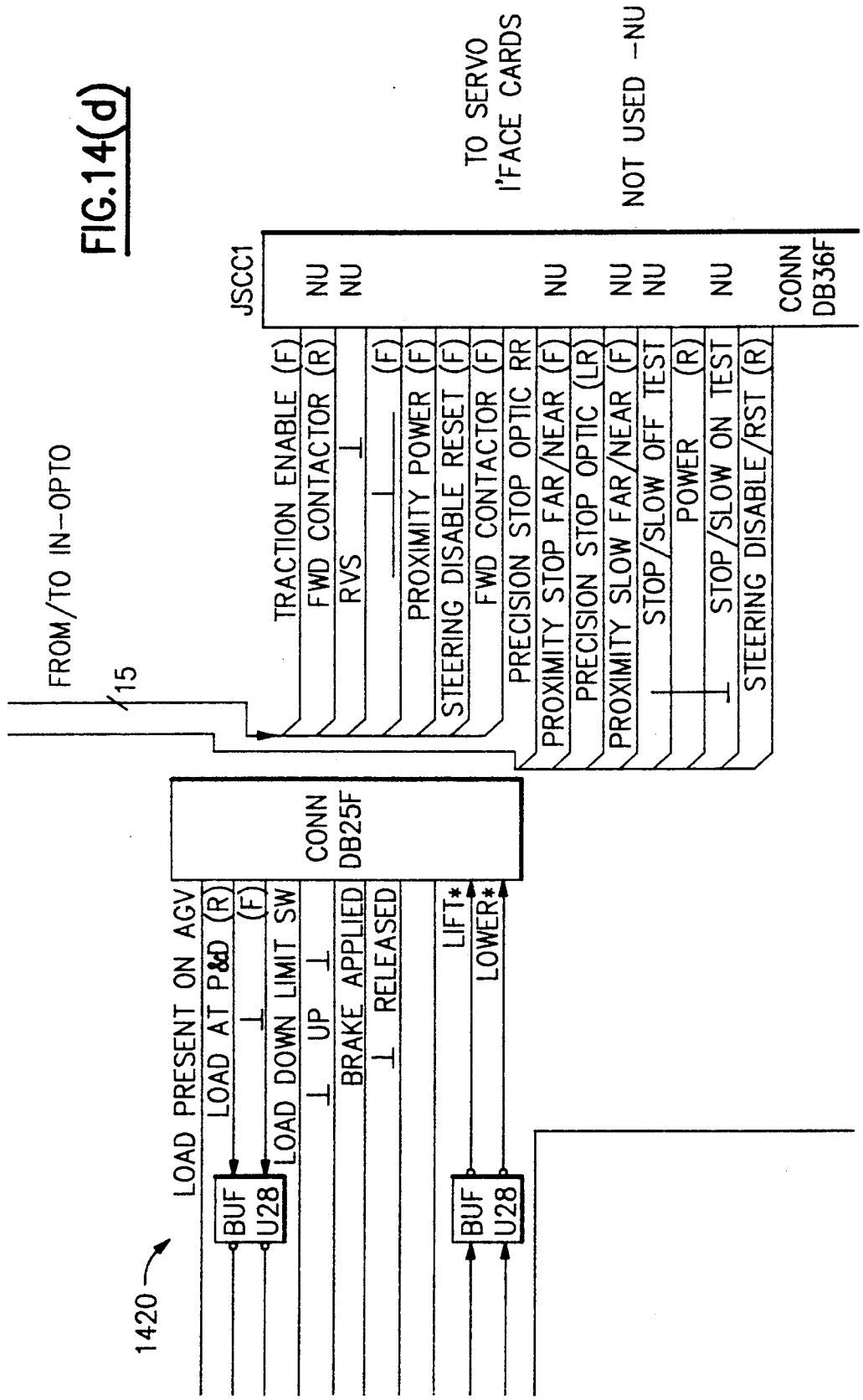
Figure 14E:
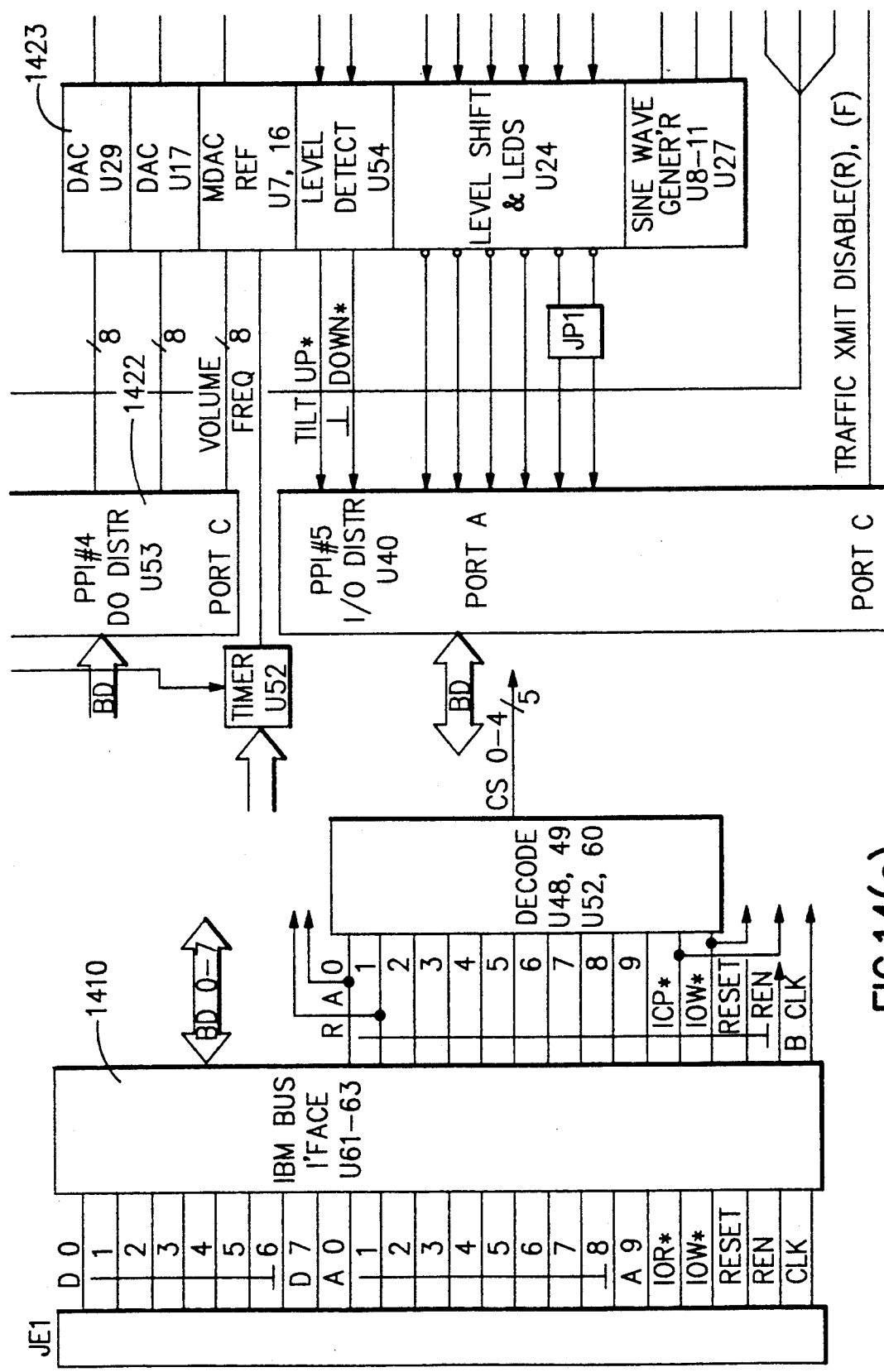
Figure 14F:
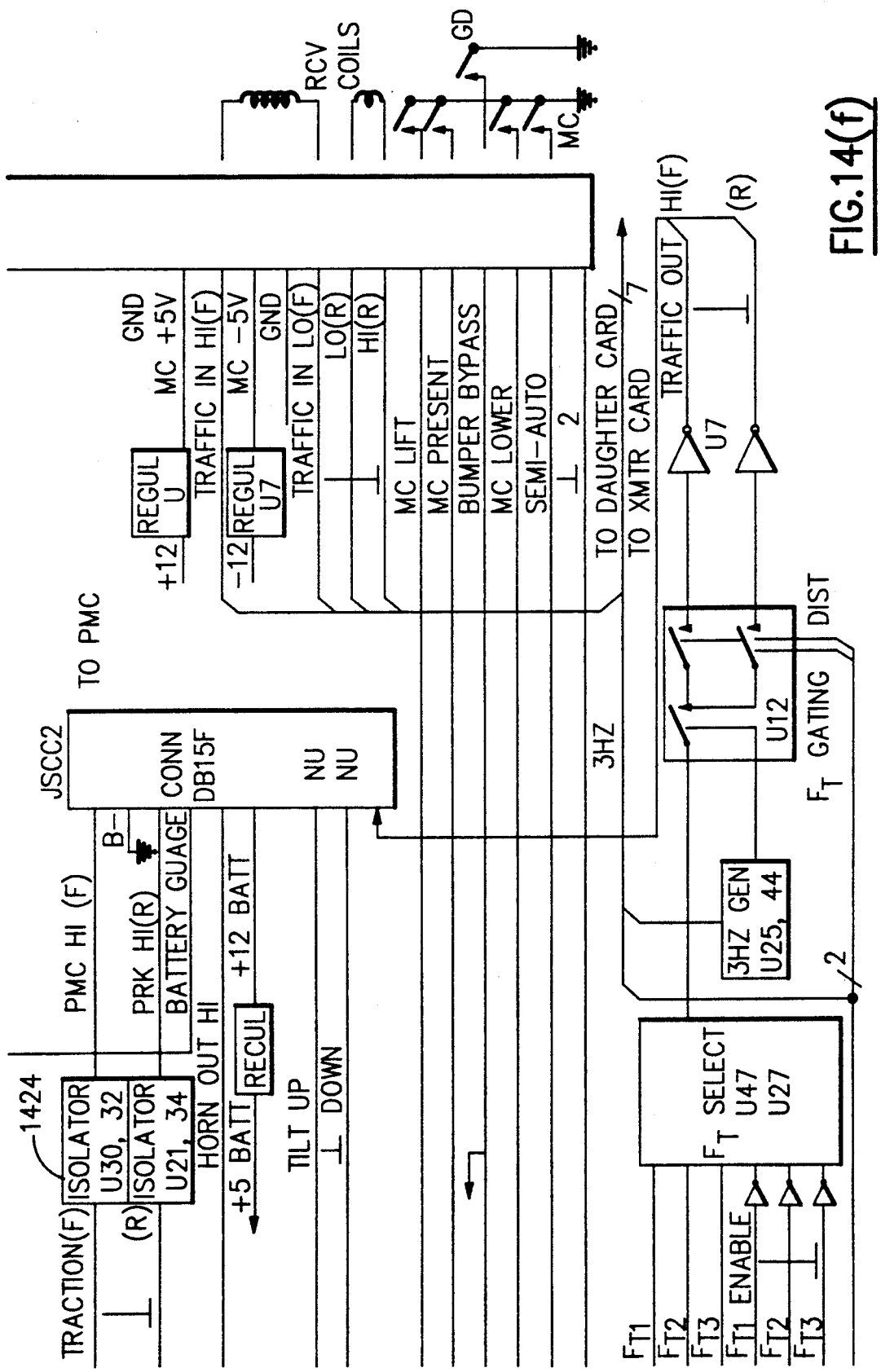

Referring now to FIG. 14, there is shown the signal conditioning card 810 (FIG. 8) in greater detail. Conventional decode logic is provided at reference numeral 1410. All cards in computer 350 contain the same sort of decode logic. An output port 1412 is connected to failsafe logic 1414. Failsafe logic 1414 is used to prevent mutually exclusive conditions, such as travelling forward and reverse at the same time.

Another output port 1416 has the same logic as output port 1412. An input port 1418 is connected to debounce circuitry 1420. In general, all input ports described herein are similar to input port 1418 and all output ports are similar to output port 1412. Output port 1422, connected to digital/analog converters 1423, results in changing the speed or horn amplitude shown at reference numeral 1424.

As used herein, the designation PPI refers to parallel ports and are numbered consecutively from PPI 1 through PPI 5. The proper operation of such parallel ports is monitored by corresponding selectable items in the aforementioned menus.

Figure 15B:
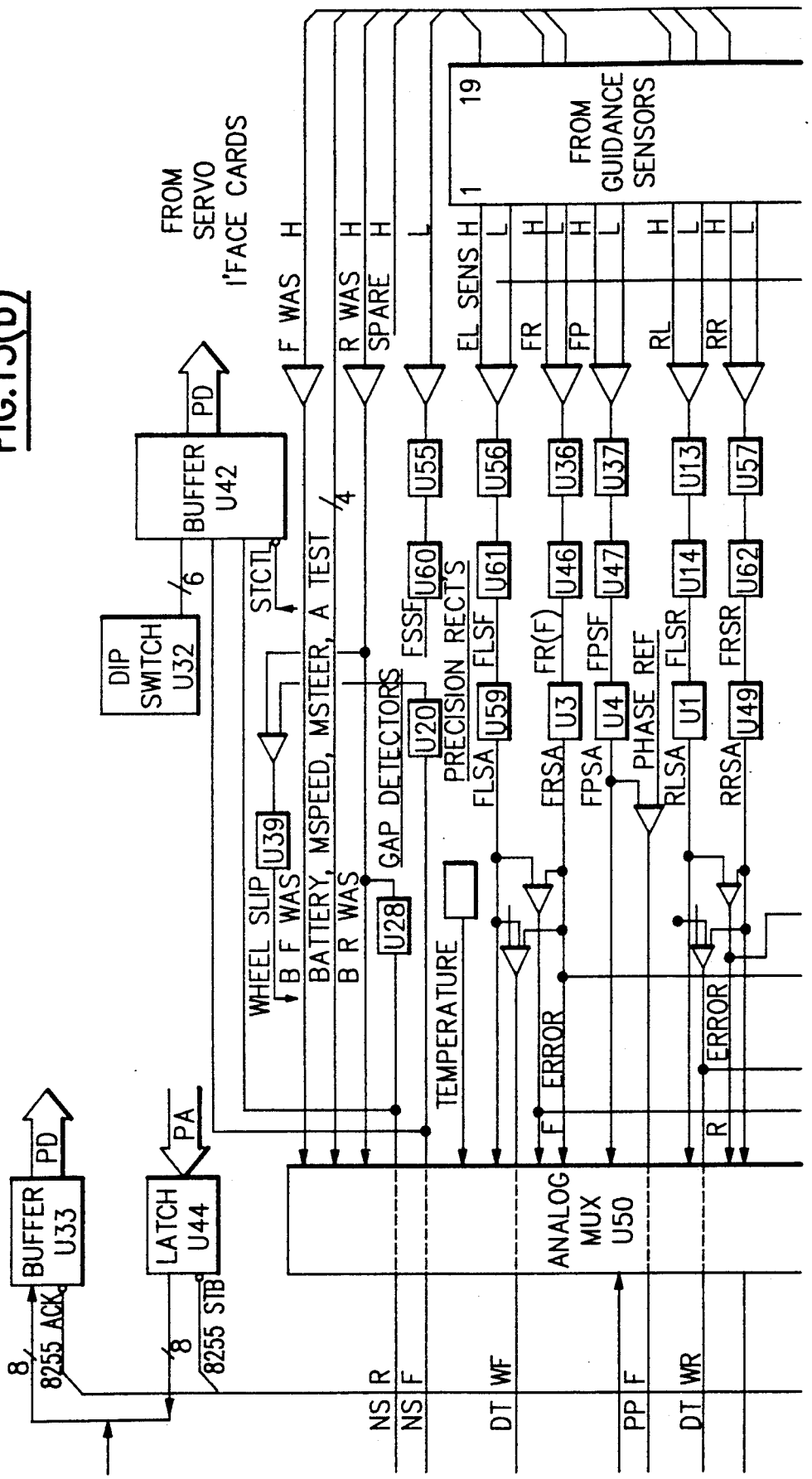
Figure 15C:
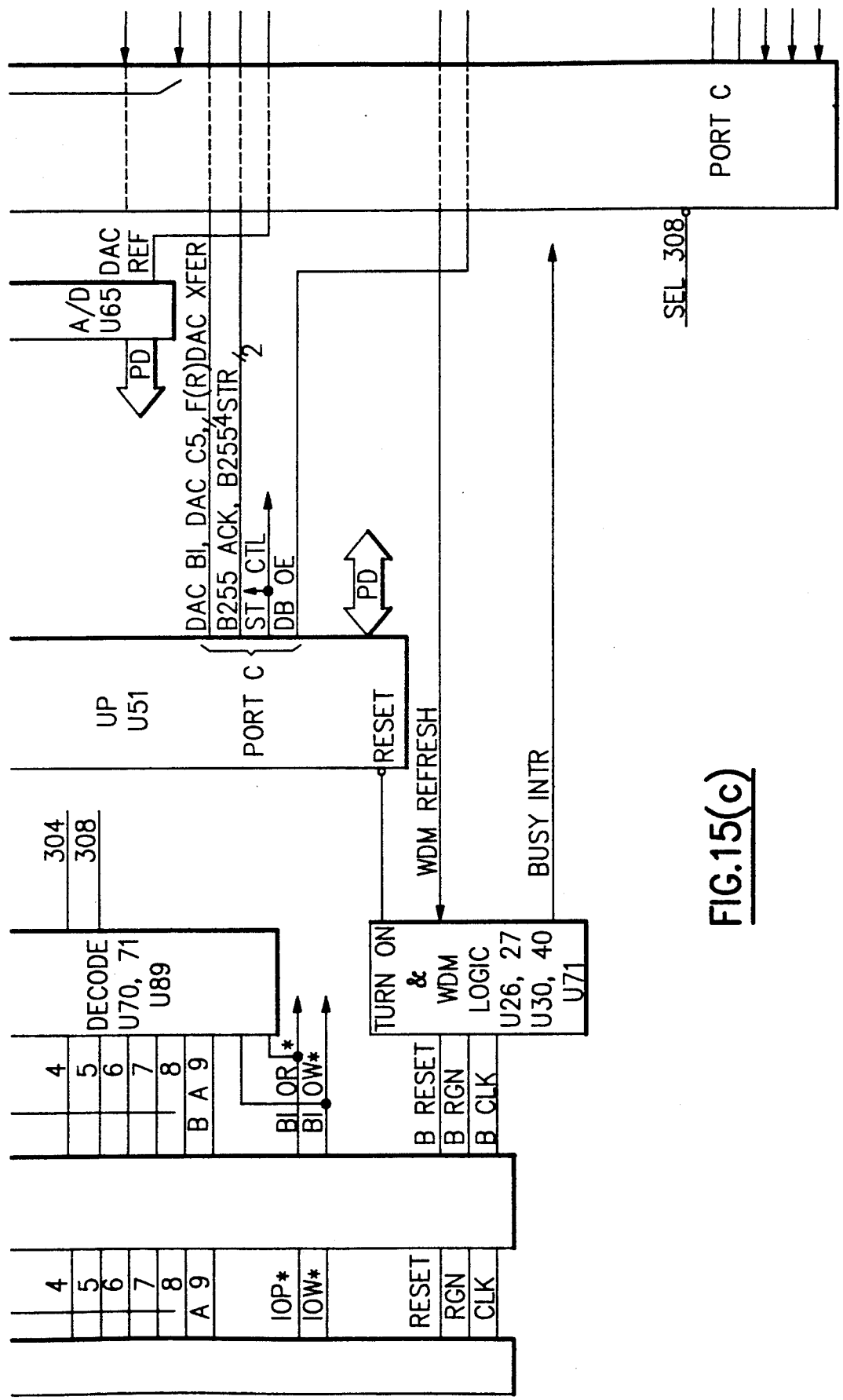
Figure 15D:
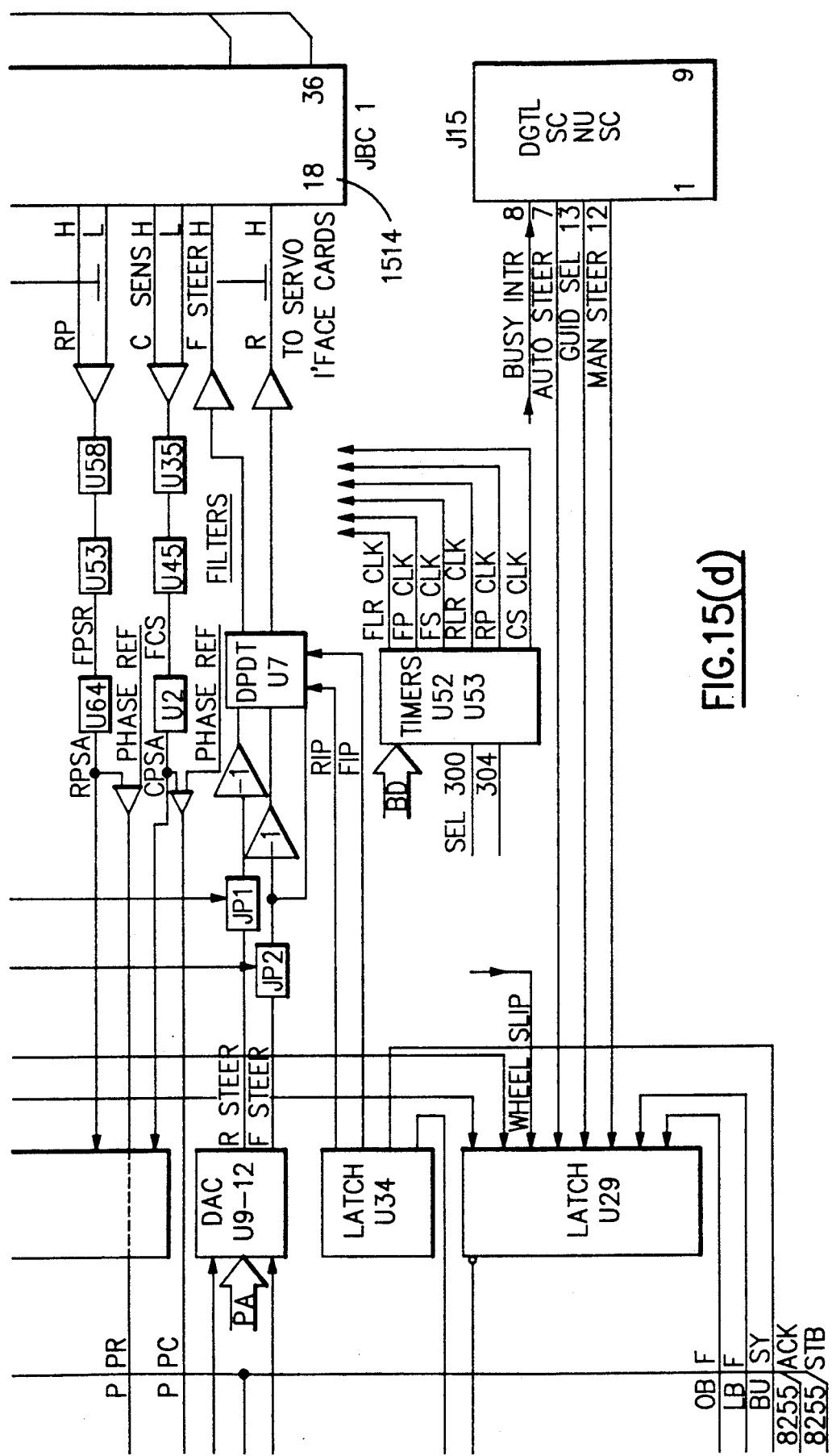

Referring now to FIG. 15, there is shown the Butterworth guidance control card 81 (FIG. 8) in greater detail. A microprocessor 1510 such as is manufactured by Motorola corporation as Model no. 68705 contains firmware for guidance control algorithms. In general, guidance control algorithms control movement of AGVs despite unequal loading, anomalies that occur during turns, and other maneuvers and the like.

Microprocessor 1510 communicates with the AGV computer, not shown, by means of standard decode logic 1511. Connected to microprocessor 1510 is a parallel port 1512 which forms the gateway of communications between microprocessor 1510 and AGV computer, not shown. Connected to microprocessor 1510 by means of PPI 1512 are sensors from the guidance system 1514, such as position sensors, phase, center, forward and reverse for front and rear wheels, and steering. Also connected to PPI 1512 is a temperature circuit 1516 to indicate the temperature of the vehicle.

Figure 16A:
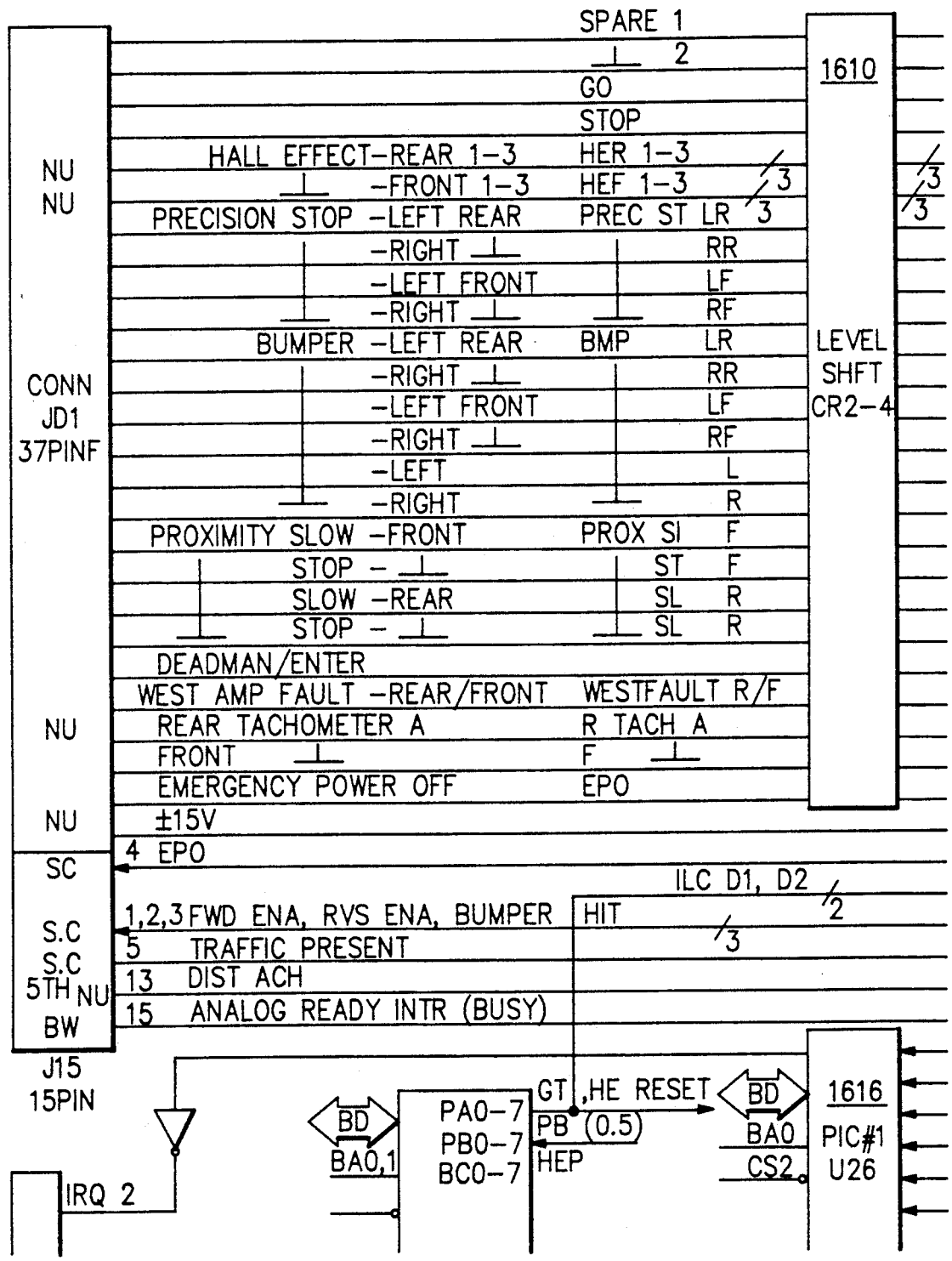
FIGS. 16a-16d, when taken together and arranged as shown in the corresponding interconnection diagram, and hereinafter referred to in the specification as FIG. 16, are a block diagram of a digital card as depicted in FIG. 8.
Figure 16B:
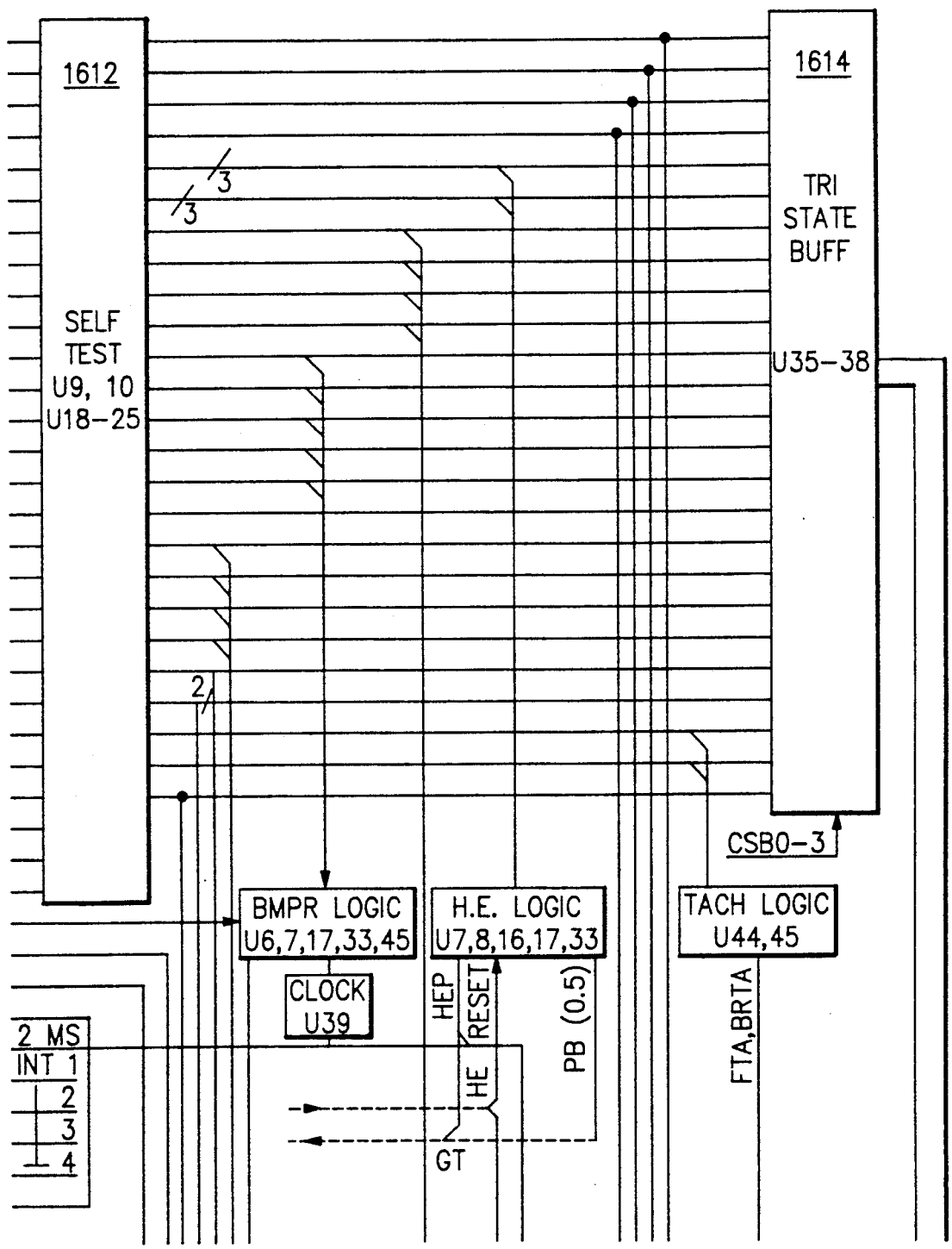
Figure 16C:
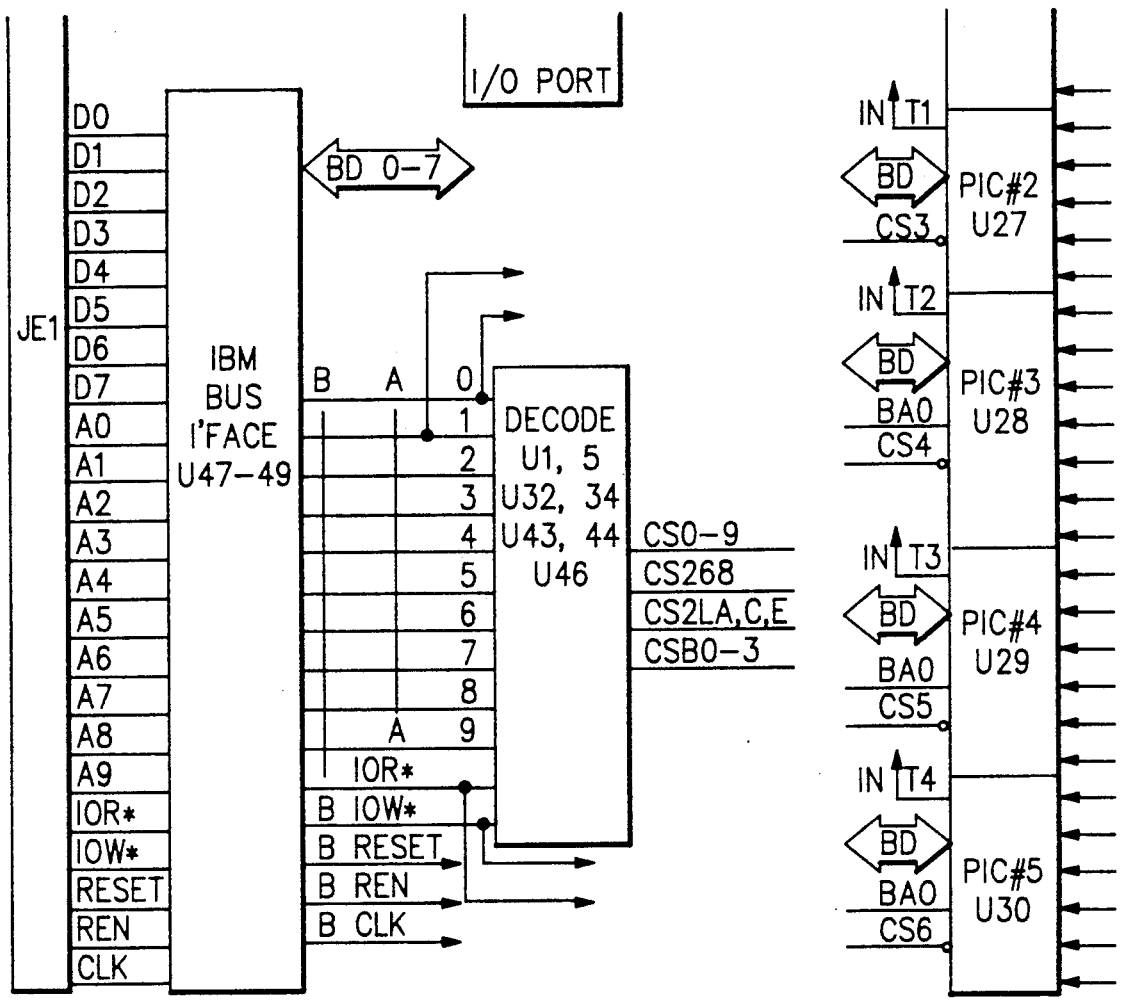
Figure 16:
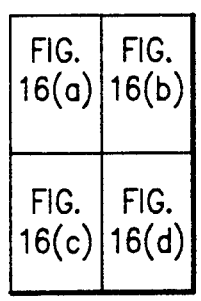
Figure 16D:
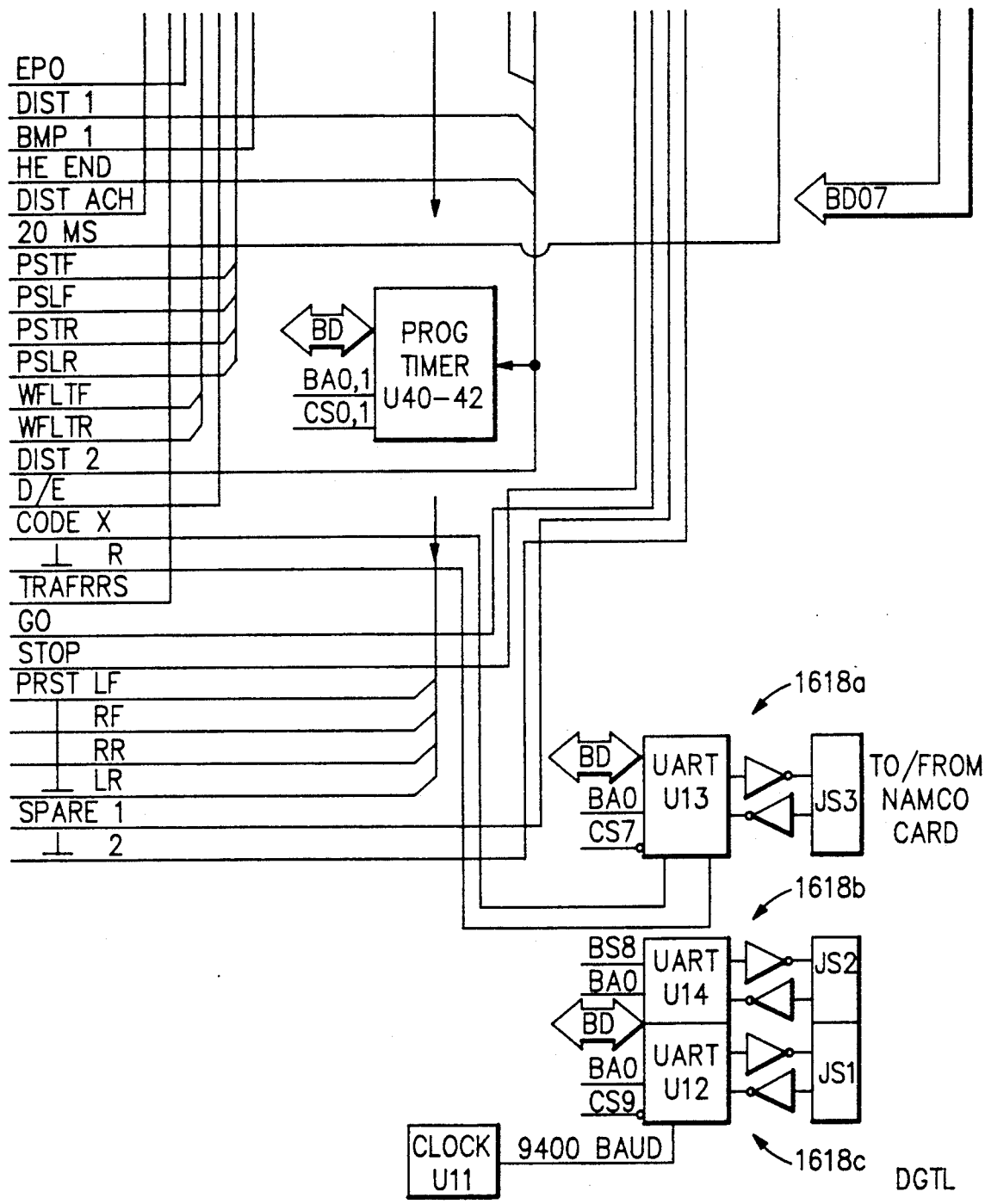

Referring now to FIG. 16, there is shown the digital card 846 (FIG. 8) in greater detail. Level shift 1610 debounces signals that are input thereto and translates all signals to proper voltage levels between 5 volts and ground. The self test circuitry 1612 is used on power up to test all operating systems in the vehicle. A tri-state buffer 1614 connected to self test unit 1612 and input signals at level shift 1610 allows an operator to detect the status of any diagnostics bits that are input to level shift 1610. In other words, tri-state buffer 1614 provides the state of all of the input levels in a logic sense.

Thus, any of the functions that are input to level shift 1610 (e.g., proximity sensor or deadman/enter), are continually monitored and provided at tri-state buffer 1614. When the signal is active, it is designated as a binary 1 and when inactive it is designated binary value is 0. Since the aforementioned process is a real time operation, any monitored anomaly results in the tri-state buffer immediately shifting for the associated bit. When the anomaly is removed, the tri-state buffer immediately resets to a nominal value.

A priority interrupt chip 1616 is connected to tri-state buffer 1614 for interrupting system operation upon sensing an anomaly. A serial port 1618 is used to interface to guidance sensor 844 (FIG. 8). Two additional serial ports 1618a and 1618b are unused in the present embodiment.

Figure 17B:
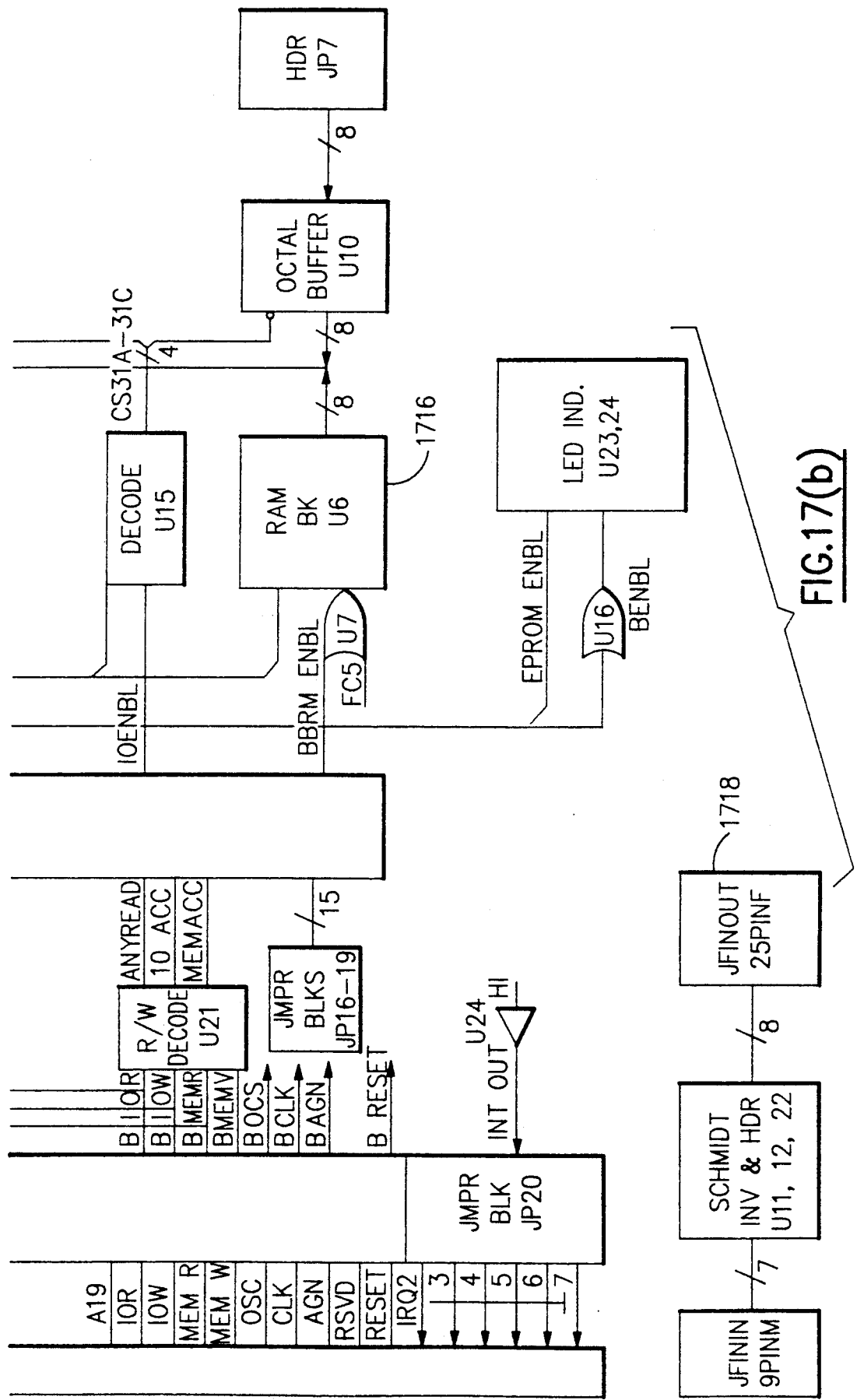

Referring now to FIG. 17, there is shown the nonvolatile memory card 850 (FIG. 8) in greater detail. A communications bus interface 1710 is provided to pass information to a precision distance shaft and encoder 1712 which is operatively connected to the axle of side wheels of the vehicle 132. Precision distance in encoder 1712 allows for precise distance measurement based on rotation of the axle. While coarse measurements are made from the front and rear wheels, for very precise measurement within fractions of an inch, the precision shaft and encoder 1712 is used. Shaft encoder 1712 allows the unit to act in a rotate and advance mode wherein each of the two side wheels is monitored independently. The effect is to have the AGV positioned very accurately despite vehicle turns.

Also connected to communications bus interface 1710 is an EPROM (reference numeral 728 in FIG. 7) such as is provided by Intel Corp. as Model no. 27C512, having 64K bytes of memory. Eprom 1714 stores operations program instructions, such as that embodied in Appendix II. EPROM 1714 contains algorithms and instructions to perform the following functions:
a) all diagnostics
b) map of floor
c) pathfinding
d) traffic control
e) communications
f) speed control
g) safety functions
h) built in self test
i) power on self test The aforementioned functions are programmable and, of course, are dependent upon the environment in which the AGV system is to operate. For example, the map of the floor must change with each facility.

Accordingly, an operator can change AGV critical instructions merely by exchanging one EPROM 1714 for another, suitably programmed EPROM. In this way, the AGV can be customized easily for greatest flexibility without the necessity of changing hardware.

Also connected to communications bus interface 1710 is an 8K nonvolatile RAM 1716. RAM 1716 is used to maintain data in the event of power interruption. Such data may consist of previous transactions, in which case the data stored in RAM 1716 can be used much like a flight recorder, and can be analyzed to determine what caused mal functions or power interruptions themselves. The stored data can be used when power is resupplied to the system.

Also connected to communications bus interface 1710 is a display buffer 1718 for driving the electroluminescent display H (FIG. 5a).

Figure 18A:
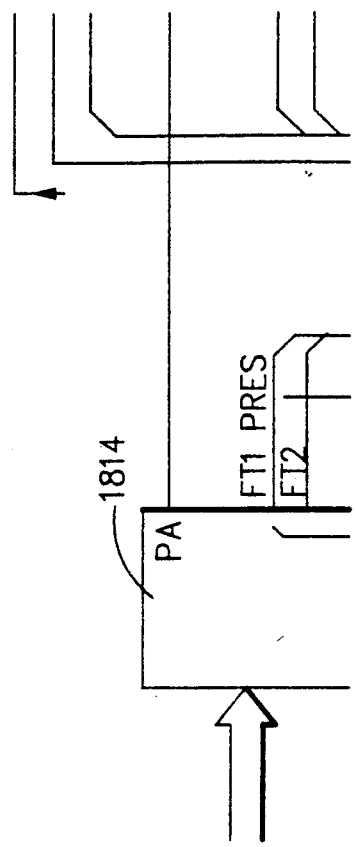
FIGS. 18a-18d, when taken together and arranged as shown in the corresponding interconnection diagram, and hereinafter referred to in the specification as FIG. 18, are a block diagram of the traffic manager in accordance with the present invention.
Figure 18:
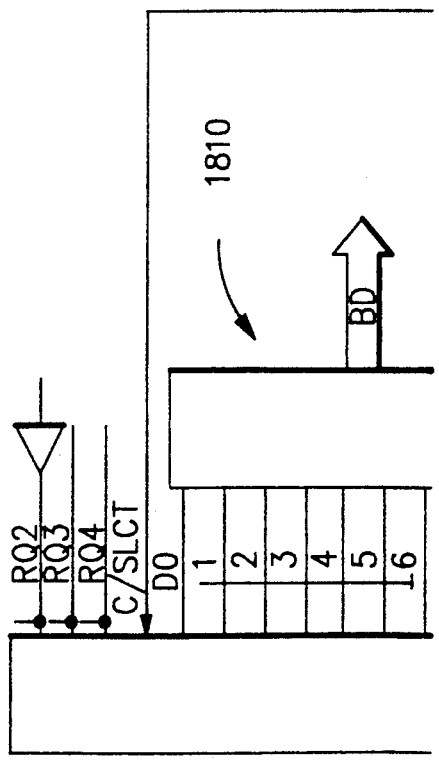
Figure 18B:
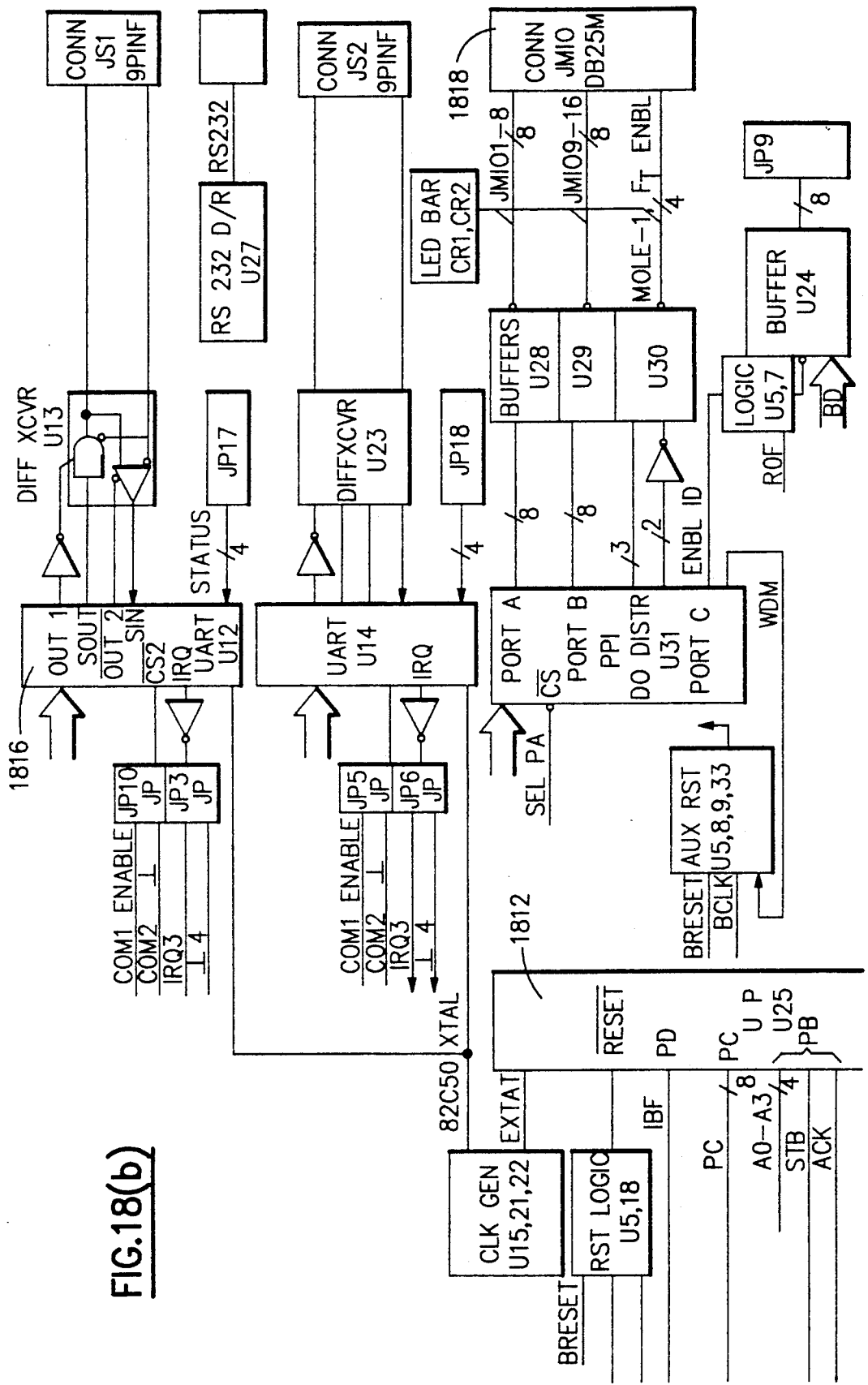
Figure 18C:
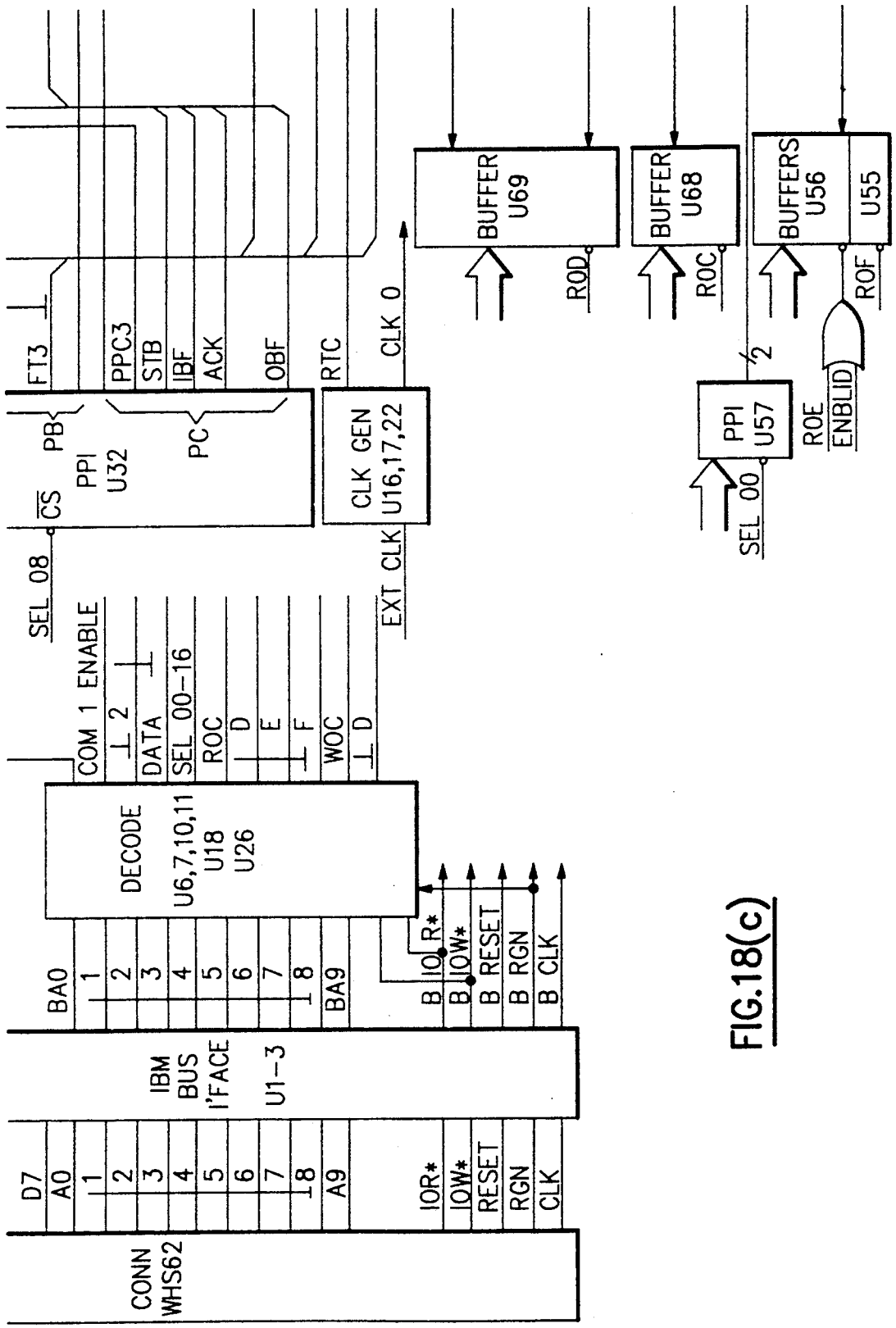
Figure 18D:
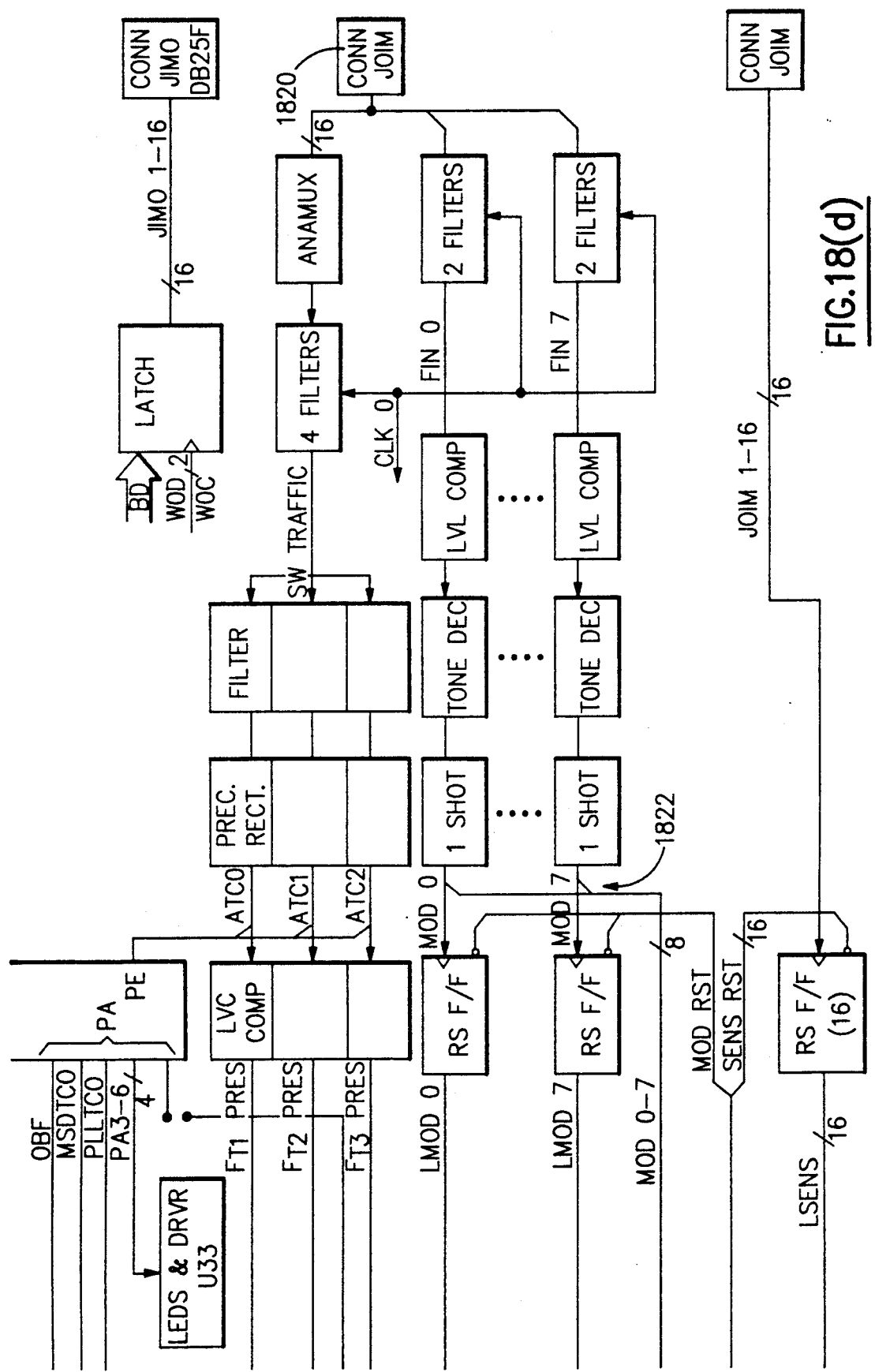

Referring now to FIG. 18, there is shown the traffic manager which resides in control box 119 (FIG. 1) and which contains software such as that described hereinabove with respect to FIG. 12. Decode logic is shown generally at reference numeral 1810, and is similar to the decode logic used on other cards hereinabove mentioned. When a computer such as a PC/XT is driving the system, decode logic 1810 is used to interface such computer to the rest of the board.

Microprocessor or CPU 1812, manufactured by Motorola Corp. as Model no. 68HC11 is provided to control traffic. Connected to CPU 1812 is data 1814 for allowing a PC/XT, not shown, to communicate therewith.

Serial communication ports 1816 are connected to microprocessor 1812.

Seventeen traffic output signals are provided at connector 1818 which allow data from microprocessor 1812 to enable an external card, not shown, to excite a receiver loop disposed under the surface of the floor.

Similarly, a twelve-signal traffic input connector 1820 is used to receive a signal from the transmit coil in the AGV. The signal is demodulated by circuitry shown generally at reference numeral 1822. Thus, a tone that is received at connector 1820 is converted to a logic level. If traffic is present, a logical 1 is transferred to microprocessor 1812.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. An automatic guided vehicle (AGV) system, that is expandable by means of a hierarchy of command sectors, said AGV system having vehicles guided along a pathway between pick-up and delivery stations within a facility, comprising:
means defining a guide path for automatic guided vehicles;
a plurality of pick-up and delivery stands disposed along said guide path;
means defining a plurality of intersections disposed along said guide path;
a plurality of automatically guided vehicles for movement along said guide path;
a host computer for controlling and guiding the automatically guided vehicles along said guide path;

at least one control box of a plurality of control boxes for communicating with and controlling said plurality of automatically guided vehicles within said pick-up and delivery stands;
a hyper driver for passing information between said plurality of control boxes and a local area controller means;
a local area controller means which interfaces with said host computer and controls pick-up and delivery within said plurality of pick-up and delivery stands via said control boxes; and
a plurality of intersection controllers operatively associated with each intersection of said plurality of intersections for maintaining traffic flow within each intersection, each of said intersection controllers operatively and communicatively connected to said local area controller means via said hyper driver and a respective control box to provide traffic information to said local area controller means and said host computer.

2. The automatic guided vehicle system of claim 1, wherein each automatically guided vehicle comprises an on-board computer.

3. The automatic guided vehicle system of claim 2, wherein a floor plan of the facility is stored in said on-board computer.

4. The automatic guided vehicle system of claim 1, further comprising a storage area disposed along said guide path for housing a plurality of automatically guided vehicles.

5. The automatic guided vehicle system of claim 1, further comprising means defining a maintenance area disposed along said guide path for maintenance and repair of said automatically guided vehicles.

6. The automatic guided vehicle system of claim 1, further comprising means defining a charging area disposed along said guide path for charging each automatically guided vehicle.

7. The automatic guided vehicle system of claim 1, wherein said local area controller means comprises a concentrator master disposed at a pick-up and delivery node which is operatively connected between said pick-up and delivery stands and a local area computer.

8. The automatic guided vehicle system of claim 1, wherein each automatically guided vehicle has a flexible bumper and means associated with said flexible bumper for stopping said automatically guided vehicle when said bumper is caused to distort with respect to contact with an obstacle in said guide path.

9. The automatic guided vehicle system of claim 1, wherein each automatically guided vehicle comprises proximity sensors for detecting obstacles in said guide path, and means for slowing or stopping said automatically guided vehicle in response to detection of said obstacles.

10. The automatic guide vehicle system of claim 1, wherein each automatically guided vehicle comprises a lift table for raising and lowering articles at said pick-up and delivery stands.

11. The automatic guided vehicle system of claim 1, wherein each automatically guided vehicle comprises means for sensing when a pick-up and delivery stand is filled.

12. The automatic guided vehicle system of claim 1, wherein each automatically guided vehicle has means for operating said automatically guided vehicle in a manual mode.

13. The automatic guided vehicle system of claim 1, wherein each automatically guided vehicle comprises means for visually indicating a power condition.

14. The automatic guided vehicle system of claim 1, wherein each automatically guided vehicle comprises a display screen and means for interrogating internal systems within said automatically guided vehicle, wherein said interrogating is displayable upon said display screen.

15. An automatic guided vehicle (AGV) system being expandable by virtue of a hierarchy of command architecture, and having vehicles guided along a pathway between pick-up and delivery stations within a facility, comprising:
means defining a guide path for automatically guided vehicles, including a number of intersections;
a plurality of pick-up and delivery stands disposed along said guide path;
a plurality of automatically guided vehicles for movement along said guide path, each automatically guided vehicle having an on-board computer;
a host computer for controlling and guiding the automatically guided vehicles along said guide path;
control means disposed along said guide path and operatively connected to said host computer for controlling pick-up and delivery within said plurality of pick-up and delivery stands, said control means further including a local area controller that interfaces with said host computer, and a plurality of pick-up and delivery control boxes, each pick-up and delivery control box of said plurality of pick-up and delivery control boxes disposed between said local area controller and said pick-up and delivery stands for communicating information to said host computer with respect to availability of said pick-up and delivery stands; and
traffic control mean disposed along said guide path and operatively connected to said host computer for maintaining traffic flow within each intersection.

16. The automatic guided vehicle system of claim 15, wherein a floor plan of the facility is stored in said on-board computer of each automatically guided vehicle.

17. The automatic guided vehicle system of claim 15, further comprising a storage area disposed along said guide path for housing a plurality of said automatically guided vehicles.

18. The automatic guided vehicle system of claim 15, further comprising a maintenance area disposed along said guide path for maintenance and repair of said automatically guided vehicles.

19. The automatic guided vehicle system of claim 15, further comprising a charging area disposed along said guide path for charging each automatically guided vehicle.

20. The automatic guided vehicle system of claim 15, wherein each of said pick-up and delivery control boxes includes a concentrator master, and said local area controller includes a computer.

21. The automatic guided vehicle system of claim 15, wherein each automatically guided vehicle has a flexible bumper and means associated with each flexible bumper for stopping said automatically guided vehicle when said bumper is caused to distort with respect to contact with an obstacle in said guide path.

22. The automatic guided vehicle system of claim 15, wherein each automatically guided vehicle comprises proximity sensors for detecting obstacles in said guide path, and means for slowing or stopping said automatically guided vehicle in response to detection of said obstacles.

23. The automatic guided vehicle system of claim 15, wherein each automatically guided vehicle comprises a lift table for raising and lowering articles at said pick-up and delivery stands.

24. The automatic guided vehicle system of claim 15, wherein each automatically guided vehicle comprises means for sensing when a pick-up and delivery stand is occupied with another AGV.

25. The automatic guided vehicle system of claim 15, wherein each automatically guided vehicle has means for operating said automatically guided vehicle in a manual mode.

26. The automatic guided vehicle system of claim 15, wherein each automatically guided vehicle comprises means for visually indicating a power condition.

27. The automatic guided vehicle system of claim 15, wherein a display screen is included upon each automatically guided vehicle for displaying internal information.

* * * * *